(12) United States Patent
Tessonnier et al.

(10) Patent No.: US 10,633,750 B2
(45) Date of Patent: Apr. 28, 2020

(54) ELECTROCATALYTIC HYDROGENATION OF MUCONIC ACID

(71) Applicant: Iowa State University Research Foundation, Inc., Ames, IA (US)

(72) Inventors: Jean-Philippe Tessonnier, Ames, IA (US); John Edward Matthiesen, Ames, IA (US); Nacu B. Hernandez-Cantu, Ames, IA (US); Eric W. Cochran, Ames, IA (US)

(73) Assignee: Iowa States University Research Foundation, Inc., Ames, IA (US)

( * ) Notice: Subject to any disclaimer, the term of this patent is extended or adjusted under 35 U.S.C. 154(b) by 198 days.

(21) Appl. No.: 15/524,888

(22) PCT Filed: Nov. 10, 2015

(86) PCT No.: PCT/US2015/059974
§ 371 (c)(1),
(2) Date: May 5, 2017

(87) PCT Pub. No.: WO2016/077361
PCT Pub. Date: May 19, 2016

(65) Prior Publication Data
US 2017/0342575 A1    Nov. 30, 2017

Related U.S. Application Data

(60) Provisional application No. 62/077,697, filed on Nov. 10, 2014.

(51) Int. Cl.
*C08G 63/00* (2006.01)
*C25B 3/00* (2006.01)
(Continued)

(52) U.S. Cl.
CPC ............ *C25B 3/04* (2013.01); *C08G 63/16* (2013.01); *C08G 69/26* (2013.01); *C08G 69/28* (2013.01)

(58) Field of Classification Search
CPC ............ C08G 63/78; C08G 69/00; C25B 3/04
(Continued)

(56) References Cited

U.S. PATENT DOCUMENTS

| 3,032,489 A | 5/1962 | Loveland |
| 4,001,187 A | 1/1977 | Itabashi et al. |

(Continued)

FOREIGN PATENT DOCUMENTS

| JP | 03285090 A | * 12/1991 | ............... C25B 3/04 |
| JP | 03285090 A | 12/1991 | |
| WO | WO-2016077361 A1 | 5/2016 | |

OTHER PUBLICATIONS

Brioude et al., "Synthesis and Characterization of Aliphatic Polyesters from Glycerol, by-Product of Biodiesel Production, and Adipic Acid," Materials Research (2007), vol. 10, No. 4, pp. 335-339. (Year: 2007).*

(Continued)

*Primary Examiner* — Edna Wong
(74) *Attorney, Agent, or Firm* — Schwegman, Lundberg & Woessner, P.A.

(57) ABSTRACT

Various embodiments disclosed relate to electrocatalytic hydrogenation of muconic acid and polymers formed from the reaction products thereof. In various embodiments, the present invention provides an electrocatalytic method to prepare 3-hexene-1,6-dioic acid, 2-hexene-1,6-dioic acid, adipic acid, or a combination thereof, from muconic acid. The method includes passing current through a catalytic cathode in a reactor including an aqueous acidic solution including muconic acid, a supporting electrolyte, and an (Continued)

anode, so as to generate atomic hydrogen on the cathode surface in an amount effective to hydrogenate the muconic acid to yield a product including 3-hexene-1,6-dioic acid, 2-hexene-1,6-dioic acid, adipic acid, or a mixture thereof. Also disclosed is the polymerization of 3-hexene-1,6-dioic acid, 2-hexene-1,6-dioic acid, or a combination thereof with another compound, such as a diamine or a dialcohol, to form a polymer, such as a polyamide or a polyester.

22 Claims, 29 Drawing Sheets

(51) Int. Cl.
    *C25B 3/04*         (2006.01)
    *C08G 69/28*      (2006.01)
    *C08G 69/26*      (2006.01)
    *C08G 63/16*      (2006.01)
(58) Field of Classification Search
    USPC .......................................... 528/271; 205/440
    See application file for complete search history.

(56) References Cited

U.S. PATENT DOCUMENTS

| | | |
|---|---|---|
| 5,225,581 A | 7/1993 | Pintauro |
| 2010/0314243 A1 | 12/2010 | Frost et al. |
| 2011/0124911 A1 | 5/2011 | Burk et al. |
| 2015/0096897 A1 | 4/2015 | Hashiba et al. |
| 2017/0129995 A1 | 5/2017 | Tessonnier et al. |

OTHER PUBLICATIONS

Maglio et al., "Synthesis and Characterization of Aliphatic Unsaturated Polyesters from trans-4-Octene-1,8-Dioic Acid and trans-3-Hexene-1,6-Dioic Acids," European Polymer Journal ( © 1979), vol. 15, pp. 695-699. (Year: 1979).*
Kleinzeller et al., "Muconic Acid in Bacteria," Sbornik Mezinarod. Polarog. Sjezdu Praze, 1st Congr. (1951), (Pt. III), Proc. 619-20; 620-2; 622-3. Abstract Only. (Year: 1951).*
"U.S. Appl. No. 62/077,697, Preliminary Amendment filed Feb. 25, 2015", 3 pgs.
"International Application Serial No. PCT/US15/59974, Invitation to Pay Add'l Fees and Partial Search Rpt dated Jan. 26, 2016".
"International Application Serial No. PCT/US2015/059974, International Search Report dated Apr. 6, 2016", 8 pgs.
"International Application Serial No. PCT/US2015/059974, Written Opinion dated Apr. 6, 2016", 10 pgs.
Ogumi, Z, et al., "Application of the spe method to organic electrochemistry—II. Electrochemical hydrogenation of olefinic double bonds", Electrochimica Acta, Elsevier Science Publishers, Barking, GB, vol. 26, No. 12, (Dec. 1, 1981), 1779-1782.
"International Application Serial No. PCT US2015 059974, International Preliminary Report on Patentability dated May 26, 2017", 12 pgs.
"U.S. Appl. No. 15/348,122, Final Office Action dated Apr. 8, 2019", 15 pgs.
"U.S. Appl. No. 15/348,122, Response filed Feb. 27, 2019 to Non Final Office Action dated Dec. 4, 2018", 12 pgs.
"U.S. Appl. No. 15/348,122, Non Final Office Action dated Dec. 4, 2018", 11 pgs.
"U.S. Appl. No. 15/348,122, Response Filed Nov. 9, 2018 to Restriction Requirement dated Sep. 20, 2018", 8 pgs.
"U.S. Appl. No. 15/348,122, Restriction Requirement dated Sep. 20, 2018", 9 pgs.
Chiba, Toshiro, et al., "Electrocatrocatalyic Reduction Using Raney Nickel", *Bull. Chem. Soc. Jpn.*, 56, (1983), 719-723.
Curran, K. A., et al., "Metabolic engineering of muconic acid production in *Saccharomyces cerevisiae*", *Metabolic Engineering*, 15, (Jan. 2013), 55-66.
Greeley, J., et al., "Computational high-throughput screening of electrocatalytic materials for hydrogen evolution", *Nat. Mater.*, 5(11), (2006), 909-913.
Kirilyus, I. V., et al., "Electrocatalytic Reduction of Pyridine at Raney Nickel", Translated from Elektrokhimiya, 15(10), pp. 1545-1546, Oct. 1979, (1979), 2 pgs.
Miller, L. L., et al., "Electrocatalytic hydrogenation of aromatic compounds", *J. Org. Chem.*, 43(10), (1978), 2059-2061.
Park, K., et al., "Flow Reactor Studies of the Paired Electro-Oxidation and Electroreduction of Glucose", *J. Electrochem. Soc.*, 132(8), (1985), 1850-1855.
Trasatti, S., "Work function, electronegativity, and electrochemical behaviour of metals: III. Electrolytic hydrogen evolution in acid solutions", *Journal of Electroanalytical Chemistry and Interfacial Electrochemistry*, 39(1), (1972), 163-184.
Weber, C., et al., "Biosynthesis of cis,cis-Muconic Acid and Its Aromatic Precursors, Catechol and Protocatechuic Acid, from Renewable Feedstocks by *Saccharomyces cerevisiae*", *Appl. Env. Microbiol.* 78(23), (2012), 8421-8430.
"U.S. Appl. No. 15/348,122, Notice of Allowance dated Jun. 14, 2019", 7 pgs.
"U.S. Appl. No. 15/348,122, Response filed Jun. 4, 2019 to Final Office Action dated Apr. 8, 2019", 8 pgs.

* cited by examiner

ELECTROCATALYTIC HYDROGENATION OF MUCONIC ACID

CROSS-REFERENCE TO RELATED APPLICATION

This application is a U.S. National Stage Filing under 35 U.S.C. & 371 from International Application No. PCT/US2015/059974, filed on 10 Nov. 2015, which claims the benefit of priority to U.S. Provisional Patent Application Ser. No. 62/077,697, filed Nov. 10, 2014, the disclosures of which are incorporated herein in their entirety by reference.

STATEMENT OF GOVERNMENT SUPPORT

This invention was made with the support of grant no. EEC0813570 awarded by the National Science Foundation and grant No. DE-AC02-07CH11358, awarded by the Department of Energy. The government has certain rights in this invention.

BACKGROUND

As shown in Scheme 1, muconic acid ("MA") is an unsaturated dicarboxylic acid, hexe-2,4-dienedoic acid, which can exist in three isomeric forms.

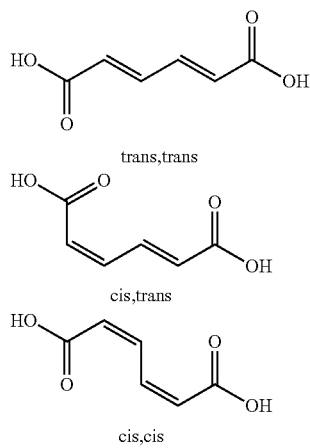

Scheme 1.

Muconic acid has garnered significant interest due to its potential use as a platform chemical for the production of several valuable consumer bio-plastics including nylon 6,6, polyurethane (via an adipic acid intermediate), and polyethylene terephthalate (PET) (via a terephthalic acid intermediate). Adipic acid is produced mainly from petrochemicals like benzene. Because of the strong environmental impact of the production processes and the dependence on fossil resources, biotechnological production processes have been extensively explored.

For example, C. Weber et al., Appl. Env. Microbiol., 71, 8421 (2012) disclose the use of engineered *Saccharomyces cerevisiae* strain expressing a heterologous biosynthetic pathway converting glucose into cis,cis-muconic acid via the intermediate 3-dehydroshikimate of the aromatic amino acid biosynthesis pathway via protocatechuic acid and catechol, which can potentially be chemically hydrogenated to adipic acid. K. A. Curran et al., Metab. Eng., 15, 55 (2013) have reported a three-step synthetic, composite pathway including importing the enzymes dehydroshikimate dehydratase from *Podospora anserina*, protocatechuic acid decarboxylase from *Enterobacter cloacae*, and catechol 1,2-dioxygenase from *Candida albicans* into yeast. Further genetic modifications guided by metabolic modeling and feedback inhibition mitigation were introduced to increase precursor availability that led to a final titer of nearly 141 mg/L muconic acid in a shake-flask culture, a value nearly 24-fold higher than obtained from the initial strain.

Furthermore, the hydrogenation of muconic acid to adipic acid presents many of the difficulties encountered in the hydrogenation of edible oils and fats. The majority of commercially hydrogenated oils and fats are processed with batch reactor equipment using high temperatures, chemical catalysts, and hydrogen gas supplied to the reactor at elevated pressures. The hydrogenation catalysts used include Raney and supported nickel catalysts, promoted nickel catalysts containing palladium, copper, or zirconium, and copper chromite catalysts. The rate of hydrogenation is dependent on the reaction temperature, the nature of the oil or fat, the activity and concentration of the catalyst, and the rate at which hydrogen gas and unsaturated oil or fat are supplied to the hydrogenation reactor. Typical reaction pressures and temperatures are in the range of 10-60 bar and 150°-225° C., respectively. These elevated temperatures and pressures are required to solubilize sufficiently high concentrations of hydrogen gas in the oil/catalyst or fat/catalyst reaction medium so that the hydrogenation reaction proceeds at acceptably high rates.

Electrocatalytic hydrogenations of unsaturated organic compounds using Raney nickel or similar low hydrogen overvoltage catalysts as cathode materials can employ less rigorous conditions, and have been reported by a number of investigators (e.g., T. Chiba et al., Bull. Chem. Soc. Jpn., 56, 719 (1983); L. L. Miller et al., J. Org. Chem., 43, 2059 (1978); L. V. Kirilyus et al., Sov. Electrochem., 15, 1330 (1979); K. Park et al., J. Electrochem. Soc., 132, 1850 (1985)). These studies have dealt with the electrochemical hydrogenation of unsaturated hydrocarbons, phenols, ketones, nitro-compounds, and sugars rather than unsaturated fatty acids. Pintauro (U.S. Pat. No. 5,225,581) discloses a two-phase electrocatalytic process for hydrogenating unsaturated fatty acids or triglycerides using hydrogen generated electrolytically on a high surface area, low hydrogen overvoltage catalytic material used as the cathode. However, this process was not disclosed to be useful to hydrogenate unsaturated alkene dioic acids, either in purified form, or in situ as formed in the fermentation broth used in their biosynthesis from organic precursors.

SUMMARY OF THE INVENTION

In various embodiments, the present invention provides an electrocatalytic method to prepare 3-hexene-1,6-dioic acid, 2-hexene-1,6-dioic acid, adipic acid, or a combination thereof, from muconic acid. The method includes passing current through a catalytic cathode in a reactor including an aqueous acidic solution including muconic acid, a supporting electrolyte, and an anode, so as to generate atomic hydrogen on the cathode surface in an amount effective to hydrogenate the muconic acid. The hydrogenation of the muconic acid yields a product including 3-hexene-1,6-dioic acid, 2-hexene-1,6-dioic acid, adipic acid, or a mixture thereof.

In various embodiments, the present invention provides an electrocatalytic method to prepare adipic acid from muconic acid. The method includes passing current through a catalytic cathode including Pd on carbon, wherein the catalytic cathode is in a reactor including an aqueous acidic solution including muconic acid, a supporting electrolyte, and an anode, so as to generate atomic hydrogen on the cathode surface in an amount effective to hydrogenate the muconic acid so as to yield a product including adipic acid with a selectivity (e.g., a selectivity toward adipic acid) of about 40% to about 100%.

In various embodiments, the present invention provides an electrocatalytic method to prepare trans-3-hexene-1,6-dioic acid from muconic acid. The method includes passing current through a catalytic cathode including Cu, Fe, Pb, Sn, Ti, Zn, or a combination thereof, wherein the catalytic cathode is in a reactor including an aqueous acidic solution including muconic acid, a supporting electrolyte, and an anode, so as to generate atomic hydrogen on the cathode surface in an amount effective to hydrogenate the muconic acid so as to yield a product including trans-3-hexene-1,6-dioic acid with a selectivity of about 50% to about 100%.

In various embodiments, the present invention provides a method of forming a polymer. The method includes polymerizing 2-hexene-1,6-dioic acid, the 3-hexene-1,6-dioic acid, or a combination thereof, with another compound, to form a polymer.

In various embodiments, the present invention provides a method of forming a polymer, including polymerizing the 2-hexene-1,6-dioic acid, the 3-hexene-1,6-dioic acid, or a combination thereof, with a compound having the structure $H_2N—(C_1-C_{20})$alkylene-$NH_2$ or a salt thereof, wherein the $(C_1-C_{20})$alkyl group is substituted or unsubstituted, to form a polymer.

In various embodiments, the present invention provides a polymer including a repeating group having the structure:

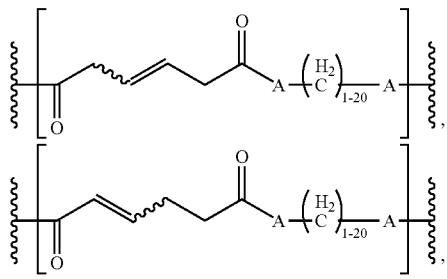

a salt thereof, or a combination thereof. The —NH—$(CH_2)_{1-20}$—NH— group is substituted or unsubstituted. At each occurrence -A- is independently chosen from —NH— and —O—

In various embodiments, the present invention provides a polymer including a repeating group having the structure:

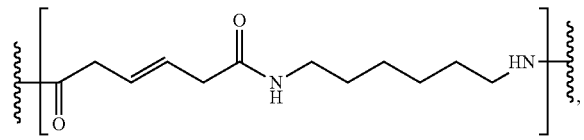

or a salt thereof.

Various embodiments have certain advantages over other methods of hydrogenating muconic acid. For example, in various embodiments, hydrogen and catalyst can be used more efficiently, thus requiring lower catalyst loading of the reactor. In various embodiments, there is little free hydrogenation gas present, thus reducing the risk of explosion and fire. In various embodiments, the concentration of hydrogen on the catalyst metal surface can be easily controlled by adjusting the applied current (or applied electric potential), which can lead to improved product selectivity. In various embodiments, the operating temperatures can be low, thus minimizing thermal degradation of the reactants and products or unwanted homogeneous side reactions. In various embodiments, corrosion of the metal catalyst can be less, thus reducing or eliminating the presence of metal ion contaminants in the hydrogenated product.

In various embodiments, the method can form 3-hexenedioic acid from muconic acid, such as trans-3-hexenedioic acid, with higher selectivity, higher conversion, or a combination thereof, as compared to other methods. In various embodiments, the method can form adipic acid from muconic acid with higher selectivity, higher conversion, or a combination thereof, as compared to other methods.

In some embodiments, the method can include at least partially simultaneously forming muconic acid from yeast fermentation and performing electrocatalytic hydrogenation on the muconic acid directly in the fermentation broth, such that the yeast survives during the electrocatalytic hydrogenation and continues to generate muconic acid. In some embodiments, the metal in the cathode can be less sensitive to impurities in the aqueous media as compared to other methods of hydrogenation, or can have no sensitivity to such impurities, such as compounds formed in the fermentation broth during the production of muconic acid, allowing the electrocatalytic hydrogenation method to be performed using impure aqueous media or using the fermentation broth.

In some embodiments, hydrogenated products of the electrocatalytic hydrogenation can be polymerized. In various embodiments, the polymer formed can have useful properties.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
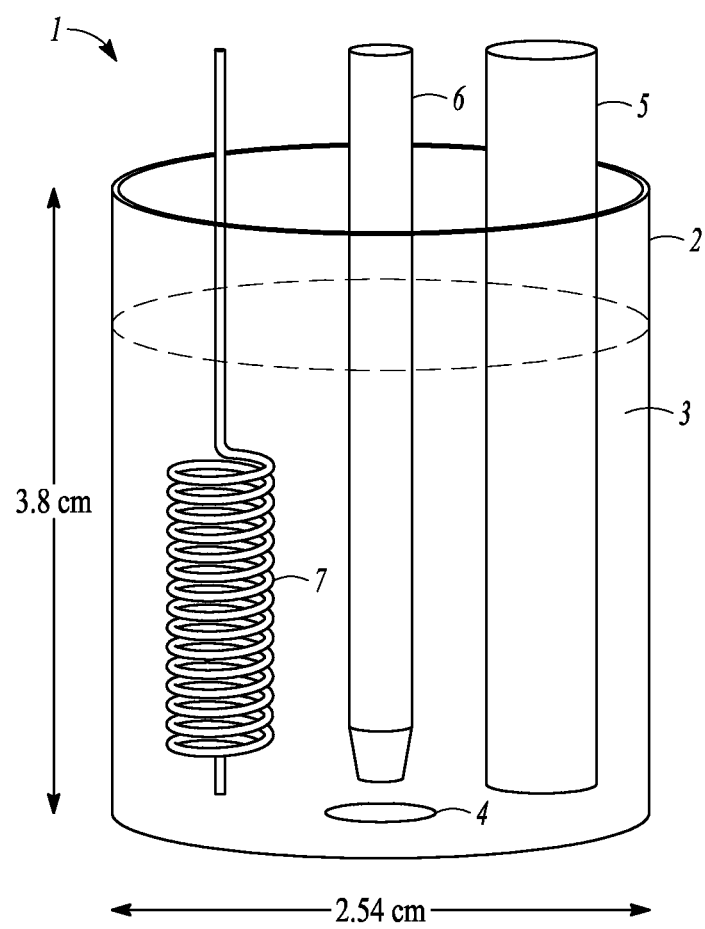
FIG. 1 is a schematic drawing of a three-electrode electrochemical cell (1), according to various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000.1" is equivalent to "0.0001." All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "solvent" as used herein refers to a liquid that can dissolve a solid, liquid, or gas. Non-limiting examples of solvents are silicones, organic compounds, water, alcohols, ionic liquids, and supercritical fluids.

As used herein, the term "polymer" refers to a molecule having at least one repeating unit and can include copolymers.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

Method of Electrocatalytically Hydrogenating Muconic Acid.

In various embodiments, the present invention provides an electrocatalytic method to hydrogenate muconic acid to yield a product including the hydrogenated product 3-hexene-1,6-dioic acid, 2-hexene-1,6-dioic acid, adipic acid, or combinations thereof, with both a high conversion of muconic acid to the hydrogenated products and a high selectivity for conversion to one or both of the hydrogenated products. 3-Hexene-1,6-dioic acid or 2-hexene-1,6-dioic acid can be useful in preparing nylon 6,6 analogs (e.g., which can be designated as bio-based unsaturated nylon 6,6 or UPA 6,6) with unique or adjustable properties. Furthermore, the unsaturated bond at the 2- or 3-position can be functionalized before or after copolymerization.

In various embodiments, the present invention provides an electrocatalytic method to prepare 3-hexene-1,6-dioic acid, 2-hexene-1,6-dioic acid, adipic acid, or a combination thereof, from muconic acid. The method can include passing current through a catalytic cathode in a reactor including an aqueous acidic solution including muconic acid, a supporting electrolyte, and an anode, so as to generate atomic hydrogen on the cathode surface in an amount effective to hydrogenate the muconic acid to yield a product including 3-hexene-1,6-dioic acid, 2-hexene-1,6-dioic acid, adipic acid, or a mixture thereof.

Hydrogen is generated on the catalyst surface by the electrochemical reduction of protons or water in the electrolyte. The adsorbed hydrogen on the surface of the catalyst can react with the muconic acid to yield the saturated product (adipic acid) or partially saturated product (3-hexene-1,6-dioic acid or 2-hexene-1,6-dioic acid, with cis or trans configurations possible for both) as shown in Scheme 2.

$H^+ + e^- \rightarrow H\ ads$ $C_6H_6O_4 ads + 2H\ ads \rightarrow C_6H_8O_4$ $C_6H_6O_4 ads + 4H\ ads \rightarrow C_6H_{10}O_4$ <span style="float:right">Scheme 2.</span>

Since hydrogen is generated in situ directly on the catalyst surface by passing current through the conductive catalyst, high operating temperatures and pressures are not required. The hydrogenation can be carried out at any suitable temperature and pressure. The hydrogenation can be conducted under ambient conditions of temperature and pressure, such as about 20° to about 30° C. and at about 1 atm, for a time sufficient to complete the desired transformation, e.g., about 0.5 h to about 24 h, about 1 h to about 5 h, or about 1 h or less, or less than, equal to, or greater than about 2 h, 3, 4, 5, 6, 7, 8, 9, 10, 11, 12, 13, 14, 15, 16, 17, 18, 19, 20, 21, 22, 23, or about 24 h or more.

The hydrogenation can be carried out in an acidified aqueous medium, such as water or even a yeast fermentation broth (e.g., medium) employed to prepare the muconic acid. The medium can be acidified with, e.g., an inorganic or organic acid, such as formic acid, sulfuric acid, a salt thereof (e.g., that provides an electrolyte), or a combination thereof. The acidified aqueous medium can be an electrolyte. The medium can be contained in a reactor that includes an anode (e.g., the counter electrode), a cathode (e.g., the working electrode), and a reference electrode (e.g., an Ag/AgCl electrode or a reversible hydrogen electrode). The reactor can be any suitable reactor having any suitable shape, such that the method can be carried out as described herein. The reactor can be a batch reactor. The reactor can be a continuous flow reactor.

The muconic acid can be produced in any suitable way. In some embodiments, the muconic acid is commercially obtained. In some embodiments, the muconic acid is produced from petroleum materials. In some embodiments, the muconic acid is produced from a microorganism or an enzyme, such as any suitable microorganism or enzyme. The muconic acid can be produced by yeast or bacteria, such as any suitable yeast or bacteria. The microorganism (e.g., yeast or bacteria) or enzyme can use any suitable organic material to generate the muconic acid, such as a carbohydrate (e.g., glucose), or such as an aromatic material (e.g., lignin). In some embodiments, the muconic acid is generated by yeast in a fermentation broth.

The fermentation broth can be any suitable fermentation broth. The fermentation broth can include glucose and support the conversion of glucose into muconic acid by yeast, such as any suitable type of yeast that can perform the conversion. The fermentation broth can include yeast nitrogen base. The yeast nitrogen base can be substantially free of amino acids, ammonium sulfate, or a combination thereof. The fermentation broth can include complete supplement mixture (CSM) uracil-dropout amino acid mix. The method can include at least partially simultaneously fermenting the broth to form muconic acid from the yeast and hydrogenating muconic acid in the broth.

The cathode used in the reaction can utilize both high and low hydrogen overvoltage catalytic metals, e.g., lead or another metal such as platinum, vanadium, chromium, manganese, iron, cobalt, zinc, aluminum, titanium, zirconium, niobium, molybdenum, ruthenium, palladium, cadmium, indium, samarium, antimony, hafnium, tantalum, rhenium, iridium, gold, bismuth, tungsten, nickel, copper, silver, alloys thereof, or combinations thereof.

The material used for the anode is not critical. Suitable anodes can include graphite, platinum, platinum-coated titanium, ruthenium oxide titanium oxide-coated titanium, or combinations thereof. The anodic reaction can be the oxidation of water to produce oxygen gas.

The electric potential applied to the cathode with a respect to a reference electrode (e.g., an Ag/AgCl reference electrode or a reversible hydrogen electrode in the electrolyte solution with the anode and cathode) can be adjustable and can be maintained at about −0.1 to about −5 V, about −0.5 to about −3.0 V, about −0.5 to about −2.0 V, e.g., about −0.8 to −1.8 V, or about −0.1 or more, or less than, equal to, or greater than about −0.2, −0.3, −0.4, −0.5, −0.6, −0.7, −0.8, −0.9, −1, −1.1, −1.2, −1.3, −1.4, −1.5, −1.6, −1.7, −1.8, −1.9, −2, −2.1, −2.2, −2.4, −2.6, −2.8, −3, −3.2, −3.4, −3.6, −3.8, −4, −4.2, −4.4, −4.6, −4.8, or about −5 V. In some embodiments, under these conditions, nearly quantitative yields of HDA can be obtained in less than 2 hrs.

The muconic acid starting material can be any suitable muconic acid. The muconic acid can be cis,cis-muconic acid, trans,cis-muconic acid, trans,trans-muconic acid, or a combination thereof. In various embodiments, the muconic acid starting material is about 0 mol % to about 100 mol % cis,cis-muconic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %. In various embodiments, the muconic acid starting material is about 0 mol % to about 100 mol % trans,cis-muconic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %. In various embodiments, the muconic acid starting material is about 0 mol % to about 100 mol % trans,trans-muconic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %.

The electrocatalytic hydrogenation of the muconic acid can yield a product mixture that has any suitable composition. The product can include 3-hexene-1,6-dioic acid (e.g., cis-3-hexene-1,6-dioic acid, trans-3-hexene-1,6-dioic acid, or a combination thereof), 2-hexene-1,6-dioic acid (e.g. cis-3-hexene-1,6-dioic acid, trans-3-hexene-1,6-dioic acid, or a combination thereof), adipic acid, or a combination thereof.

The product of the electrocatalytic hydrogenation of the muconic acid can include 3-hexene-1,6-dioic acid (e.g., cis, trans, or a combination thereof) in any suitable wt % or mol %. For example, the product can be about 0 wt % to about 100 wt % 3-hexene-1,6-dioic acid, or about 0 wt %, or about 0.001 wt % or less, or less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more, or about 100 wt %. For example, the product can be about 0 mol % to about 100 mol % 3-hexene-1,6-dioic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %. The electrocatalytic hydrogenation of the muconic acid can have any suitable selectivity for 3-hexene-1,6-dioic acid, such as about 0% to about 100% (e.g., 0 mol % to about 100 mol % of the muconic acid hydrogenated can be 3-hexene-1,6-dioic acid), or about 0%, or about 0.001% or less, or less than, equal to, or greater than about 0.01%, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999% or more, or about 100%.

The product of the electrocatalytic hydrogenation of the muconic acid can include cis-3-hexene-1,6-dioic acid in any suitable wt % or mol %. For example, the product can be about 0 wt % to about 100 wt % cis-3-hexene-1,6-dioic acid, or about 0 wt %, or about 0.001 wt % or less, or less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more, or about 100 wt %. For example, the product can be about 0 mol % to about 100 mol % cis-3-hexene-1,6-dioic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %. The electrocatalytic hydrogenation of the muconic acid can have any suitable selectivity for cis-3-hexene-1,6-dioic acid, such as about 0% to about 100%, or about 0%, or about 0.001% or less, or less than, equal to, or greater than about 0.01%, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999% or more, or about 100%.

The product of the electrocatalytic hydrogenation of the muconic acid can include trans-3-hexene-1,6-dioic acid in any suitable wt % or mol %. For example, the product can be about 0 wt % to about 100 wt % trans-3-hexene-1,6-dioic acid, or about 0 wt %, or about 0.001 wt % or less, or less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more, or about 100 wt %. For example, the product can be about 0 mol % to about 100 mol % trans-3-hexene-1,6-dioic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %. The electrocatalytic hydrogenation of the muconic acid can have any suitable selectivity for trans-3-hexene-1,6-dioic acid, such as about 0% to about 100%, or about 0%, or about 0.001% or less, or less than, equal to, or greater than about 0.01%, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999% or more, or about 100%.

The product of the electrocatalytic hydrogenation of the muconic acid can include 2-hexene-1,6-dioic acid (e.g., cis, trans, or a combination thereof) in any suitable wt % or mol %. For example, the product can be about 0 wt % to about 100 wt % 2-hexene-1,6-dioic acid, or about 0 wt %, or about 0.001 wt % or less, or less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more, or about 100 wt %. For example, the product can be about 0 mol % to about 100 mol % 2-hexene-1,6-dioic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %. The electrocatalytic hydrogenation of the muconic acid can have any suitable selectivity for 2-hexene-1,6-dioic acid, such as about 0% to about 100%, or about 0%, or about 0.001% or less, or less than, equal to, or greater than about 0.01%, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999% or more, or about 100%.

The product of the electrocatalytic hydrogenation of the muconic acid can include cis-2-hexene-1,6-dioic acid in any suitable wt % or mol %. For example, the product can be about 0 wt % to about 100 wt % cis-2-hexene-1,6-dioic acid, or about 0 wt %, or about 0.001 wt % or less, or less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more, or about 100 wt %. For example, the product can be about 0 mol % to about 100 mol % cis-2-hexene-1,6-dioic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %. The electrocatalytic hydrogenation of the muconic acid can have any suitable selectivity for cis-2-hexene-1,6-dioic acid, such as about 0% to about 100%, or about 0%, or about 0.001% or less, or less than, equal to, or greater than about 0.01%, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999% or more, or about 100%.

The product of the electrocatalytic hydrogenation of the muconic acid can include trans-2-hexene-1,6-dioic acid in any suitable wt % or mol %. For example, the product can be about 0 wt % to about 100 wt % trans-2-hexene-1,6-dioic acid, or about 0 wt %, or about 0.001 wt % or less, or less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more, or about 100 wt %. For example, the product can be about 0 mol % to about 100 mol % trans-2-hexene-1,6-dioic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %. The electrocatalytic hydrogenation of the muconic acid can have any suitable selectivity for trans-2-hexene-1,6-dioic acid, such as about 0% to about 100%, or about 0%, or about 0.001% or less, or less than, equal to, or greater than about 0.01%, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999% or more, or about 100%.

The product of the electrocatalytic hydrogenation of the muconic acid can include adipic acid in any suitable wt % or mol %. For example, the product can be about 0 wt % to about 100 wt % adipic acid, or about 0 wt %, or about 0.001 wt % or less, or less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more, or about 100 wt %. For example, the product can be about 0 mol % to about 100 mol % adipic acid, or about 0 mol %, or about 0.001 mol % or less, or less than, equal to, or more than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 mol % or more, or about 100 mol %. The electrocatalytic hydrogenation of the muconic acid can have any suitable selectivity for adipic acid, such as about 0% to about 100%, or about 0%, or about 0.001% or less, or less than, equal to, or greater than about 0.01%, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999% or more, or about 100%.

The electrocatalytic hydrogenation of the muconic acid can be performed with any suitable percent conversion of the muconic acid. For example, the conversion of the muconic acid can be about 0.001% to about 100%, or about 0.001% or less, or less than, equal to, or greater than, about 0.01%, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999% or more, or about 100%.

The cathode can include any suitable material, such that the method can be carried out as described herein. The cathode can include, or can be, one or more transition metals. The cathode can include, or can be, at least one of Cu, Fe, Ni, Pd, Pt, Pd/C, Pb, Sn, Ti, Zn, or a combination thereof. The cathode can include, or can be, one or more platinum group metals. The cathode can include, or can be, lead. The cathode can include, or can be, platinum.

In various embodiments, the cathode can include, or can be, Ni, Pd (e.g., Pd foil or Pd on C), Pt, or a combination thereof. The electrocatalytic hydrogenation can yield a product that includes adipic acid. The adipic acid can be formed with any suitable selectivity, such as about 80% to about 100%, or about 90% to about 100%, or about 95% to about 100%, or about 80% or less, or less than, equal to, or greater than about 81%, 82, 83, 84, 85, 86, 87, 88, 89, 90, 91, 92, 93, 94, 95, 96, 97, 98, 99, 99.9, 99.99, or about 99.999% or more, or about 100%.

In various embodiments, the cathode can include Cu, Fe, Pb, Sn, Ti, Zn, or a combination thereof. The cathode can include or can be Pb. The electrocatalytic hydrogenation can yield a product that includes trans-3-hexene-1,6-dioic acid. The trans-3-hexene-1,6-dioic acid can be formed with any suitable selectivity, such as about 40% to about 100%, about 80% to about 100%, or about 90% to about 100%, or about 95% to about 100%, or about 40% or less, or less than, equal to, or greater than about 45, 50, 55, 60, 65, 70, 75, 80, 81%, 82, 83, 84, 85, 86, 87, 88, 89, 90, 91, 92, 93, 94, 95, 96, 97, 98, 99, 99.9, 99.99, or about 99.999% or more, or about 100%. The muconic acid can be converted with any suitable percent conversion, such as about 40% to about 100%, about 80% to about 100%, or about 90% to about 100%, or about 95% to about 100%, or about 40% or less, or less than, equal to, or greater than about 45, 50, 55, 60, 65, 70, 75, 80, 81%, 82, 83, 84, 85, 86, 87, 88, 89, 90, 91, 92, 93, 94, 95, 96, 97, 98, 99, 99.9, 99.99, or about 99.999% or more, or about 100%.

The electrocatalytic hydrogenation of the muconic acid can occur with any suitable faradaic efficiency, such as about 2% to about 100%, or about 30% to about 100%, or about 2% or less, or less than, equal to, or greater than about 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 25, 30, 35, 40, 45, 50, 55, 60, 65, 70, 75, 80, 81, 82, 83, 84, 85, 86, 87, 88, 89, 90, 91, 92, 93, 94, 95, 96, 97, 98, 99, 99.9, 99.99, or about 99.999% or more, or about 100%.

During the electrocatalytic hydrogenation the cathode can have any suitable catalytic turnover frequency, such as about $0.01 \text{ s}^{-1}$ to about $120 \text{ s}^{-1}$, about $0.01 \text{ s}^{-1}$ to about $60 \text{ s}^{-1}$, about $0.10 \text{ s}^{-1}$ to about $35 \text{ s}^{-1}$, or about $0.01 \text{ s}^{-1}$ or less, or less than, equal to, or more than about $0.1 \text{ s}^{-1}$, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.5, 7, 7.5, 8, 8.5, 9, 9.5, 10, 11, 12, 13, 14, 15, 16, 17, 18, 19, 20, 25, 30, 35, 40, 45, 50, 55, or about $60 \text{ s}^{-1}$ or more.

Method of Making a Polymer.

In various embodiments, the present invention provides a method of making a polymer. In some embodiments, the method can include performing an embodiment of the method of electrocatalytically hydrogenating muconic acid described herein, and polymerizing one or more products thereof along with one or more other compounds to form a polymer. The polymer can have any suitable structure. In other embodiments, the method includes polymerizing 2-hexene-1,6-dioic acid, the 3-hexene-1,6-dioic acid, or a combination thereof, with another compound, to form a polymer, wherein the 2-hexene-1,6-dioic acid and the 3-hexene-1,6-dioic acid are made by any suitable method and not necessarily by an embodiment of the method of electrocatalytically hydrogenating muconic acid described herein.

The method of making a polymer can include performing an embodiment of the method of electrocatalytically hydrogenating muconic acid described herein to form 2-hexene-1,6-dioic acid, the 3-hexene-1,6-dioic acid, the adipic acid, or a combination thereof. The method can include polymerizing the 2-hexene-1,6-dioic acid, the 3-hexene-1,6-dioic acid, the adipic acid, or a combination thereof, with another compound, to form a polymer.

The method of making a polymer can include performing an embodiment of the method of electrocatalytically hydrogenating muconic acid described herein to form 2-hexene-1,6-dioic acid, the 3-hexene-1,6-dioic acid, adipic acid, or a combination thereof. The method can include polymerizing the 2-hexene-1,6-dioic acid, the 3-hexene-1,6-dioic acid, the adipic acid, or a combination thereof, with a compound having the structure $H_2N-(C_1-C_{20})$alkylene-$NH_2$, $HO-(C_1-C_{20})$alkylene-$NH_2$, $HO-(C_1-C_{20})$alkylene-$OH$, a salt thereof, or a combination thereof, wherein the $(C_1-C_{20})$ alkylene group is substituted or unsubstituted, to form a polymer.

The polymerizing can form a polymer including a repeating group having the structure:

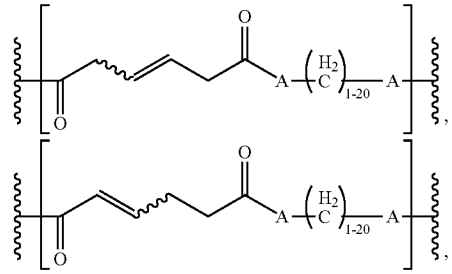

a salt thereof, or a combination thereof. At each occurrence -A- is independently chosen from —NH— and —O—.

The polymerizing can form a polymer including a repeating group having the structure:

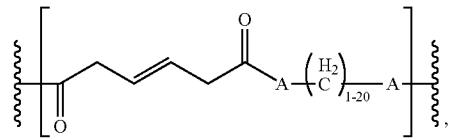

or a salt thereof. At each occurrence -A- is independently chosen from —NH— and —O—.

In various embodiments, the compound having the structure $H_2N-(C_1-C_{20})$alkylene-$NH_2$ is hexamethylenediamine, and the polymerizing forms a polymer including a repeating group having the structure:

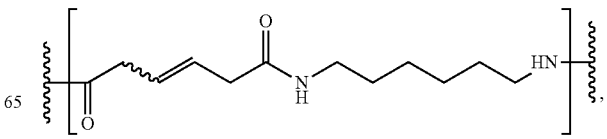

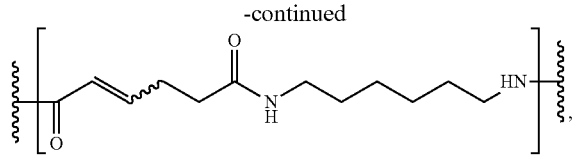

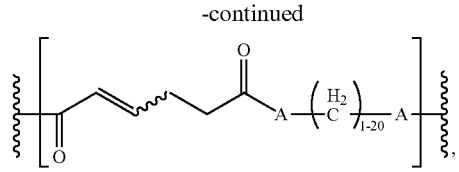

a salt thereof, or a combination thereof.

The method can include forming adipic acid via an embodiment of the electrocatalytic hydrogenation of muconic acid. The method can include polymerizing the adipic acid with another compound, to form a polymer. The method can include polymerizing the adipic acid with a compound having the structure $H_2N$—$(C_1$-$C_{20})$alkylene-$NH_2$ or a salt thereof, wherein the $(C_1$-$C_{20})$alkyl group is substituted or unsubstituted, to form a polymer. The compound having the structure $H_2N$—$(C_1$-$C_{20})$alkylene-$NH_2$ can be hexamethylenediamine, wherein the polymer is nylon 6,6. The polymerizing can form a polymer including a repeating group having the structure:

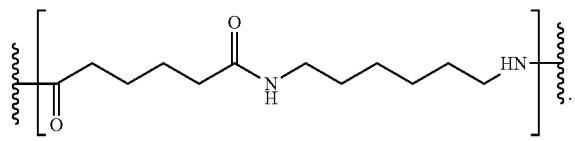

In various embodiments, the present invention provides a method of forming a polymer including polymerizing 2-hexene-1,6-dioic acid, the 3-hexene-1,6-dioic acid, or a combination thereof, with another compound, to form a polymer, wherein the 2-hexene-1,6-dioic acid and the 3-hexene-1,6-dioic acid are not necessarily formed via an embodiment of the method of electrocatalytically hydrogenating muconic acid.

In various embodiments, the present invention provides a method of forming a polymer including polymerizing the 2-hexene-1,6-dioic acid, the 3-hexene-1,6-dioic acid, or a combination thereof, with a compound having the structure $H_2N$—$(C_1$-$C_{20})$alkylene-$NH_2$ or a salt thereof, wherein the $(C_1$-$C_{20})$alkyl group is substituted or unsubstituted, to form a polymer, wherein the 2-hexene-1,6-dioic acid and the 3-hexene-1,6-dioic acid are not necessarily formed via an embodiment of the method of electrocatalytically hydrogenating muconic acid.

Polymer.

In various embodiments, the present invention provides a polymer. The polymer need not be formed from the hydrogenation products of muconic acid. The polymer can be any suitable polymer that has a structure that can be formed by polymerizing the products of an embodiment of the electrocatalytic hydrogenation of muconic acid described herein, wherein the polymer can be formed in any suitable way.

The polymer can include a repeating group having the structure:

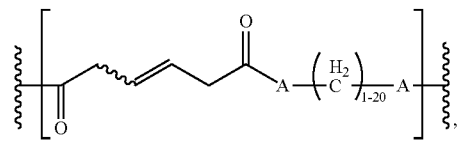

a salt thereof, or a combination thereof. The —NH—$(CH_2)_{1-20}$—NH— group can be substituted or unsubstituted. At each occurrence -A- is independently chosen from —NH— and —O—.

The repeating group of the polymer can have the structure:

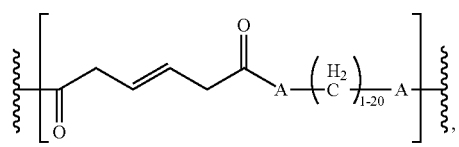

or a salt thereof. The —NH—$(CH_2)_{1-20}$—NH— group can be substituted or unsubstituted. At each occurrence -A- is independently chosen from —NH— and —O—.

The repeating group of the polymer can have the structure:

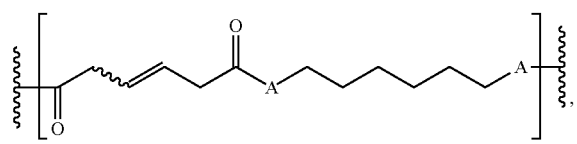

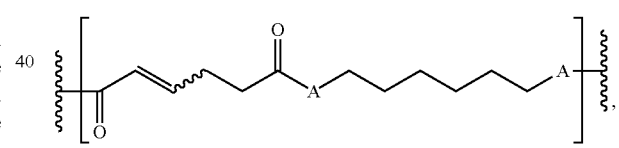

a salt thereof, or a combination thereof. At each occurrence -A- is independently chosen from —NH— and —O—.

The repeating group of the polymer can have the structure:

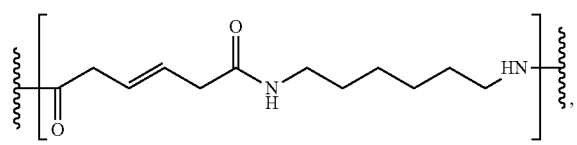

or a salt thereof.

EXAMPLES

Various embodiments of the present invention can be better understood by reference to the following Examples which are offered by way of illustration. The present invention is not limited to the Examples given herein.

Part 1.

Example 1-1. Electrocatalytic Hydrogenation of Muconic Acid in 1% Formic Acid (1-1)(A). Catalysts/Chemicals.

A ⅜" diameter lead wire was purchased from Rotometals (99.9%). A 3" section of the purchased lead wire was used as the catalyst. A coiled platinum electrode (99.9%) was purchased from Pine Research Instrumentation. Formic acid was purchased from Sigma (99%). Trans,trans-muconic acid (98%) and cis,cis-muconic acid (>97%) were purchased from Aldrich. All aqueous solutions were formed using Millipore water (18.0 MΩ).

(1-1)(B). Electrochemical Cell.

Electrocatalytic hydrogenation studies of muconic acid (MA) were carried out in a three-electrode electrochemical cell (1) depicted in FIG. 1. The container (2) was about 2.54 cm in diameter and about 3.8 cm high. The electrolyte level (3) shown is approximate. Current was passed through an aqueous reaction medium (3) including 1% formic acid in water (electrolyte) and varying concentrations of muconic acid. An Ag/AgCl reference electrode in 3 M NaCl ($E^0$=+0.194 V vs. NHE) (6) and platinum counter electrode (7) were purchased from BioLogic Science Instruments. Controlled voltage was applied using a Biologic VSP-300 potentiostat from BioLogic Science Instruments (not shown). The electrolyte was agitated via magnetic stirring using stir bar (4).

Scheme 3 provides the conversion, selectivity, and faradaic efficiency (e.g., electron efficiency) calculations where n are the number of electrons transferred, F is Faraday's constant, I is the current passed during the electrocatalytic hydrogenation at duration t.

$$\text{Conversion } MA = \left(1 - \frac{[MA]}{[MA_0]}\right) * 100 \quad \text{Scheme 3}$$

$$\text{Selectivity } HDA = \frac{[HDA]}{([MA_0] - [MA])} * 100$$

$$\text{Faradaic Efficiency (\%)} = \frac{\text{Electrons consumed by hydrogenation of organic compounds}}{\text{Total electrons passed}} * 100.$$

(1-1)(C). Electrocatalytic Hydrogenation of Muconic Acid in 1% Formic Acid.

Figure 2A:
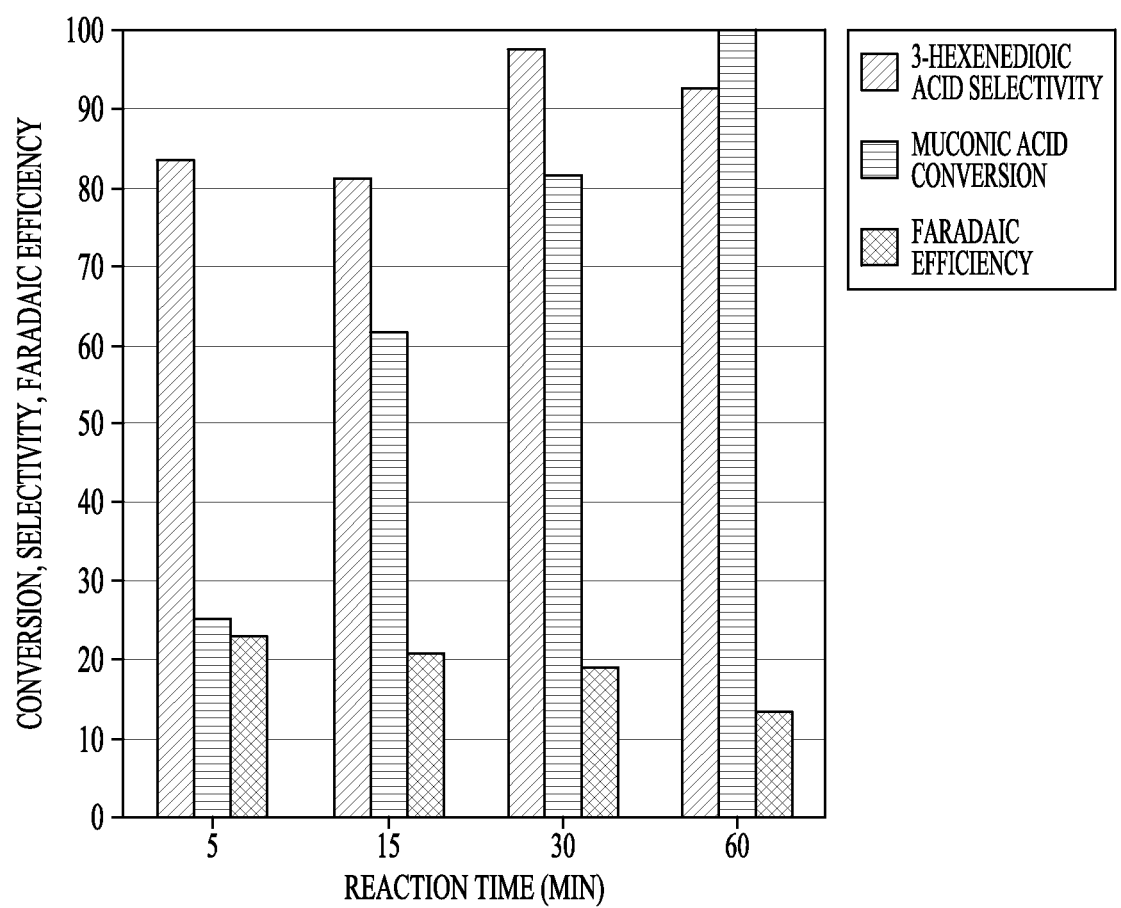
FIG. 2A-B are bar graphs depicting the conversion, selectivity and Faradaic efficiency using the lead/Pt coil electrocatalysts when converting muconic acid (MA) to 3-hexene-1,6-dioic acid (HDA), according to various embodiments.
Figure 2B:
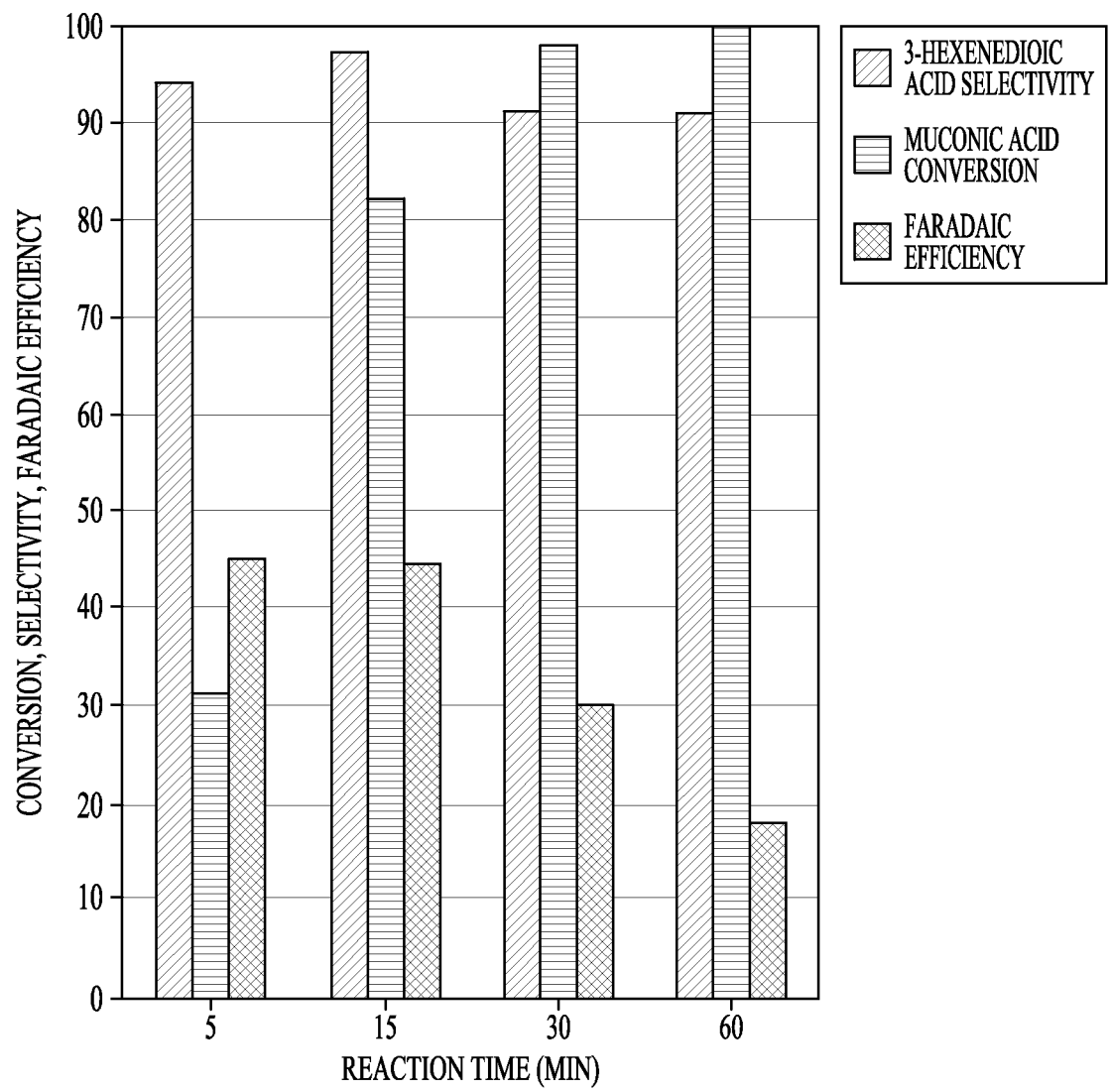

Before each experiment, the lead wire was polished with a Kimwipe. The reference, counter, and working electrode were subsequently inserted into the three-electrode electrochemical cell containing 11 mL of the aqueous reaction medium. A constant voltage between −0.8 to −1.8 V vs. Ag/AgCl in 3M NaCl was applied to the cell for 1 h. The solution was left at ambient temperature and pressure through the reaction. During the experimental duration, 0.5 mL of reaction medium was taken at 5 min., 15 min., 30 min., and 60 min. to quantify product composition. Product conversion and selectivity towards 3-hexene-1,6-dioic acid (HDA), the only observed product with evaporative light scattering detection after separation by ultra-performance liquid chromatography, at 60 min. is displayed in Table 1 and in FIGS. 2A-B for three electrocatalytic hydrogenations.

TABLE 1

Conversion, selectivity, and electron efficiency of muconic acid hydrogenation.

| Voltage (V) | Starting Muconic Acid Isomer | (ppm) | Run time (min.) | Conversion MA (%) | Selectivity HDA (%) | Faradaic Efficiency (%) |
|---|---|---|---|---|---|---|
| −0.8 | Cis,Cis | 170 | 60 | 100 | 87 | 27 |
| −1.5 | Cis,Cis | 170 | 60 | 100 | 93 | 13 |
| −1.8 | Cis,Cis | 170 | 60 | 100 | 91 | 18 |
| −1.5 | Trans,Trans | 2000 | 60 | 89* | — | — |

Using the Pt electrode, at −1.2 V for about 22 h, the cis,cis-muconic acid yielded a mixture of adipic acid and HDA with 100% conversion of 170 ppm muconic acid.

Example 1-2. Hydrogenation of Muconic Acid in Fermentation Broths (1-2)(A). Catalysts/Chemicals.

A ⅜" diameter lead wire was purchased from Rotometals (99.9%). A 3" section of the purchased lead wire was used as the catalyst. A coiled platinum electrode (99.99%) was purchased from Pine research instrumentation.

Formic acid was purchased from Sigma (99%), trans, trans-muconic acid (98%) and cis,cis-muconic acid (>97%) were purchased from Aldrich. D-Glucose was purchased from Fisher Scientific (BP350-1), yeast nitrogen base without amino acids and ammonium sulfate were purchased from BD Diagnostic Systems (DF0335-15-9), ammonium sulfate was purchased from Fisher Scientific (BP212R-1), and complete supplement mixture (CSM) of amino acids was purchased from MP Biomedicals (MP11451031). Cis,trans-muconic acid was synthesized by allowing cis,cis-muconic acid to isomerize at room temperature in water for five days. All solutions were synthesized in Millipore water (18.0 MΩ).

(1-2)(B). Fermentation.

The fermentation broth used was yeast synthetic complete (YSC) medium composed of 1.7-g/L yeast nitrogen base without amino acids and without ammonium sulfate; 5000 ppm ammonium sulfate; 20-g/L d-glucose; and the corresponding complete supplement mixture (CSM) uracil-dropout mix (e.g., a mixture including all standard amino acids except uracil). The fermentations were carried out for 5 days in baffled flasks at 30° C. and 250 rpm to convert glucose to muconic acid.

(1-2)(C). Electrochemical Cell.

Electrocatalytic hydrogenation studies of muconic acid (MA) were carried out in the three-electrode electrochemical cell depicted in FIG. 1. Current was passed through one of two aqueous reaction mediums containing various concentrations of muconic acid shown in Table 2. Electrocatalytic reactions were performed directly after the fermentation. An Ag/AgCl reference electrode in 3 M NaCl ($E^0$=+0.194 V vs NHE) and platinum counter electrode were purchased from BioLogic Science Instruments. Controlled voltage was applied using a Biologic VSP-300 potentiostat from BioLogic Science Instruments.

(1-2)(D). Electrocatalytic Hydrogenation of Muconic Acid.

Before each experiment, the lead wire was polished with a Kimwipe and the coiled platinum wire was sonicated in water. The reference, counter, and working electrode were subsequently inserted into the three-electrode electrochemical cell containing the 11 mL of the aqueous reaction medium. A constant voltage of −1.5 V vs. Ag/AgCl in 3M NaCl was applied to the cell for 50 min to 2.0 h. The solution was left at ambient temperature and pressure through the reaction. During the experimental duration, 0.5 mL of reaction medium was taken at varying intervals throughout the reaction to analyze product composition. Product conversion, selectivity, and faradaic efficiency towards 3-hexene-1,6-dioic acid (HDA) after the reaction duration is displayed for 3 electrocatalytic hydrogenations in "Synthetic" (2) and "Working" broths (3). A summary of the results is given in Table 2. The composition of the broths is given in Table 3.

TABLE 2

Hydrogenation of Muconic Acid in Broths.

| Catalyst | Voltage (V) Ag/AgCl | Reaction Medium/Starting Muconic Acid Isomer | Starting Muconic Acid (ppm) | Sampling Interval (min) | Run time (min) | Conversion MA after experimental duration (%) | Selectivity HDA (%) | Faradaic Efficiency HDA (%) |
|---|---|---|---|---|---|---|---|---|
| Pb | −1.5 | 3 | 212 | 10, 20, 30, 40, 50 | 50 | 85 | 85 | 11 |
| Pb | −1.5 | 2, Cis,Trans | 425 | 20, 40, 60, 80, 100, 120 | 120 | 100 | 95 | 12 |
| Pb | −1.5 | 3 | 69 | 5, 15, 30, 60 | 60 | 90 | 88 | 5 |

TABLE 3

| Reaction Medium | Reaction Medium Label | Muconic Acid Concentration (ppm) |
|---|---|---|
| 1% formic acid, 5000 ppm ammonium sulfate, 600 ppm amino acids | 2 | 425 |
| Fermentation Broth | 3 | 69,212 |

Conducting the conversion on the yeast fermentation broth converted glucose to muconic acid yielded equivalent results to the results obtained in Example 1, as shown on Table 2. Conducting the hydrogenation on a synthetic aqueous yeast fermentation medium including muconic acid, ammonium sulfate, and selected amino acids yielded equivalent results to the results obtained in Example 1, at about −1.2 V to −1.5 V for 40-120 min, as shown in Table 2.

Part 2.

Figure 3:
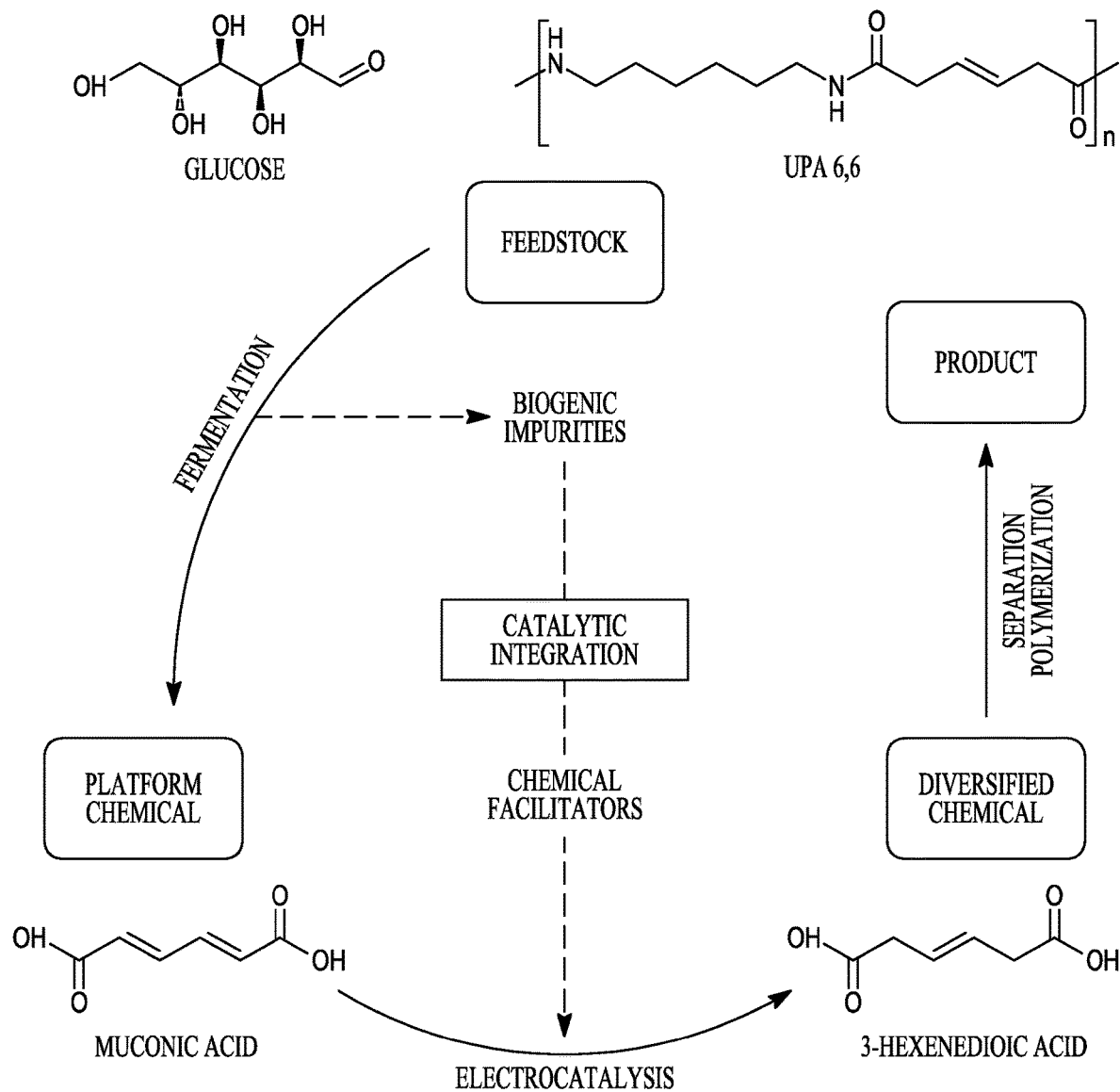
FIG. 3 illustrates the integrated conversion of glucose to UPA 6,6, in accordance with various embodiments.

Using bio- and chemical catalysis, glucose is converted into bio-based unsaturated nylon 6,6 (UPA 6,6). An engineered strain of *Saccharomyces cerevisiae*, with the highest reported muconic acid titer of 559.5 mg L$^{-1}$ in yeast, was used as the initial biocatalyst to convert glucose into muconic acid (MA). Without any separation, muconic acid was further electrocatalytically hydrogenated (ECH) to 3-hexenedioic acid (HDA) with 94% yield, despite the presence of all the biogenic impurities. Bio-based unsaturated nylon 6,6 (unsaturated polyamide 6,6) was finally obtained by polymerization of 3-hexenedioic acid with hexamethylenediamine (HMDA), to yield the desired UPA 6,6, demonstrating the integrated design of bio-based polyamides from glucose. FIG. 3 illustrates the integrated conversion of glucose to UPA 6,6. The catalytic integration was enabled by the compatibility of the process parameters. Replacing conventional high-pressure hydrogenation by direct ECH promoted a seamless flow between the processes. This removed the need of intermediate separation and allowed the use of the broth water, salts, and impurities as an electrolyte and hydrogen source.

Example 2-1. Electrocatalytic Hydrogenation (2-1)(A). Materials and Methods.

The electrochemical studies were conducted in a three-electrode electrochemical cell using a BioLogic VSP-300 potentiostat. The Ag/AgCl in NaCl reference electrode and platinum counter electrode were purchased from BioLogic Science Instruments. The working electrode was purchased from Rotometals (Lead rod, 99.9%). Electrocatalytic hydrogenation experiments were performed in 11 mL of reacting medium with a stir bar at 700 rpm. During the chronoamperometry experiments, 0.5 mL samples of the reaction medium were taken at 5 min, 15 min, 30 min, and 60 min for analysis.

Samples were subsequently analyzed either by ultra-performance liquid chromatography (UPLC) or $^1$H NMR. For NMR analysis, the samples were dried at room temperature, reconstituted in deuterium oxide, and analyzed with a Bruker 600 MHz NMR spectrometer (AVIII600). UPLC analysis was performed with a Waters H-Class Acquity chromatograph equipped with a HSS C18 Column (1.8 µm, 2.1×100 mm) and photo-diode array detector. Samples were prepared by filtration with a 2 µm syringe filter. The mobile phase was a 100% methanol solution (Solution A) and 1% acetic acid (Solution B) in nanopure-water. The method was as follows: 0.35 ml min$^{-1}$ of 4% Solution A and 96% of Solution B for 4.5 min followed by ramping A to 50% (50% B) and maintained until min 6. The composition of the mobile phase was reverted to 4% Solution A and 96% Solution B and maintained for 8 additional min. The column was maintained at 45° C. and the sample reservoir at 15° C. ACS grade cis, cis-MA was used to synthesize cis, trans-MA by heating in water at 75° C. for 25 min. trans-HDA (Sigma, St Louis, Mo.) and cis, trans-MA were used for UPLC calibration and as references. Retention times of cis, trans-MA and trans-HDA are 6.4 min and 4.0 min and were analyzed at 295 nm and 231 nm respectively. Conversions and selectivities, were calculated with the following equations:

$$MA \text{ Conversion } (\%) = \left(1 - \frac{[MA]_t}{[MA]_0}\right) * 100$$

$$HDA \text{ Selectivity } (\%) = \frac{[HDA]_t}{[MA]_0 - [MA]_t} * 100$$

Voltage and pH studies were performed on MA in $K_2SO_4$/$H_2SO_4$ electrolyte solutions in order to keep ionic strength and conductivity constant. A 0.1 M $K_2SO_4$ with 1.41 mM MA solution was mixed in varying ratios with 0.1 M $H_2SO_4$ and 1.41 mM MA. The solutions with the specified pH were ECH in the 11 mL small volume cell. In-between experiments, the electrodes were rinsed with DI water and the lead electrode was polished with a kimwipe.

ECH of the fermentation medium was performed as follows. Directly after the fermentation, 11 mL of broth was put in a small volume cell. At the start of the ECH, the surface of a lead electrode was polished with a kimwipe and used as the electrocatalyst. In-between the successive batch reactions, the lead electrode was gently dipped in deionized water, dried, and put in another 11 mL solution of the fermentation medium. In addition, the counter and reference electrodes were washed with deionized water in-between each run. To achieve a 94% yield of 3-hexenedioic acid (HDA) the pH of the fermentation broth was decreased to 2.0 by dropwise adding 0.5 M $H_2SO_4$. Additionally, the concentration of MA was increased to 2.4 mM.

(2-1)(B) Results and Discussion.

A fermentation broth containing MA was produced from a genetically engineered strain of diploid yeast, yielding 14 $mg_{MA}$ per $g_{glucose}$, the highest yield among the aromatic amino acid-based metabolites that have been produced in yeast in batch fermentation. The fermentation broth was subsequently hydrogenated in a three-electrode electrochemical cell, as illustrated in FIG. 1. Electrocatalysis was preferred over conventional high-pressure hydrogenation as hydrogen is produced in situ by water splitting, the reaction occurs under ambient temperature and pressure, and the charge on the electrode surface can mitigate poisoning. In this configuration, hydrogen production and MA hydrogenation take place simultaneously at the cathode (Scheme 4), allowing a seamless ECH.

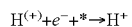

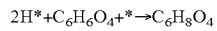 Scheme 4.

Figure 4A:
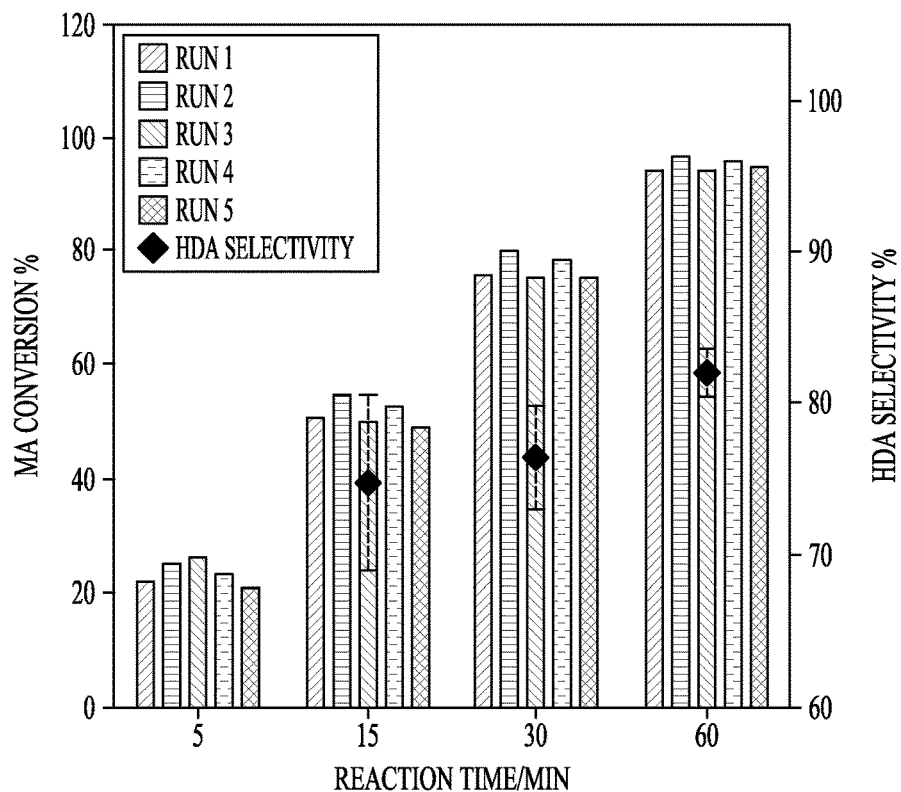
FIGS. 4A-B illustrate conversion of MA to HDA in the fermentation broth, in accordance with various embodiments.
Figure 4B:
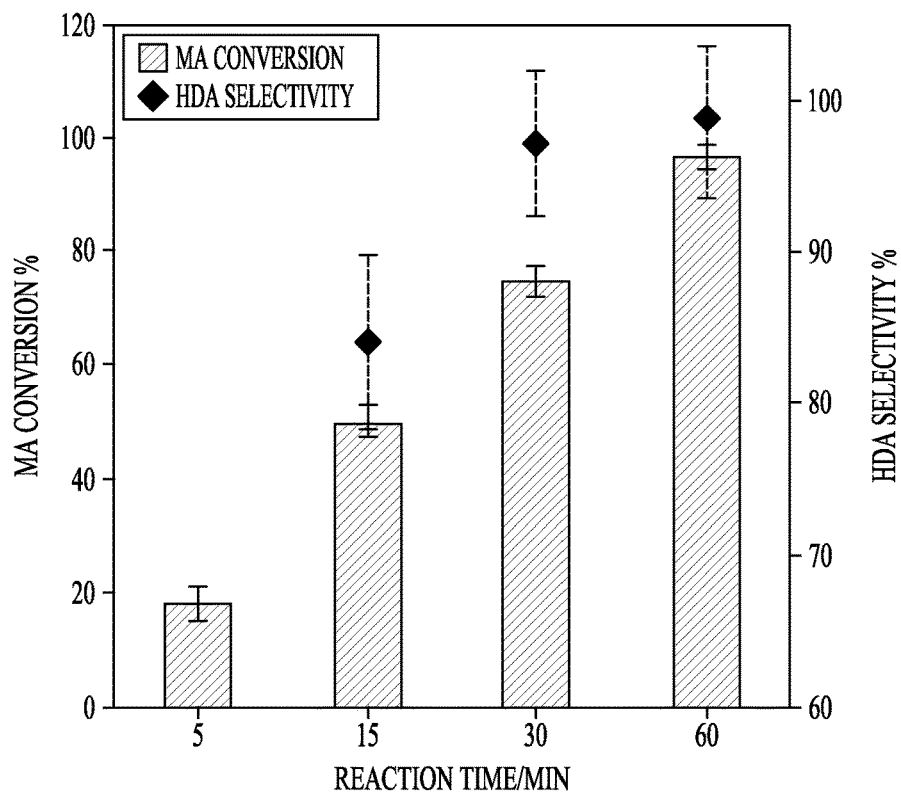

FIGS. 4A-B illustrate conversion of MA to HDA in the fermentation broth using electrocatalytic hydrogenation. The hydrogen necessary for the reaction is generated in situ (Had) at the surface of the Pb electrode. In FIG. 4A, conversion of MA and average selectivity to the desired product showed no signs of catalyst deactivation when repeating the reaction five successive times (runs 1-5). FIG. 4B illustrates MA and HDA conversion and selectivity for the ECH of the doped (pH 2.0, –1.5 V) fermentation broth.

Lead (Pb) was chosen as a catalyst based on its Earth abundance, low cost, and potential stability in the presence of sulfur. The resistance to impurities allowed the significant simplification of the hydrogenation reaction by placing the fermentation broth directly in the electrochemical reactor. The broth contained whole yeast cells, unspent salts, and biogenic impurities coming from cellular metabolism and lysis. The ECH was then allowed to proceed at room temperature and atmospheric pressure for 1 hour by applying a potential of –1.5 V vs. Ag/AgCl on a 10 cm² lead rod, resulting in 95% MA conversion with 81% selectivity to HDA. To assess the stability of the catalyst in the fermentation media (in the presence of all potential poisons), five successive one-hour electrocatalytic batch reactions were performed (FIG. 4A). Notably, no signs of deactivation were observed and leaching of the catalyst into the solution was minimal at 6.5±0.4 ppm as determined by elemental analysis.

Figure 5A:
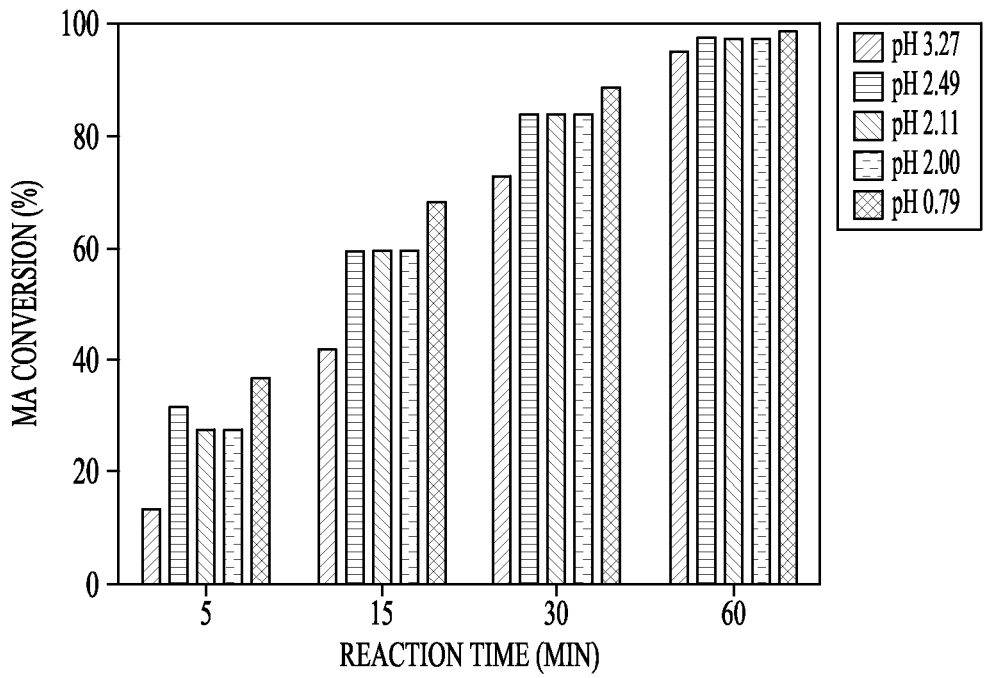
FIGS. 5A-B illustrate MA conversion and HDA selectivity versus reaction time of electrocatalytic hydrogenation (ECH) of model solutions of MA with varying pH, in accordance with various embodiments.
Figure 5B:
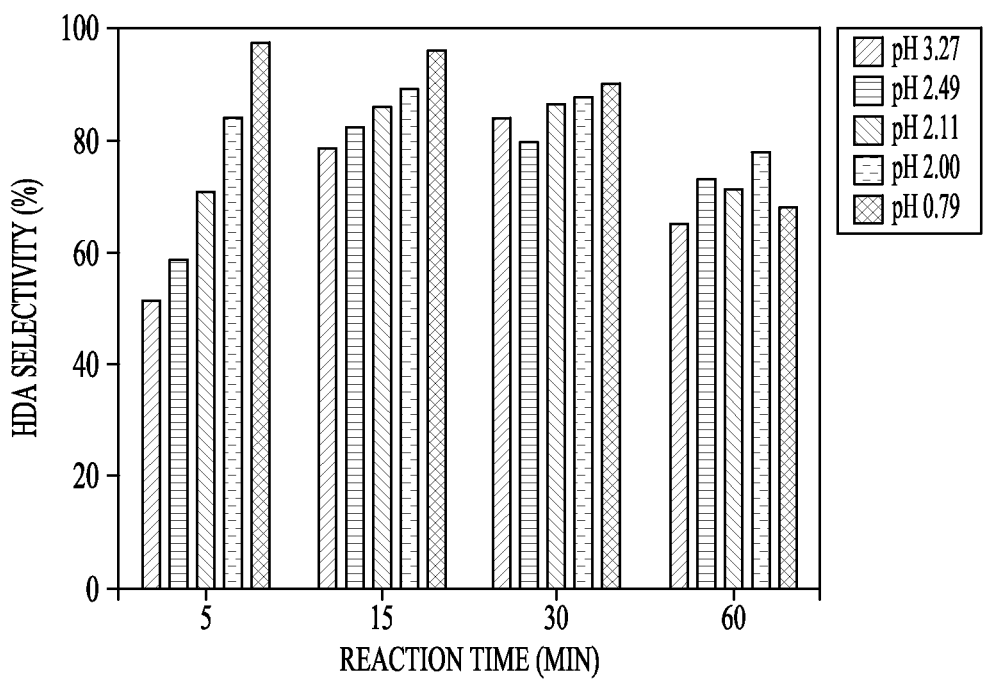

To further increase the yield of HDA, the effects of pH and applied voltage were investigated independently. A model solution of pure MA dissolved in a potassium sulfate/sulfuric acid electrolyte was used to accurately control ionic strength and to maintain a constant ionic conductivity. FIGS. 5A-B illustrate MA conversion and HDA selectivity versus reaction time of ECH of model solutions of MA with varying pH The pH in the solution was changed by adding various ratios of $K_2SO_4$ and $H_2SO_4$ to maintain the ionic conductivity. An ECH of the solution was run at –1.5 V for 1 h with the Pb catalyst. (A) MA conversion and (B) HDA selectivity. Acidic conditions favored the selective formation of HDA, especially for reaction times below 30 min.

Figure 6:
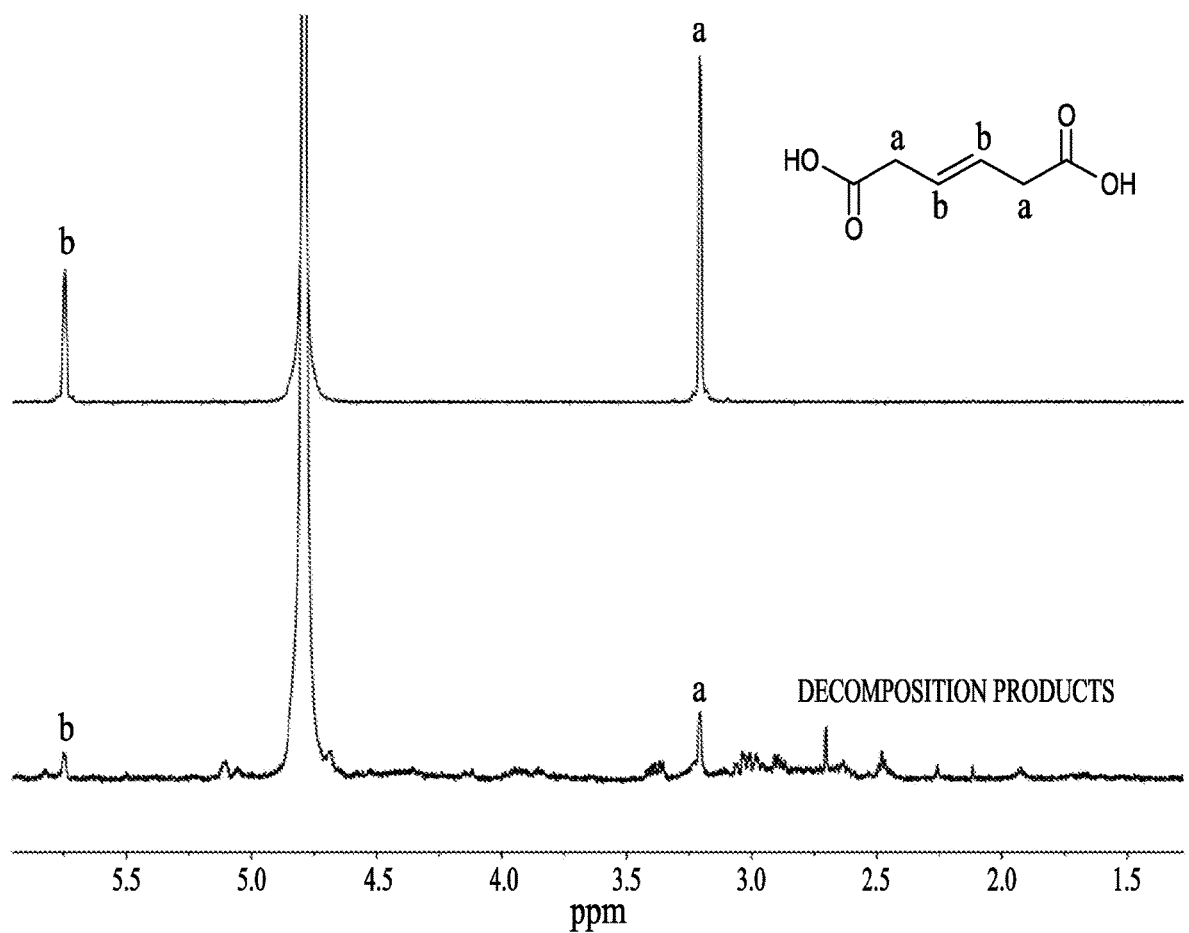
FIG. 6 illustrates $^1H$ NMR spectra of HDA subjected to −1.5 V for 2 h before (A) and after (B) reaction, in accordance with various embodiments.

FIG. 6 illustrates ¹H NMR spectra, 600 MHz, in $D_2O$, of HDA subjected to –1.5 V for 2 h before (A) and after (B) reaction. Decomposition products are shown to form after the reaction. The ¹H nuclear magnetic resonance (NMR) analysis of the HDA model solution after ECH revealed that the observed decrease in selectivity as the reaction proceeded was due to the formation of decomposition products through secondary reactions.

Figure 7A:
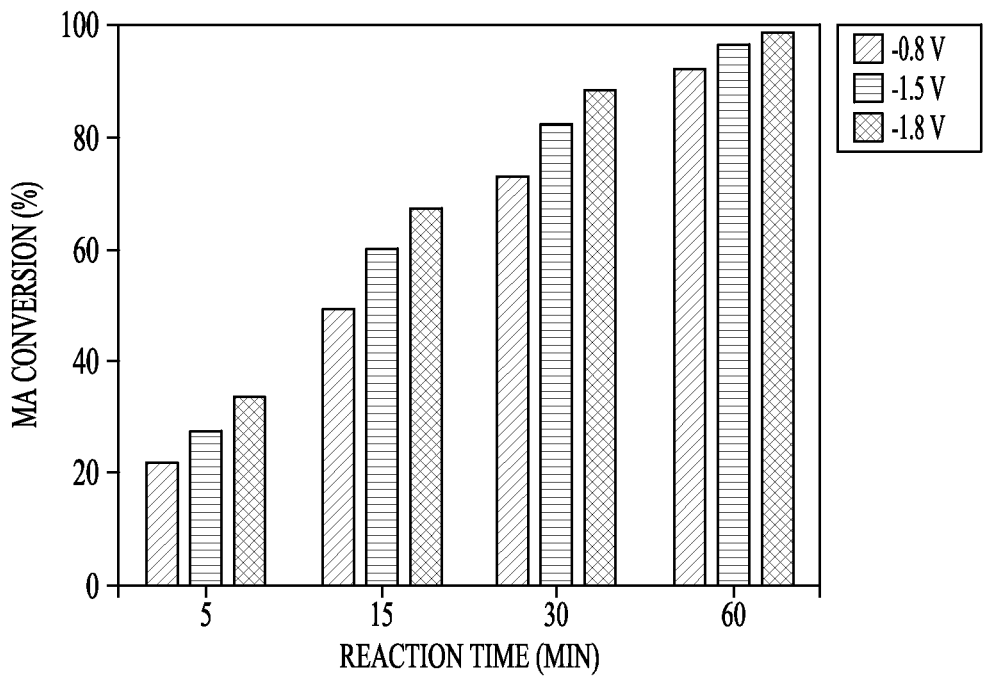
FIGS. 7A-B illustrate MA conversion and HDA selectivity versus reaction time during ECH of model solutions of MA at varying potentials, in accordance with various embodiments.
Figure 7B:
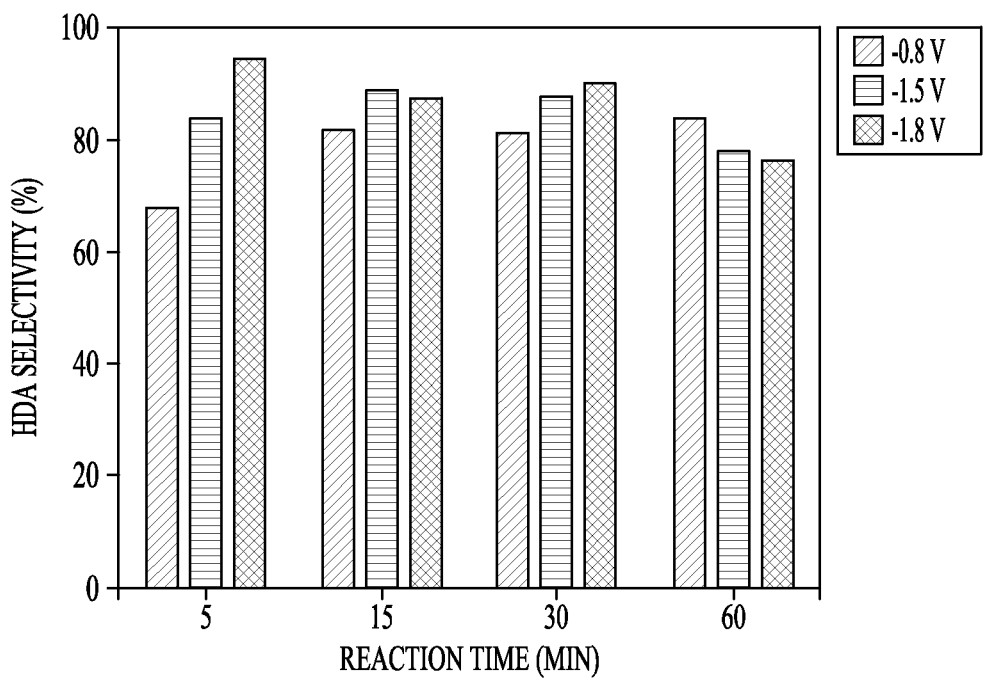

These undesired reactions were enhanced when increasing pH and/or the applied cathodic voltage (FIGS. 7A-B). FIGS. 7A-B illustrate MA conversion and HDA selectivity versus reaction time during ECH of model solutions of MA at varying potentials. The pH was fixed at 2.0 by adding 0.5 M $H_2SO_4$ to a solution of water and MA. An ECH of the solution was run for 1 h with the applied potentials. A potential of –1.5 V and a pH of 2.0 offered a compromise between conversion and selectivity.

Conditions optimized with the model solutions were found to also enhance the hydrogenation of the fermentation broth (FIG. 4C). Notably, when the pH of the solution was fixed at 2.0, the selectivity towards HDA became 98±4% at 96±2% MA conversion. It is worth noting that the yield achieved for the unpurified broth was actually higher than for the model solution (94% vs. 77%). While catalyst poisoning is a common issue for most of the hydrogenation reactions catalyzed by precious metals, it appears that the broth's impurities were beneficial in the present work as it prevented the formation of decomposition products during the ECH. The reduced decomposition when the fermentation broth is reacted suggests a competitive adsorption process with impurities in solution being sacrificed to minimize potential HDA oxidation. It is believed that this is the first time that a biologically-produced chemical was hydrogenated with high yield and selectivity directly in the fermentation broth, in the presence of diverse impurities.

Figure 8:
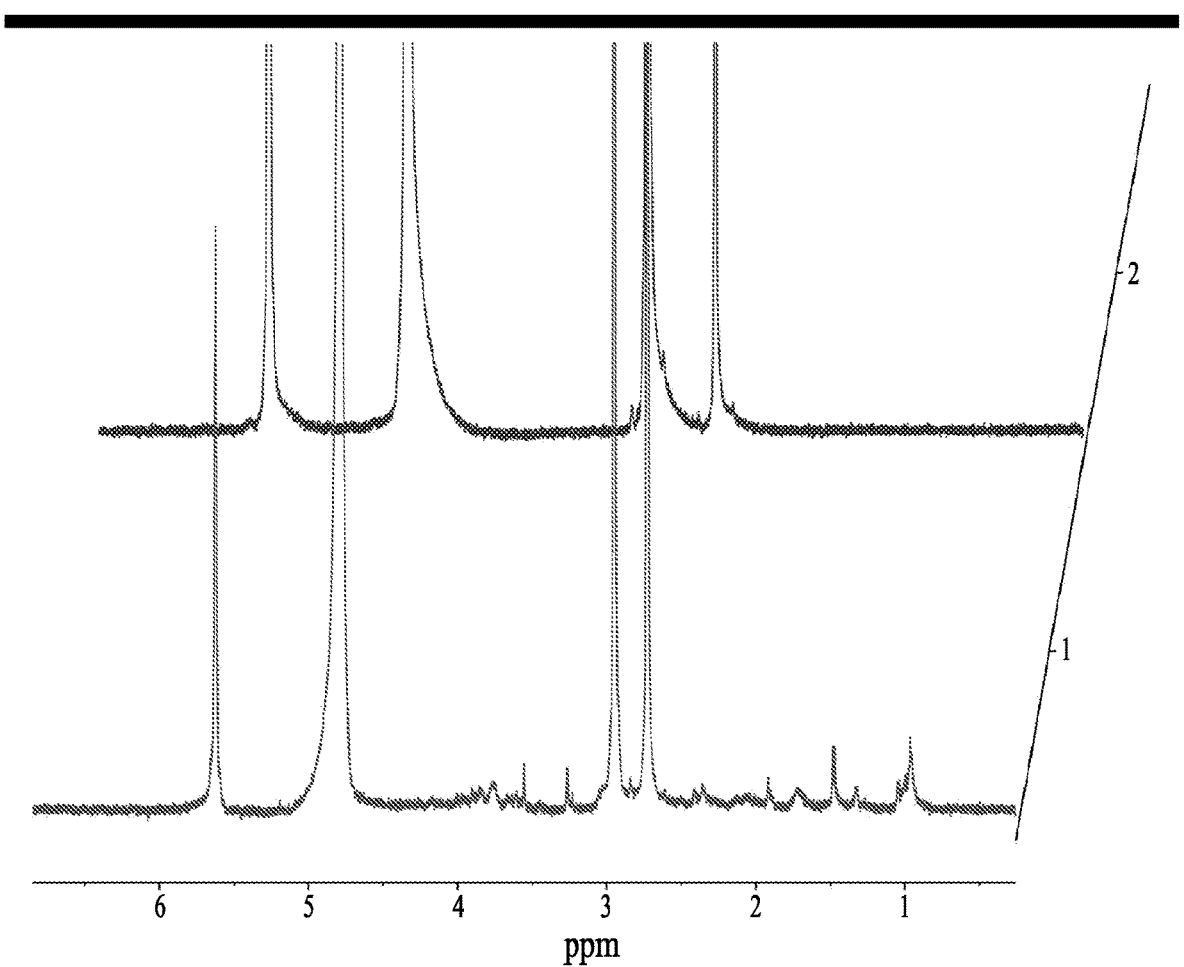
FIG. 8 illustrates a $^1$H NMR of trans-3-hexenedioic acid (t3HDA) extracted from the fermentation broth. (1) before crystallization and (2) after crystallization, in accordance with various embodiments.

FIG. 8 illustrates a ¹H NMR of trans-3-hexenedioic acid (t3HDA) extracted from the fermentation broth (1) before crystallization and (2) after crystallization Example 2-2. Polymer Synthesis and Characterization (2-2)(A). Materials and Methods.

Polycondensation. The Polycondensation Reaction Between Trans-HDA and hexamethylenediamine (HMDA) was adapted from the synthesis of nylon 6,6. Specifically, trans-HDA (TCI America) was dissolved in methanol and mixed with a 1:1 mol ratio of HMDA dissolved in methanol. The resulting solution was heated in a round bottom flask at 60° C. The liquid was decanted from the precipitated salt. The precipitated salt was subsequently washed with methanol, decanted, and left to dry in a fume hood. The solid was then mixed at a 0.86 mass ratio with deionized water. The resulting solution was put in an aluminum weigh pan and heated at 7.5° C. min$^{-1}$ to 250° C. in a tube furnace under flowing ultra-high purity nitrogen. The sample dwelled at the temperature for 30 min before cooling. It was not uncommon during the synthesis of UPA 6,6 to produce a slightly yellow colored polymer. The same synthesis procedure was applied to adipic acid and HMDA to form nylon 6,6.

Size Exclusion Chromatography (SEC).

Samples were analyzed by Polyanalytik (London, Canada). Analysis was performed in 0.05 M potassium trifluoroacetate salt in hexafluoro-isopropanol (HFIP). Samples were left to dissolve for 24 h at room temperature under gentle shaking and subsequently injected into a Viscotek TDA302 and GPCmax (ViscoGEl (Inert Mixed-Bed High Molecular Weight GPC Column & Inert Mixed-Bed Low Molecular Weight GPC Column)) with triple detection analysis. Triple detection analysis consisted of a refractive index, right angle and low angle light scattering, and a four-capillary differential viscometer in series (Table 5, FIG. 10). The absolute molecular weight of nylon 6,6 and UPA 6,6 was calculated using a dn/dc value of 0.235 mL g$^{-1}$.

Thermal Gravimetric Analysis (TGA).

Figure 11:
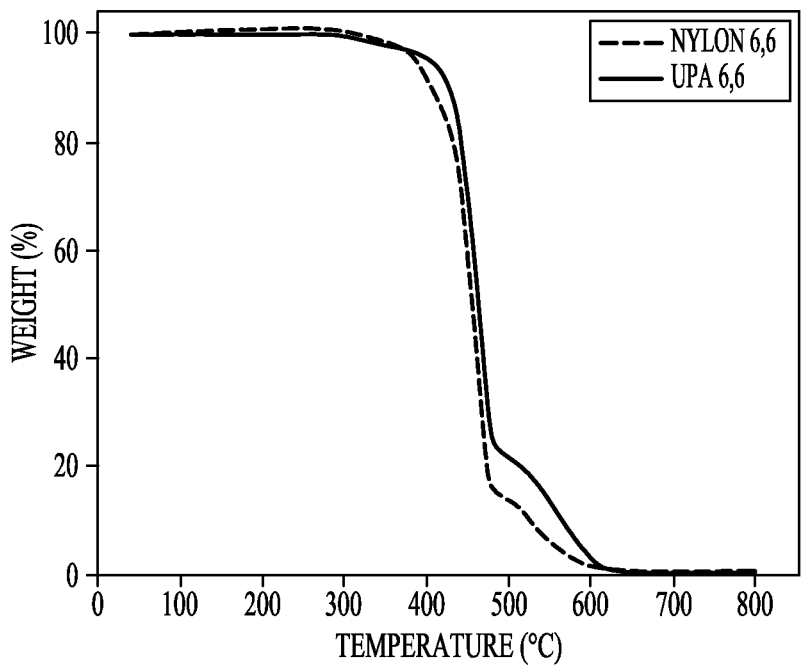
FIG. 11 illustrates thermal gravimetric analysis of nylon 6,6 and UPA 6,6, in accordance with various embodiments.

TGA analysis of all samples was performed with a Perkin Elmer STA 6000 series thermal gravimetric analyzer (FIG. 11). A small amount of each samples (<20 mg) was placed in a Al$_2$O$_3$ crucible and heated from 50 to 850° C. at 10° C. min$^{-1}$ in a 20 ml min$^{-1}$ synthetic air flow.

Differential Scanning Calorimetry (DSC).

Figure 12:
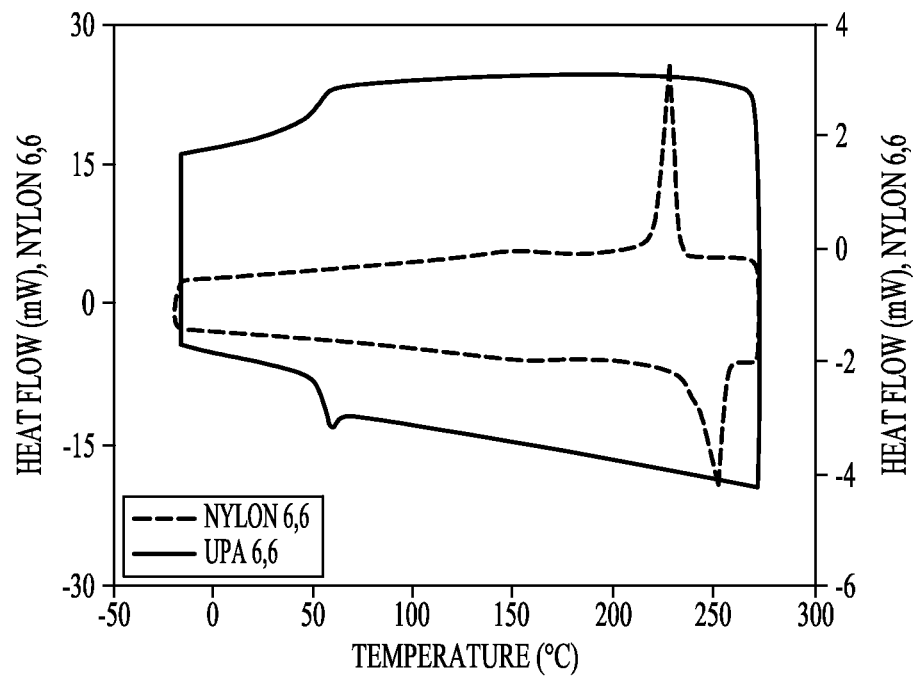
FIG. 12 illustrates differential scanning calorimetry results for nylon 6,6 and UPA 6,6, in accordance with various embodiments.

DSC experiments were conducted on a TA-Instruments Q2000 Differential Scanning Calorimeter equipped with liquid nitrogen cooling system (LNCS). Three consecutive heating and cooling runs where done for each sample (−20° C. to 300° C.) using standard aluminum pans. DSC shows UPA 6,6 has a melting point of 60° C.; while the nylon 6,6 has a melting temperature at 255° C. (FIG. 12). No apparent glass transition temperature was seen.

Rheology.

Figure 13:
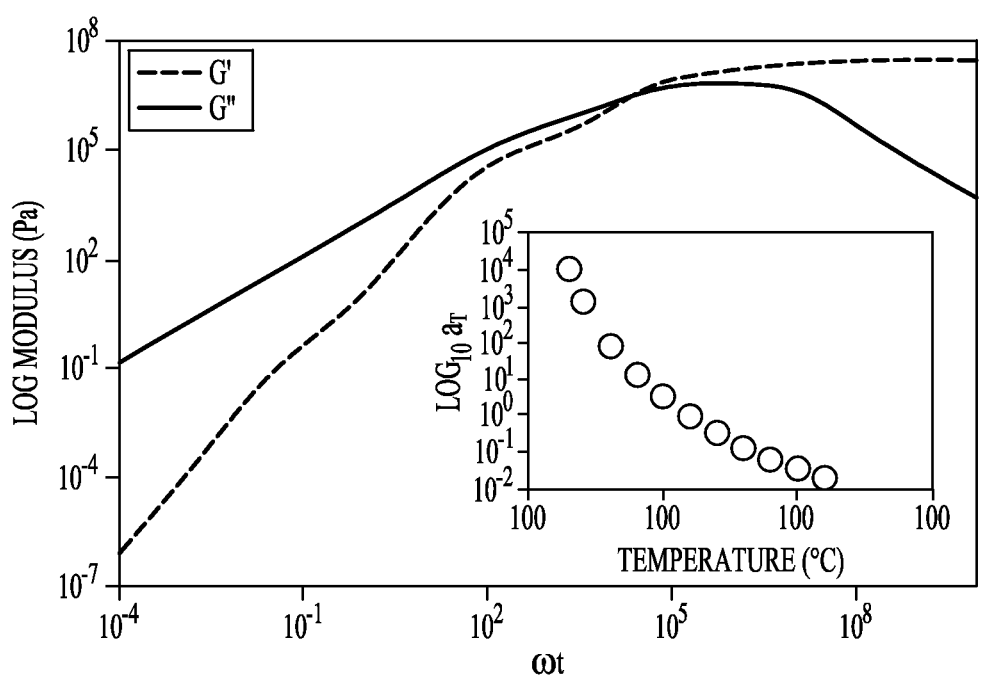
FIG. 13 illustrates a master curve of the dynamic shear moduli G' and G" for UPA 6,6 over the temperature range 50-150° C., in accordance with various embodiments.

A TA Instruments ARES-G2 strain controlled rheometer with a convection oven was used to test the diblocks rheology under nitrogen gas flow to prevent polymer degradation. Samples were tested in a parallel plate geometry using a temperature ramp test at heating rate of 10° C. and a strain of 2%. Melt rheology of UPA 6,6 shows a material with a storage modulus (G') of 18.9 MPa, a loss modulus (G") of 6.24 MPa at 55° C. and a cross-over modulus at 60° C. (FIG. 13).

X-Ray Powder Diffraction (XRD).

A SCINTAG XDS2000 powder diffractometer equipped with a Cu source (λ=1.54 Å) and a Kevex Peltier cooled silicon detector was used to test the nylon 6,6 and the UPA 6,6. A continuous scan mode with a speed of 2.0 deg min$^{-1}$ and a scan range of θ=5-95 degrees was used for the tests; the scattering wavevector amplitude q and scattering angle θ are related by q=4π/sin θ. All samples were finely ground in a ceramic mortar before transfer to a clean blank glass sample holder. Tests were done at room temperature.

(2-2)(B). Results and Discussion.

Figure 9A:
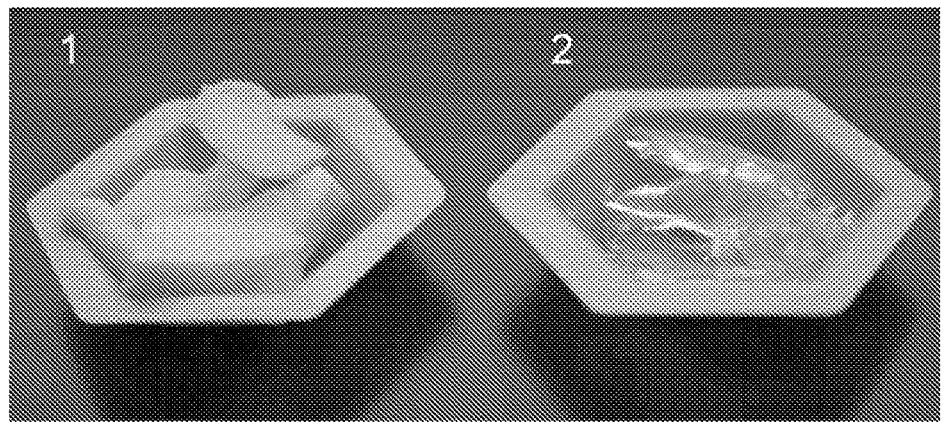
FIG. 9A illustrates 1) nylon 6,6 and 2) bio-based unsaturated nylon 6,6 (UPA 6,6), in accordance with various embodiments.
Figure 9B:
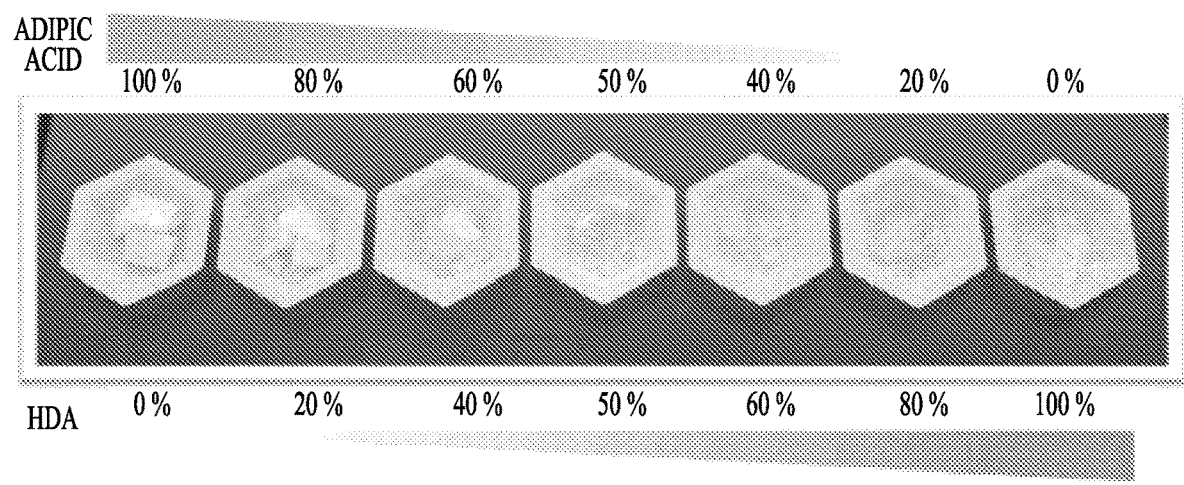
FIG. 9B illustrates polymer blends of adipic acid and HDA, in accordance with various embodiments.

In the pursuit of a fully integrated process, from glucose to a commercially viable product, the polymerization of HDA was studied. HDA has been used as a precursor to generate dodecanedioic acid, a monomer of nylon 6,12, and to produce polyester ethers with biomedical applications. This polyamide has the advantage of having an extra double bond in its backbone that can be used to incorporate additional functionality. The corresponding saturated nylon 6,6 was synthesized using adipic acid and HMDA through the same procedure in an attempt to compare the conventional petrochemical-based nylon 6,6 and the bio-based UPA 6,6 polymers. The obtained UPA 6,6 was a transparent partly crystalized material that possessed physical and chemical properties that are comparable to petrochemical nylon (Tables 4-5, FIGS. 9A-B, FIGS. 10-14). FIG. 9A illustrates 1) nylon 6,6 and 2) UPA 6,6, for which petroleum-based adipic acid was substituted with HDA. Utilizing the same synthesis technique, polymers based on blends of HDA and adipic acid were also achieved (FIG. 9B) to potentially enable different levels of crosslink and functionality e.g. for tuned hydrophobicity and hydrophilicity. FIG. 9B illustrates polymer blends of adipic acid and HDA, with percentages based on molar ratios of adipic acid and HDA reacted with a 1:1 mol ratio of HMDA.

Figure 10:
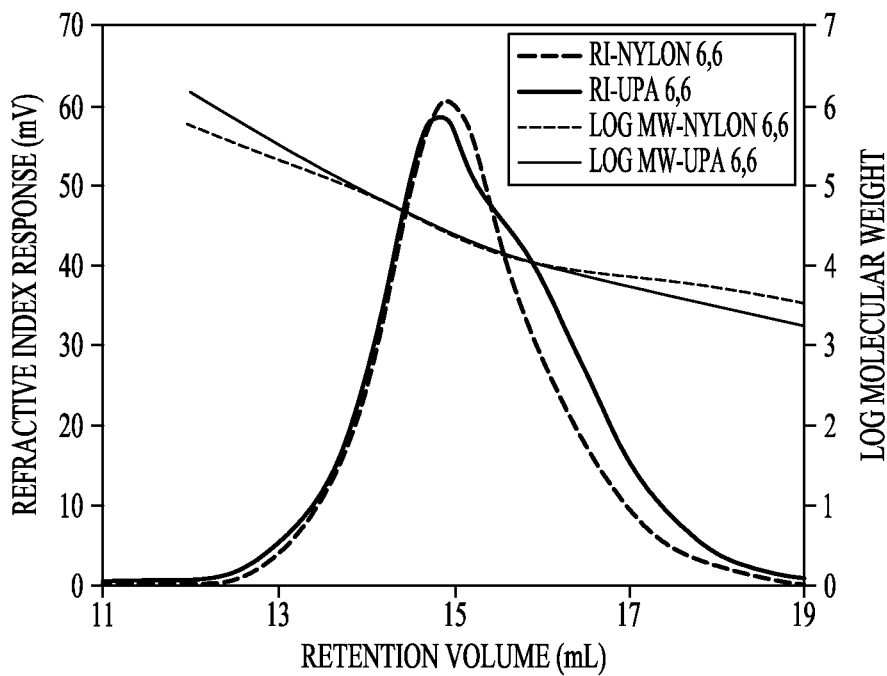
FIG. 10 illustrates an overlay from gel permeation chromatography (GPC) elution traces obtained from refractive index (RI) detector and Log MW (diagonal lines) versus retention volume for nylon 6,6 and UPA 6,6, in accordance with various embodiments.
Figure 14:
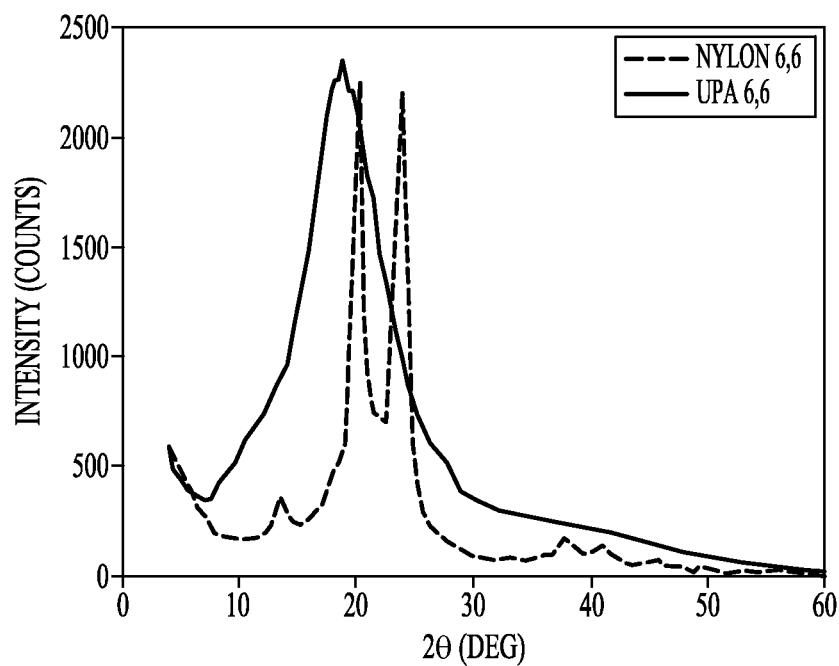
FIG. 14 illustrates an X-ray diffraction (XRD) pattern of UPA 6,6 and nylon 6,6, in accordance with various embodiments.

FIG. 10 illustrates an overlay from GPC elution traces obtained from RI detector and Log MW (diagonal lines) versus retention volume for nylon 6,6 and UPA 6,6. FIG. 11 illustrates thermal gravimetric analysis of nylon 6,6 and UPA 6,6. Nylon 6,6 showed 50% mass loss at 456° C. and UPA 6,6 showed a 50% mass loss at 463° C. FIG. 12 illustrates differential scanning calorimetry results for nylon 6,6 and UPA 6,6 (exothermic up), which displayed melting temperature of 255° C. for nylon 6,6 and 60° C. for UPA 6,6. FIG. 13 illustrates a master curve of the dynamic shear moduli G' and G" for UPA 6,6 over the temperature range 50-150° C. (reference temperature is $T_{ref}$=100° C.). The material shows classical Rouse-like behavior, common in linear low molecular weight polymer melts. The inset shows the temperature dependence of time-temperature superposition shift factors, which fit to the Williams-Landel-Ferry model with $C_1$=4.9 and $C_2$=100.84 OC. FIG. 14 illustrates an X-ray diffraction pattern of UPA 6,6 and nylon 6,6. The primary diffraction peak of UPA 6,6 had a q* at 4.7 Å$^{-1}$ and no higher order peaks. Nylon 6,6 shows the primary peak at a q* of 4.38 Å$^{-1}$ and a secondary peak at 3.7 Å$^{-1}$.

TABLE 4

The properties of Nylon 6,6 and UPA 6,6, where Mn indicates the number average molecular weight, PDI: polydispersity, Q*: primary diffraction peak, G': storage modulus, G": loss modulus, and G*c: crossover modulus.

| Property | Nylon 6,6 | UPA 6,6 |
| --- | --- | --- |
| $M_n$ (Da) | 17,800 | 12,200 |
| PDI | 2.0 | 3.36 |
| Melting Temp (° C.) | 250 | 60 |
| Q* (Å$^{-1}$) | 4.4 | 4.7 |
| G' (MPa) | — | 18.9 |
| G" (MPa) | — | 6.24 |
| G"c (° C.) | — | 60 |

TABLE 5

Triple detection SEC results of triplicate injections of UPA 6,6.
Average recovery of all injection was 101.05 ± 0.72%.

| Sample ID | Injection | $V_{peak}$ (mL) | $M_n$ (Da) | $M_w$ (Da) | $M_z$ (Da) | $M_w/M_n$ (PDI) | $[\eta]$ (dl/g) | $R_h$ (nm) | M-H α | M-H Log K |
|---|---|---|---|---|---|---|---|---|---|---|
| UPA 6,6 | 1 | 14.831 | 11,516 | 40,156 | 237,526 | 3.487 | 0.3142 | 5.124 | 0.525 | −2.823 |
| | 2 | 14.826 | 10,255 | 39,336 | 349,171 | 3.836 | 0.3131 | 5.057 | 0.519 | −2.794 |
| | 3 | 14.819 | 14,941 | 41,165 | 175,890 | 2.755 | 0.3097 | 5.24 | 0.551 | −2.961 |
| | Average | 14.825 | 12,237 | 40,219 | 254,196 | 3.359 | 0.3123 | 5.14 | 0.532 | −2.859 |
| | σ | 0.0049 | 1,980 | 748 | 71,717 | 0.45 | 0.0019 | 0.08 | 0.014 | 0.073 |
| | % RSD | 0.03% | 16.18% | 1.86% | 28.21% | 13.40% | 0.61% | 1.47% | 2.61% | 2.55% |
| Nylon 6,6 | 1 | 14.924 | 15,958 | 35,568 | 95,554 | 2.229 | 0.4538 | 5.831 | 0.573 | −2.884 |
| | 2 | 14.968 | 19,547 | 37,217 | 95,573 | 1.904 | 0.4470 | 5.941 | 0.579 | −3.006 |
| | 3 | 14.891 | 17,951 | 36,057 | 98,070 | 2.009 | 0.4592 | 5.900 | 0.580 | −2.915 |
| | Average | 14.928 | 17,819 | 36,281 | 96,399 | 2.047 | 0.4533 | 5.890 | 0.583 | −2.935 |
| | σ | 0.0315 | 1,468 | 692 | 1,182 | 0.135 | 0.0050 | 0.05 | 0.010 | 0.052 |
| | % RSD | 0.21% | 8.24% | 1.91% | 1.23% | 6.61% | 1.10% | 0.77% | 1.73% | 1.76% |

Part 3.

Electrocatalytic hydrogenation is used to hydrogenate cis, trans-MA (ctMA) to two monomers, adipic acid, and trans-3-hexenedioic acid, used for the production of nylon, nylon derivatives, and poly(ester ethers). The electrocatalytic hydrogenation considers a wide range of early, late, and post transition metals (Cu, Fe, Ni, Pb, Pd/C, Sn, Ti, and Zn) with low and high hydrogen overpotentials; this selection possesses varying degrees of metal hydrogen binding strengths. The binding strength was determined to be an important factor for the conversion rate, faradaic efficiency, and selectivity of the hydrogenation. Selectivities are also discussed in relation to thermodynamic data, which suggests the possibility to tune the kinetics of the reaction to allow for the variable production of multiple monomers. Pb and Pd/C were identified as potential catalysts for the production of trans-3-hexenedioic acid and adipic acid, respectively. trans-3-Hexenedioic acid (t3HDA) is a bio-based chemical that has been rarely observed and only in low yields during the semi-hydrogenation of MA under pressurized $H_2$. Further analysis of Pb and Pd/C revealed turnover frequencies of 5.6 $s^{−1}$ and 0.1 $s^{−1}$, respectively.

Example 3-1

(3-1)(A). Materials and Methods.

Electrocatalysis.

The electrochemical studies were conducted in a conventional single compartment three-electrode glass cell using a BioLogic potentiostat (VSP-300). All potentials in this part are in reference to the reversible hydrogen electrode (RHE). Initial experiments to determine reaction schemes and product decomposition were performed with 11 ml solution of muconic acid dissolved in 0.01 M sulfuric acid electrolyte ($H_2SO_4$). The cell was equipped with a Pt counter electrode (Biologic), an Ag/AgCl in NaCl reference electrode (Biologic), and a 10 $cm^2$ Pb rod (Rotometals, 99.9% purity) working electrode. The solutions were magnetically stirred at 700 rpm with a PTFE flea stir bar. During chronoamperometry experiments, 0.5 mil aliquots of the reaction medium were withdrawn periodically.

Catalysts screenings were conducted with a 50 ml solution of 3.52 mM ctMA and 0.26 M formic acid (electrolyte). ctMA was prepared by heating ccMA at 75° C. for 25 min. The cell was equipped with an Ag/AgCl in sat. KCl reference electrode (Pine) and Pt counter electrode (Pine Research Instruments). The working electrodes were purchased as follows: Sigma (5 wt % Pd/C), Flinn scientific (Cu, Fe, Pb, Zn), Science Company (Ni), and OnlineMetals.com (Ti). Geometric surface areas are displayed in Table 6. Prior to electrocatalysis, the electrodes were cleaned with acetone and MilliQ water, and wiped with a kimwipe. All solutions were magnetically stirred at 400 rpm with a PTFE octagonal stir bar for the duration of the catalytic test. During chronoamperometry experiments, 0.5 ml aliquots of the reaction medium were taken at 5, 15, 30, and 60 min for analysis.

TABLE 6

Geometric dimensions of metal electrodes.

| Metal | Length (mm) | Width (mm) | Thickness (mm) | Area ($cm^2$) |
|---|---|---|---|---|
| Cu | 22.0 | 12.7 | 0.3 | 5.7 |
| Fe | 22.6 | 13.0 | 0.6 | 6.1 |
| Ni | 22.8 | 19.2 | 0.9 | 9.2 |
| Pb | 20.5 | 12.0 | 0.8 | 5.2 |
| Pb (Electropolished) | 20.5 | 11.5 | 0.7 | 5.0 |
| Sn | 22.0 | 13.4 | 0.7 | 6.2 |
| Ti | 23.6 | 11.8 | 1.0 | 6.0 |
| Zn | 20.8 | 11.6 | 0.3 | 5.0 |

Product Analysis.

Samples were diluted 1:1 with MilliQ water (18.0 MΩ) and then analyzed with a Waters Acquity H-Class ultra-performance liquid chromatograph (UPLC) equipped with photodiode array (PDA) and QDa mass detectors. A Waters HSS C18 1.8 μm (2.1×100 mm) column was used to separate ctMA, ttMA, t3HDA, and AA. The MA isomers were quantified with the PDA detector set at 230 nm while t3HDA and AA were quantified with the QDa mass detector in positive and negative mode, respectively. ACS grade ccMA, ttMA, t3HDA, and AA were purchased from Sigma (St Louis, Mo.). These compounds were used for UPLC calibration and as references for NMR analysis.

$^1$H NMR analysis was performed on a Bruker 600 MHz NMR spectrometer (AVIII600). The samples were dried at room temperature under a current of air, reconstituted in deuterium oxide, and subsequently analyzed.

Optical microscopy images were acquired with an EVOS$_{fl}$ light microscope.

Computational Methods.

The geometries were initially optimized using density functional theory (DFT) with the hybrid B3LYP exchange-correlation functional, and the DZVP2 basis set. Vibrational frequencies were calculated to ensure that the optimized structures were minima. The optimized B3LYP/DZVP2 geometries were then used as starting points for G3MP2 calculations to predict gas phase heats of formation ($\Delta H_{gas}$) and the gas phase gas phase acidity ($\Delta G_{gas}$ for the reaction $AH \rightarrow A^- + H^+$). These calculations were done with the Gaussian 09 program system.

The heats of formation of the pure liquid phase were estimated using the fact that the free energy is zero at a phase change so that the enthalpy of vaporization ($\Delta H_{vap}$) can be calculated using $\Delta H_{vap} = T_{BP} \Delta S_{vap}$, where $\Delta H_{vap}$ is the enthalpy of vaporization, $T_{BP}$ is the boiling point in degrees Kelvin (K), and $\Delta S_{vap}$ is the entropy of vaporization. $\Delta S_{vap}$ is approximately constant for many compounds, and thus, for a given boiling point value, $\Delta H_{vap}$ can be estimated. It was found that $\Delta S_{vap}$=0.031 cal/mol K. The enthalpy of formation of the pure liquid phase ($\Delta H_{liq}$) is obtained as the difference between the gas enthalpy of formation and the enthalpy of vaporization: $\Delta H_{liq} = \Delta H_{gas} - \Delta H_{vap}$.

The COSMO-RS approach as implemented in the ADF program was used to estimate $T_{BP}$ from DFT results at the B88P86/TZ2P level.

The solvation component for the acidity calculations were done as follows. The solvation free energies in water at 298 K were calculated using the self-consistent reaction field approach with the COSMO parameters, as implemented in the Gaussian 03 using the B3LYP/DZVP2 gas phase geometries. For the COSMO (B3LYP/DZVP2) calculations in Gaussian 03, the radii developed by Klamt and co-workers were used to define the cavity. The aqueous Gibbs free energy (free energy in aqueous solution) ($\Delta G_{aq}$) was calculated from $\Delta G_{aq} = \Delta G_{gas} + \Delta \Delta G_{solv}$ where $\Delta G_{gas}$ is the gas phase free energy and $\Delta \Delta G_{solv}$ is the aqueous solvation free energy calculated as differences between conjugate base and the acid. A dielectric constant of 78.39 corresponding to that of bulk water was used in the COSMO calculations. The solvation energy is reported as the electrostatic energy (polarized solute-solvent). In order to improve the calculated $pK_a$ values, an approach which predicts the $pK_a$ values relative to known standards with $CH_3COOH$ as the reference acid was used. The error in the absolute calculated $pK_a$ of $CH_3COOH$ is 3.0 $pK_a$ units using a value for the free energy of solvation of the proton of −264.3 kcal/mol. The $pK_a$ values in aqueous solution relative to $CH_3COOH$ ($HA + CH_3COO^- \rightarrow A^- + CH_3COOH$) were calculated using: $pK_a' = pK_a(CH_3COOH) + \Delta G_{aq}/(2.303\ RT)$.

The calculations were performed on a Xeon-based Dell Linux cluster at the University of Alabama, and a local AMD Opteron-based and Intel Xeon-based Linux cluster from Penguin Computing.

Calculations.

Conversions, selectivities, faradaic efficiencies, dispersion, and turn over frequencies were calculated as shown in Scheme 5. The variable n is the number of electrons transferred (2=HDA, 4=Adipic acid), I is the current transferred, t is the reaction time, and F is Faraday's constant. Cis,trans-muconic acid (ctMA), trans,trans-muconic acid (ttMA), trans-3-hexenedioic acid (t3HDA), and adipic acid (AA).

$$ctMA\ \text{Conversion}\ (\%) = \left(1 - \frac{[ctMA]_t}{[ctMA]_0}\right) * 100 \quad \text{Scheme 5}$$

$$t3HDA\ \text{Selectivity}\ (\%) = \frac{[t3HDA]_t}{[ctMA]_0 - [ctMA]_t} * 100$$

$$AA\ \text{Selectivity}\ (\%) = \frac{[AA]_t}{[ctMA]_0 - [ctMA]_t} * 100$$

-continued $$ttMA\ \text{Selectivity}\ (\%) = \frac{[ttMA]_t}{[ctMA]_0 - [ctMA]_t} * 100$$

Faradaic Efficiency (%) =

$$\frac{\text{Electrons consumed by hydrogenation of organic compounds}}{\text{Total electrons passed}} * 100$$

$$\text{Dispersion}\ (\%) = \frac{\text{moles}_{Pd\ exposed}}{\text{moles}_{Pd}} * 100$$

$$TOF = \frac{\text{moles}_{MA\ converted}}{\text{moles}_{metal} * t}$$

(3-1)(B). Results and Discussion.

Figure 15:
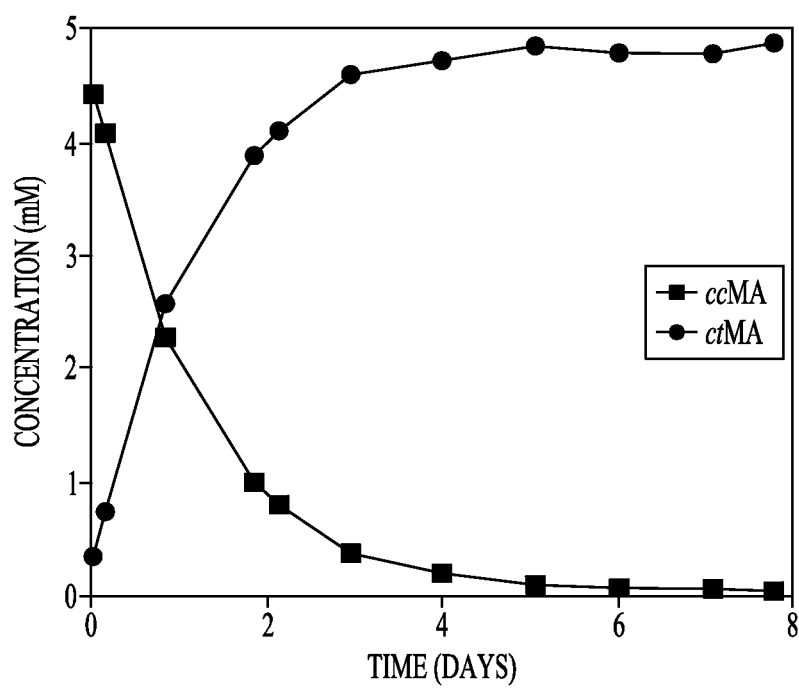
FIG. 15 illustrates concentrations of MA isomers over time at low pH, in accordance with various embodiments.

Muconic Acid Synthesis and Isomerization. Biocatalysts selectively produce ccMA by fermentation. The isomerization of ccMA at low pH and under ambient conditions to simulate the ECH conditions was investigated. A 5 mM solution of ccMA and 1.5 mM acetic acid in $D_2O$ was reacted at room temperature for 8 days. FIG. 15 illustrates concentrations of MA isomers over time at low pH. Periodic analysis by $^1H$ NMR revealed that ccMA fully isomerizes into ctMA within 3 days. The composition of the solution remained stable afterwards for at least 5 days. Increasing the temperature to 75° C. allowed the reaction to complete within only 20 min. ttMA was never observed in good agreement with previous work, which stated that ttMA formation requires chemical activation. Given that ccMA production by fermentation typically occurs at temperatures >25° C. for 3-5 days, the present study was carried out using the ctMA isomer as a reactant.

Mechanistic and Thermodynamic Considerations.

ECH and the hydrogen evolution reaction (HER) share the first elemental step (Volmer step), where protons from the solution are reduced to form adsorbed hydrogen atoms (Scheme 6). The adsorbed atoms can then either participate in the electrocatalytic hydrogenation reaction or combine to generate $H_2$ following the Tafel or Heyrovsky steps (Scheme 6). Although $H_2$ is a valuable byproduct, its formation is typically undesired during ECH as it lowers the faradaic efficiency (ratio of electrons used for ECH vs HER) and the overall performance of the ECH catalyst. Before any further considerations, it is important to study the thermodynamic equilibria associated with HER and ECH to understand how they evolve with pH and applied potential. Thermodynamic data is widely available for HER. However, muconic acid is not a common reactant and, like many biorenewable molecules, thermodynamic data is not available in the open literature. Therefore, the thermodynamic properties of all the molecules susceptible to form were calculated as well as the heats of formation and the free energies associated with all the hydrogenation reactions that may take place during ECH (Tables 7-8). In all cases, a two-step reaction was considered where MA is first hydrogenated to the corresponding mono-unsaturated di-acid (cis and trans isomers of 2- and 3-HDA) before further hydrogenation to AA (Table 8).

Scheme 6. Volmer, Tafel and Heyrovsky Steps.

$H^+ + e^- \rightarrow H_{ads}$ Volmer step(in acid)     (1)

$2H_{ads} \rightarrow H_2$ Tafel step     (2)

$H_{ads} + H^+ + e^- \rightarrow H_2$ Heyrovsky step(in acid)     (3)

Figure 16:
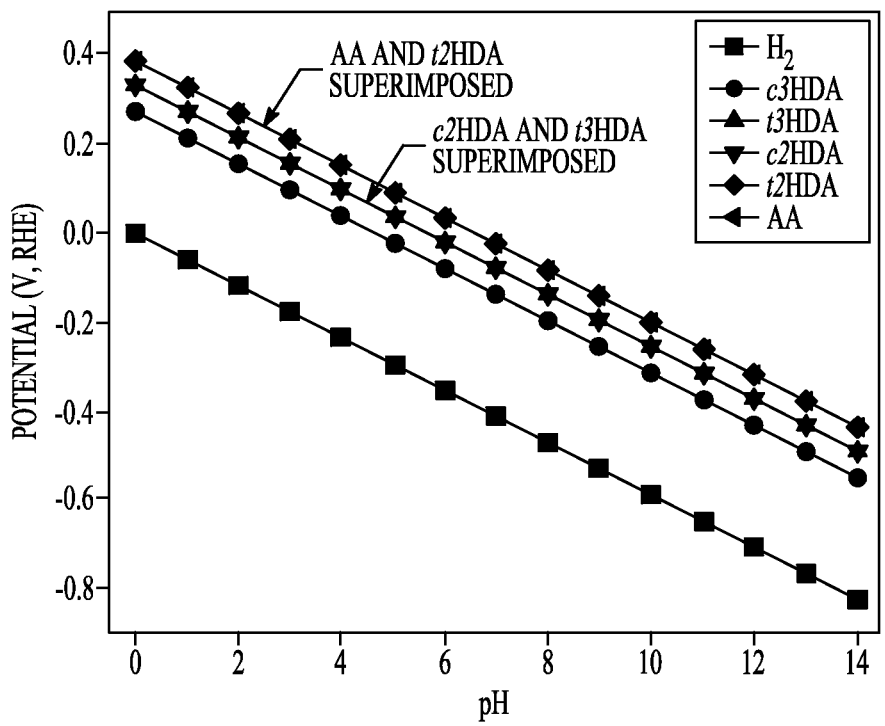
FIG. 16 illustrates theoretical potentials for the formation of hydrogen (HER), cis-3-hexenedioic acid (c3HDA), trans-3-hexenedioic acid (t3HDA), cis-2-hexenedioic acid (c2HDA), trans-2-hexenedioic acid (t2HDA), and AA from cis,trans-muconic acid (ctMA) as a function of pH, in accordance with various embodiments.

As shown in Table 8, all the reactions associated with the hydrogenation of MA to AA are thermodynamically favored by 10 to 20 kcal mol$^{-1}$. These theoretical values can be further used to calculate the theoretical potential of each reaction and its variation with pH using Nernst's equation. FIG. 16 illustrates theoretical potentials for the formation of hydrogen (HER), c3HDA, t3HDA, c2HDA, t2HDA, and AA from ctMA as a function of pH. As shown in FIG. 16, the potentials for ECH are higher than for HER over the pH range 0-14. As HER and ECH are cathodic reactions, FIG. 16 implies that ECH reactions are thermodynamically favored over HER, regardless of pH. The plot also reveals little difference between t2HDA, t3HDA, and AA, meaning that selective synthesis of any of these 3 chemicals by fine tuning the reaction kinetics may be possible. The compounds 2HDA and 3HDA could be useful monomers for polyester and polyamide synthesis based on their structural resemblance to adipic and fumaric acids.

Figure 17:
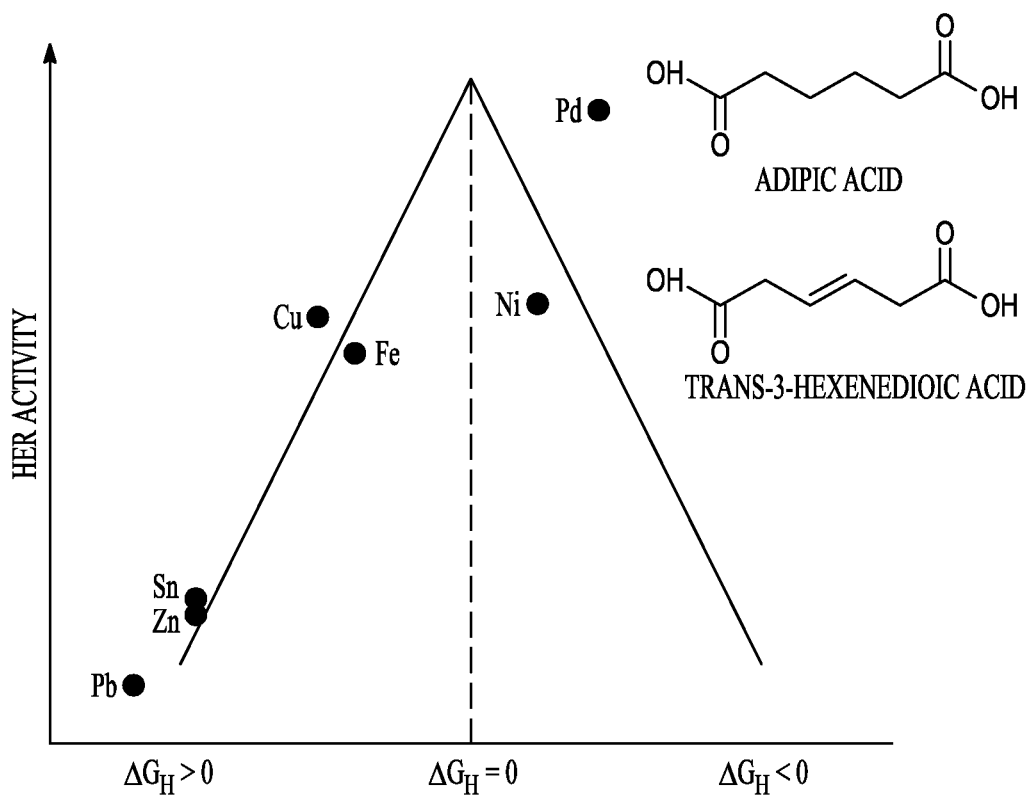
FIG. 17 illustrates a volcano plot showing the current exchange densities (HER activities) achieved as a function of the free energy of hydrogen adsorption $\Delta G_H$ of the metals, in accordance with various embodiments.

J.; Jaramillo, T. F.; Bonde, J.; Chorkendorff, I.; Norskov, J. K. *Nat. Mater.* 2006, 5, 909-913 for HER, shown in FIG. 17. FIG. 17 illustrates a volcano plot showing the current exchange densities (HER activities) achieved as a function of the free energy of hydrogen adsorption $\Delta G_H$ of the metals. Optimal HER activity is achieved for metals with $\Delta G_H \sim 0$. For clarity, only the metals tested in the present work are displayed on the plot. The colors indicate the main product formed during ECH. The highest exchange current densities (high HER activity) were observed for metals with a free energy for hydrogen binding $\Delta G_H \sim 0$. Metals that bind hydrogen more strongly ($\Delta G_H < 0$) or more weakly ($\Delta G_H > 0$) are significantly less active and adsorbed hydrogen atoms are therefore more likely to be involved in hydrogenation reactions than H$_2$ evolution (FIG. 17). However, at this point it is unclear whether weak ($\Delta G_H > 0$) or strong hydrogen

TABLE 7

Heats of formation (gas and liquid), boiling point, and gas phase acidities ($\Delta G_{gas}$) at G3MP2 level in kcal mol$^{-1}$ and pK$_a$ (relative to acetic acid).

| Molecule$^a$ | $\Delta H_f$(0K) (gas) | $\Delta H_f$(298K) (gas) | BP calc | $\Delta H_{vap,BP}$ | $\Delta H_f$(298K) (liq) | $\Delta G_{gas}$ acidity | First pK$_a$ (exp pK$_a$)$^b$ |
|---|---|---|---|---|---|---|---|
| ccMA | −145.8 | −150.7 | 503.2 | 15.6 | −166.3 | 328.0 | 2.9 |
| ctMA | −146.6 | −151.5 | 569.4 | 17.7 | −169.1 | 328.7 | 2.9 |
| ttMA | −148.8 | −153.6 | 564.1 | 17.5 | −171.0 | 329.0 | 3.4 (2.7) |
| t3HDA | −169.5 | −175.9 | 583.7 | 18.1 | −194.0 | 333.8 | 4.4 (3.96) |
| c3HDA | −168.0 | −175.5 | 584.6 | 18.1 | −193.6 | 329.6 | 4.5 |
| t2HDA | −171.4 | −177.8 | 587.5 | 18.2 | −196.1 | 332.1 | 5.3 |
| c2HDA | −170.2 | −176.8 | 564.9 | 17.5 | −194.3 | 335.2 | 5.9 |
| AA | −197.3 | −205.4 | 586.5 | 18.2 | −223.6 | 335.2 | 5.0 (4.43) |

$^a$Notation: ccMA, ctMA, and ttMA correspond to cis,cis-, cis,trans-, and trans,trans-muconic acid; c2HDA, t2HDA, c3HDA, and t3HDA designate the cis (c) and trans (t) isomers of 2-hexenedioic acid (2HDA) and 3-hexenedioic acid (3HDA); AA corresponds to adipic acid.
$^b$Experimental pK$_a$ values found in the literature are provided in brackets for comparison.

TABLE 8

Hydrogenation energies at G3MP2 in kcal mol$^{-1}$.

| Reaction$^a$ | $\Delta H_{gas}$ | $\Delta G_{gas}$ | $\Delta H_{liq}$ | $\Delta G_{aq}$ |
|---|---|---|---|---|
| ccMA + H$_2$ → t3HDA | −24.0 | −17.0 | −27.6 | −20.3 |
| ccMA + H$_2$ → c3HDA | −23.6 | −13.5 | −27.3 | −17.1 |
| ccMA + H$_2$ → t2HDA | −26.0 | −18.4 | −29.7 | −21.9 |
| ccMA + H$_2$ → c2HDA | −24.9 | −17.1 | −28.0 | −19.9 |
| ctMA + H$_2$ → t3HDA | −23.3 | −15.8 | −24.8 | −15.9 |
| ctMA + H$_2$ → c3HDA | −22.9 | −12.3 | −24.5 | −12.7 |
| ctMA + H$_2$ → t2HDA | −25.2 | −17.3 | −26.9 | −17.5 |
| ctMA + H$_2$ → c2HDA | −24.2 | −15.9 | −25.2 | −15.5 |
| ctMA + H$_2$ → t3HDA | −21.2 | −13.8 | −22.9 | −14.3 |
| ttMA + H$_2$ → c3HDA | −20.8 | −10.3 | −22.5 | −11.1 |
| ttMA + H$_2$ → t2HDA | −23.1 | −15.2 | −25.0 | −15.9 |
| ttMA + H$_2$ → c2HDA | −22.1 | −13.9 | −23.3 | −13.9 |
| t3HDA + H$_2$ → AA | −28.4 | −19.3 | −29.7 | −18.8 |
| c3HDA + H$_2$ → AA | −28.8 | −22.7 | −30.0 | −22.1 |
| t2HDA + H$_2$ → AA | −26.5 | −17.8 | −27.6 | −17.3 |
| c2HDA + H$_2$ → AA | −27.5 | −19.1 | −29.3 | −19.3 |

$^a$Notation: ccMA, ctMA, and ttMA correspond to cis,cis-, cis,trans-, and trans,trans-muconic acid; c2HDA, t2HDA, c3HDA, and c3HDA designate the cis (c) and trans (t) isomers of 2-hexenedioic acid (2HDA) and 3-hexenedioic acid (3HDA); AA corresponds to adipic acid.

Previous work on ECH revealed that poor HER catalysts offer the highest hydrogenation activities. Unconventional post transition metals such as Pb were particularly selective for levulinic acid and HMF hydrogenation. This observation can be rationalized by analyzing the volcano plot published by S. Trasatti. *Journal of Electroanalytical Chemistry and Interfacial Electrochemistry* 1972, 39, 163-184 and Greeley, binding ($\Delta G_H < 0$) is best suited for ECH and how large $|\Delta G_H|$ must be to ensure optimal hydrogenation activity. Therefore, a broad range of early, late, and post transition metals representative of both the low and high overpotential metals commonly used for ECH were tested.

ECH with Low Hydrogen Overpotential Metals (Cu, Fe, Ni, Pd).

Figure 18A:
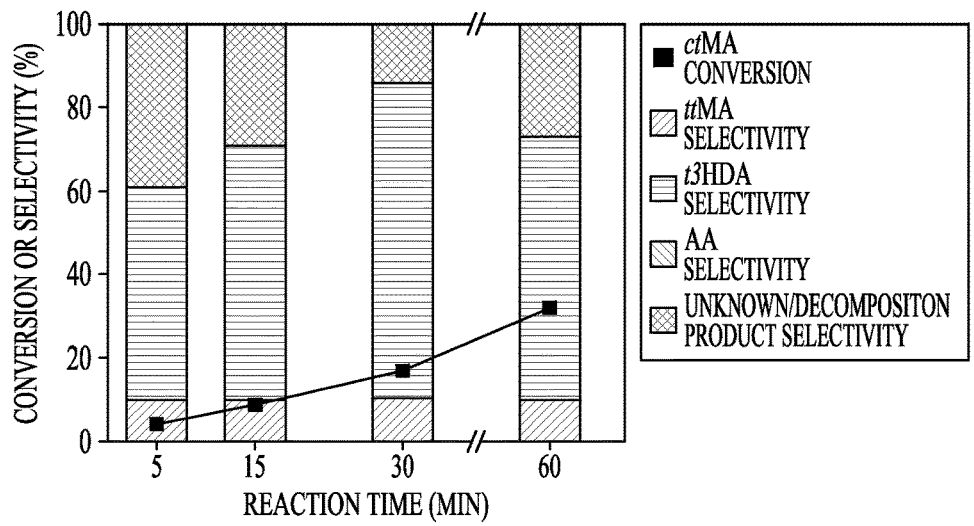
FIGS. 18A-O illustrate conversion, selectivity, and faradaic efficiencies during ECH of ctMA in 1% formic acid solution with various low hydrogen overpotential metals at various voltages, in accordance with various embodiments.
Figure 18B:
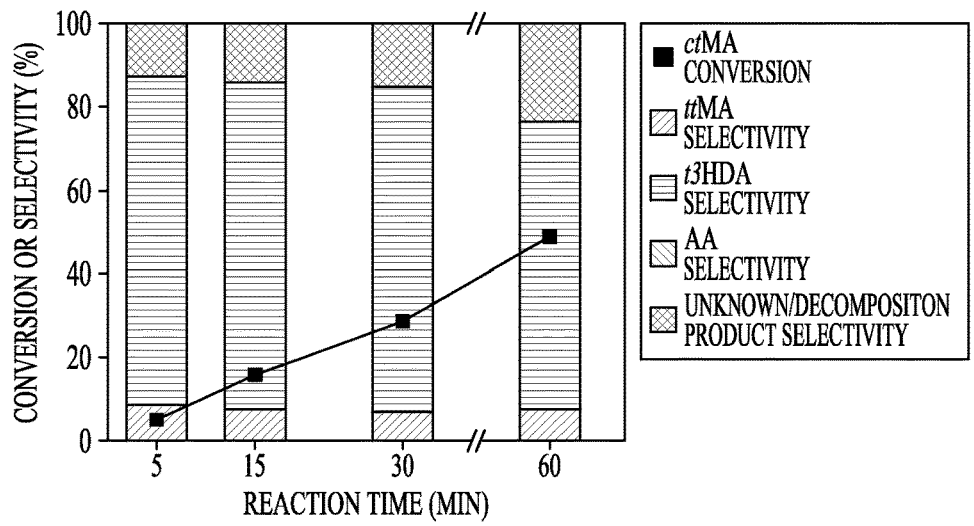
Figure 18C:
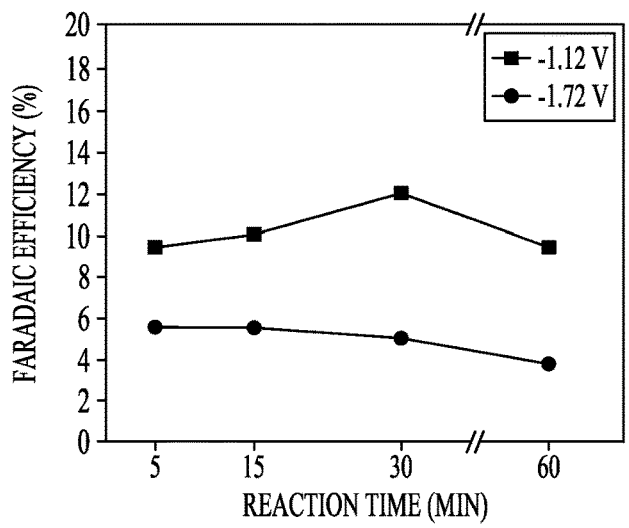
Figure 18D:
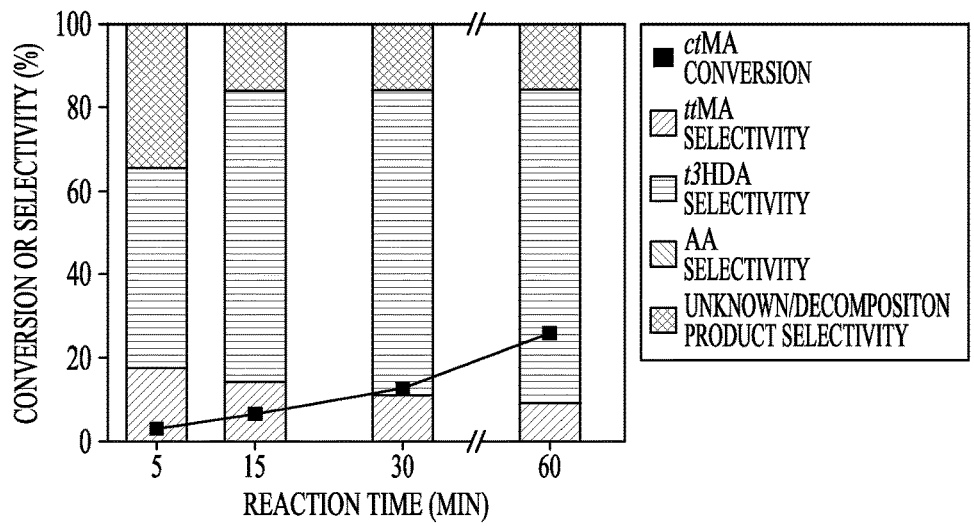
Figure 18E:
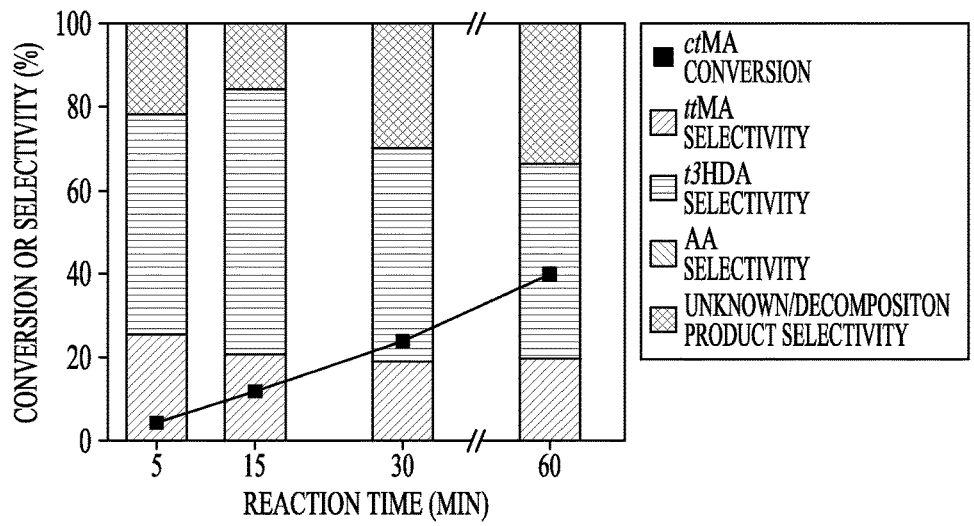
Figure 18F:
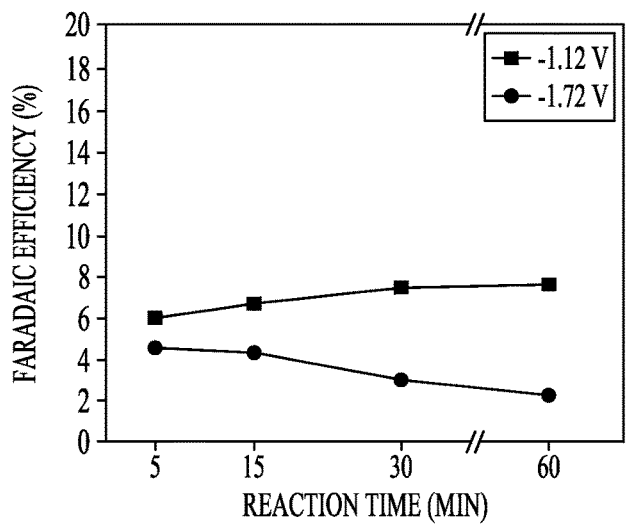
Figure 18G:
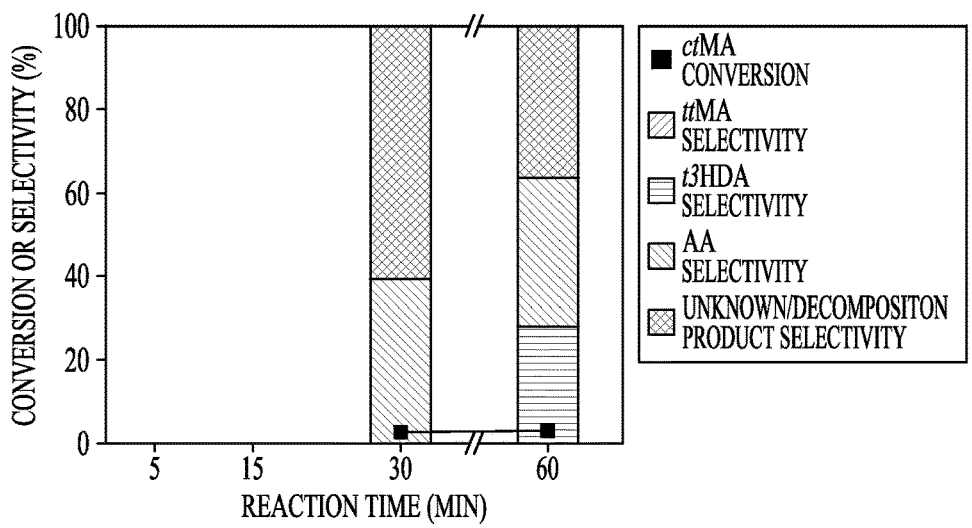
Figure 18H:
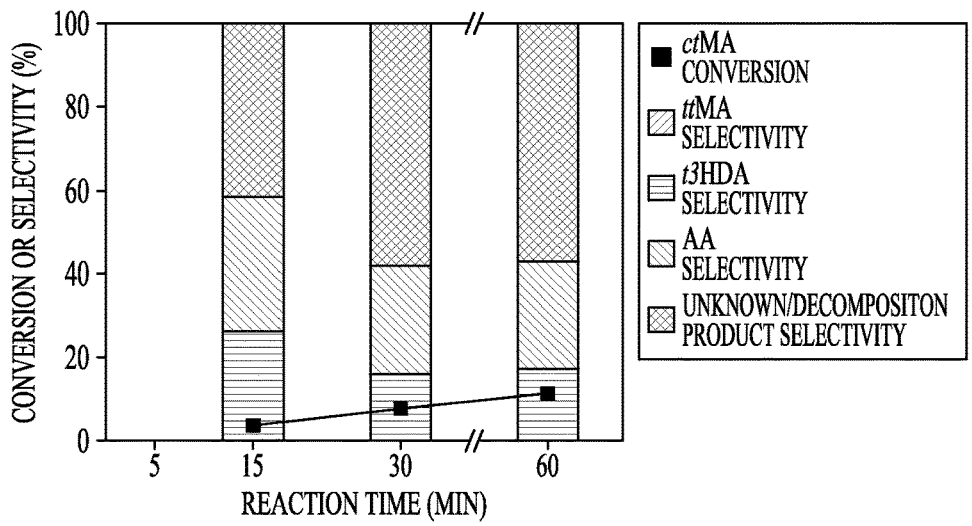
Figure 18I:
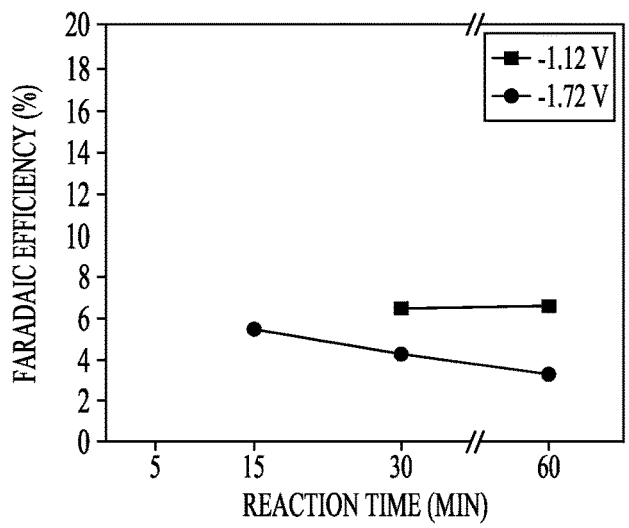
Figure 18J:
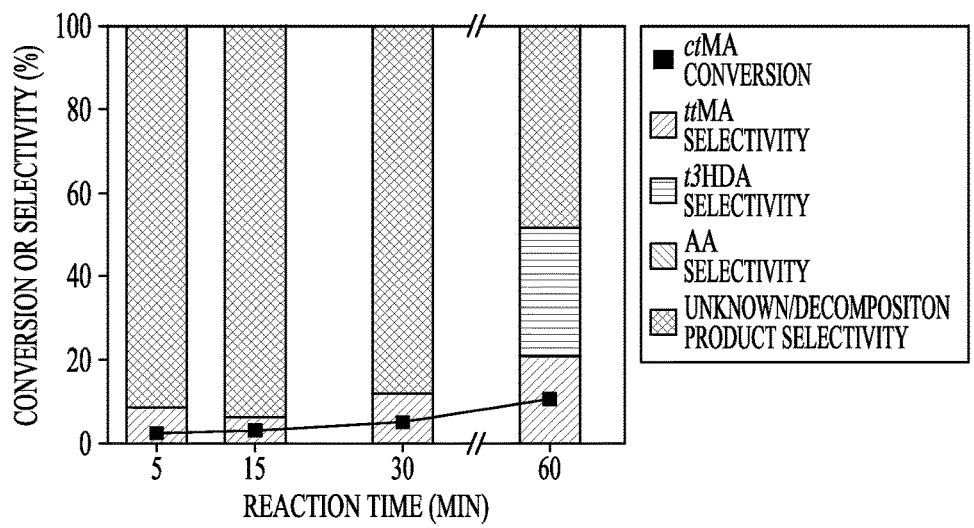
Figure 18K:
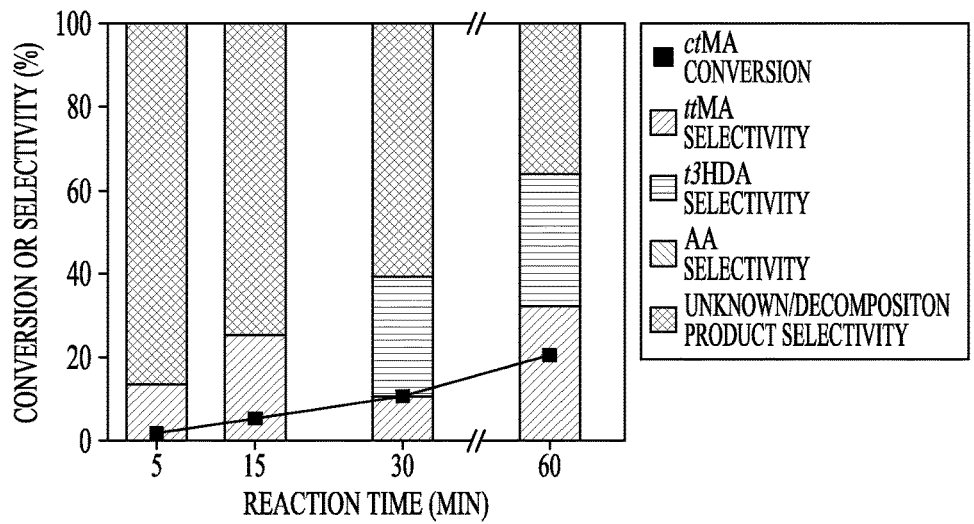
Figure 18L:
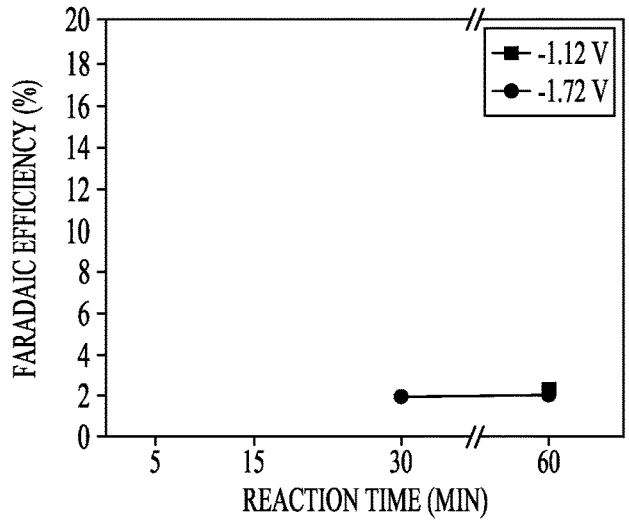
Figure 18M:
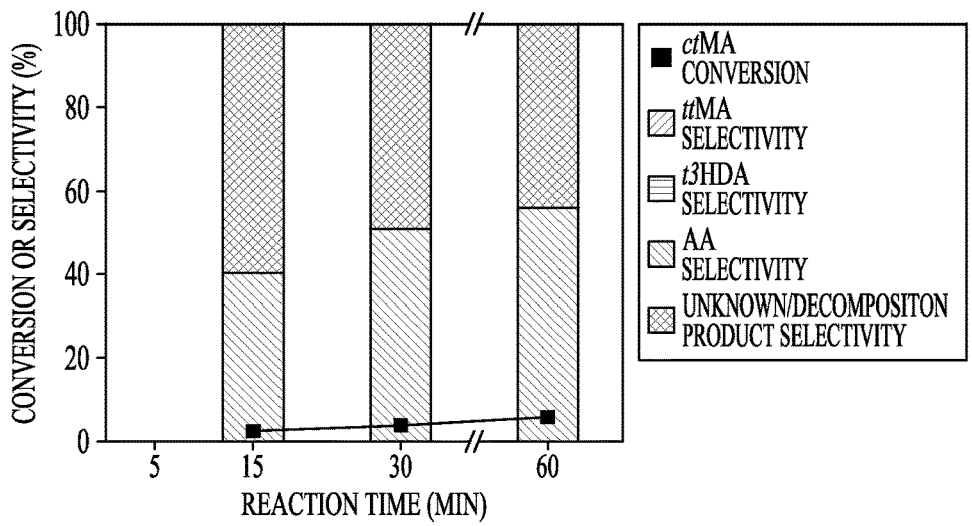
Figure 18N:
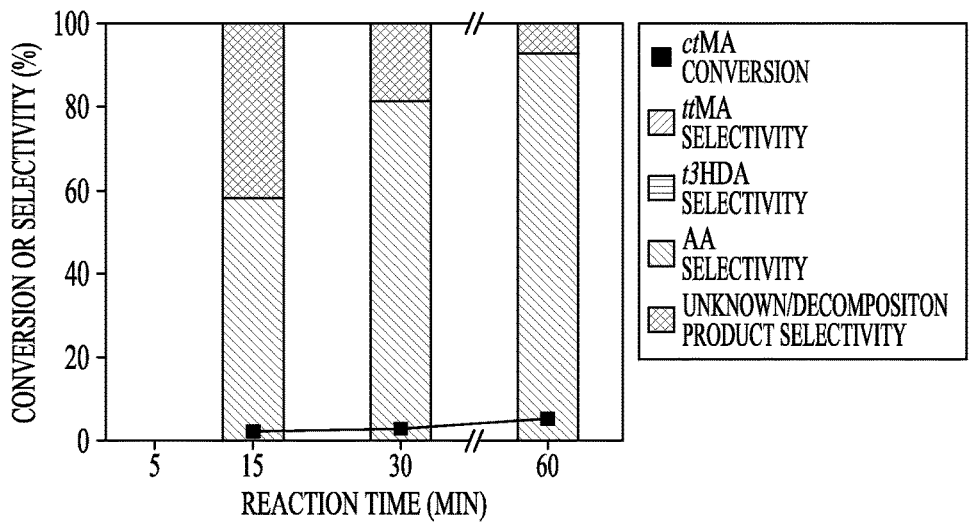
Figure 18O:
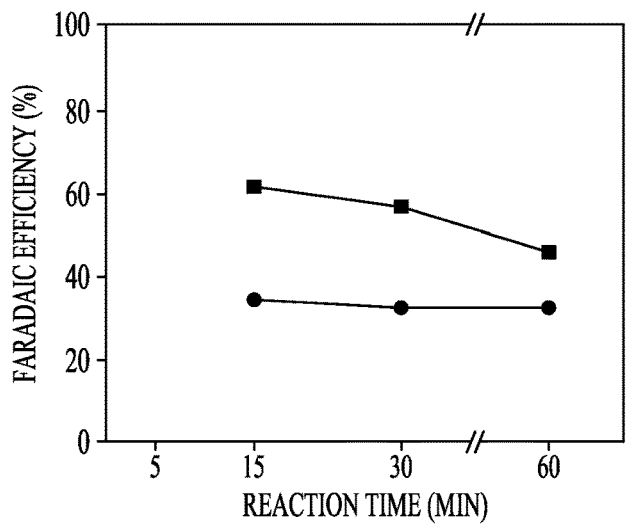

The results obtained for representative low hydrogen overpotential metals are shown in FIGS. 18A-O. FIGS. 18A-O illustrate conversion and selectivity during ECH of ctMA in 1% formic acid solution with low hydrogen overpotential metals at −1.12 V (A, D, G, J, M), −1.72 V (B, E, H, K, K) [with the exception of −0.47 V in G and −0.67 V in H, and faradaic efficiencies (C, F, I, L, O). FIGS. 18A, B, and C used Cu, FIGS. 18D, E, and F used Fe, FIGS. 18G, H, and I used Ni, FIGS. 18J, K and L used Pd foil, and FIGS. 18M, N, and O used Pd/C (5 wt % Pd on C). The catalytic tests for Cu, Fe, Pd, and Pd/C were performed at −1.12 V and −1.72 V vs RHE. However, lower cathodic potentials were applied to the Ni electrode, −0.47 and −0.67 V vs RHE, due to the large HER activity observed above −1.0 V for this metal. In all cases, a solution of 3.52 mM ctMA and 0.26 M formic acid was reacted for 1 h and aliquots of the solution were analyzed by UPLC after 5, 15, 30, and 60 min of reaction. Increasing the cathodic potential from −1.12 V to −1.72 V increased the kinetics of all the electrocatalytic reduction reactions, hence the kinetics of both ECH and HER. While ECH reactions are in general thermodynamically favored over HER (e.g. FIG. 16), the latter is typically faster because fewer elemental steps are involved in the formation of $H_2$ from $H^+$ compared to the hydrogenation reaction. Faradaic efficiencies did not exceed 15% for low hydrogen overpotential metals except Pd/C and generally decreased with increasing muconic acid conversion and hydrogen evolution reactivity as shown in FIGS. 18A-O. These values are consistent with the fact that $H^+$ and ctMA compete to adsorb on the surface of the catalyst and that the concentration of ctMA is two orders of magnitude lower than $[H^+]$.

Low overpotential metals produced both t3HDA and AA. Platinum group metals, specifically Ni and Pd/C, were the only catalysts that produced AA. ECH with Pt was not attempted as platinum is a very active HER catalyst. Pd/C (5 wt % Pd on C) was the best ECH catalyst of this group as it produced AA with 92% selectivity. The fraction of unknown or undetected products calculated based on the carbon balance decreased over time and when increasing the potential from −1.12 V to −1.72 V, thus indicating that ctMA decomposition was minimal and probably only occurred in the early stages of the electrocatalytic reaction. For low overpotential metals with $\Delta G_H \sim 0$, the ECH rate was low compared to HER and the ctMA conversion after 1 h reached 7% at best. The conversions obtained with Cu and Fe were significantly higher and ranged between 30 and 60% depending on the metal and applied potential. t3HDA was the main product for both catalysts, however, 10-20% ttMA were also detected. ttMA selectivity remained stable for Cu and slightly decreased over the course of the reaction for Fe, which could indicate that ttMA is an intermediate in the hydrogenation of ctMA to t3HDA.

ECH with High Hydrogen Overpotential Metals (Pb, Sn, Ti, Zn).

Figure 19A:
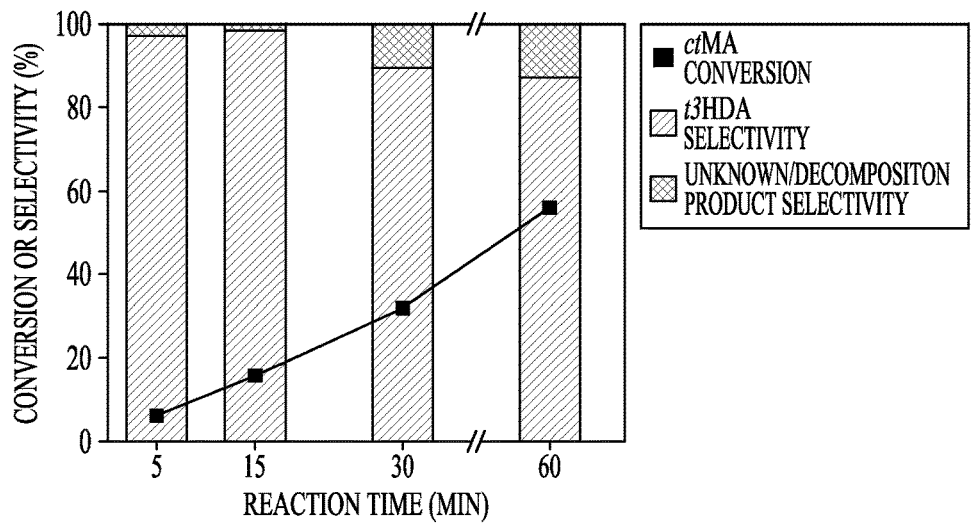
FIGS. 19A-L illustrate conversion, selectivity, and faradaic efficiencies of ECH of ctMA in 1% formic acid solution with various high hydrogen overpotential metals at various voltages, in accordance with various embodiments.

FIGS. 19A-L illustrate conversion and selectivity of ECH of ctMA in 1% formic acid solution with high hydrogen overpotential metals at −1.12 V (A, D, G, J), −1.72 V (B, E, H, K), and corresponding faradaic efficiencies (C, F, I, L). FIGS. 19A, B, and C used Pb, FIGS. 19D, E, and F used Sn, FIG. 19G, H, I used Ti and FIGS. 19J, K, and L used Zn. Metals that deviate further from ideal HER catalysts and present large $|\Delta G_H|$ were more selective towards t3HDA and showed faster ECH rates than low hydrogen overpotential metals. 40-80% ctMA was converted within 1 h on Ti ($\Delta G_H < 0$) and on Pb, Sn, Zn ($\Delta G_H > 0$), as shown in FIGS. 19A-L. In contrast to Cu, Fe, Ni, and Pd, ttMA and AA were not detected for this group of transition metals. The selectivity to unknown/decomposition products calculated based on the carbon balance was also lower than for the previous set of catalysts. Finally, late (Zn) and post-transition metals (Pb, Sn) which are on the left side of the volcano plot ($\Delta G_H > 0$, see FIG. 17) showed the highest ECH rates and among the highest selectivities to t3HDA. Notably, Pb hydrogenated ctMA to t3HDA with 90% selectivity at 70% conversion under these reaction conditions (FIGS. 19A-L). It should be noted that clear trends between selectivity and hydrogen binding properties have not been identified in previous works. Often, the selectivity towards the desired product is reported at low substrate conversion (<10%), which can be misleading as the selectivity can fluctuate significantly over the course of the reaction, even over short reaction times (FIGS. 19A-L).

ctMA Electrocatalytic Hydrogenation Pathway.

Low and high hydrogen overpotential metals show significant differences in reaction rates and selectivity. The unknown compounds calculated based on the carbon balance could either correspond to additional hydrogenation products that could not be identified and quantified, or to decomposition products resulting from oxidation at the counter electrode. To elucidate more mechanistic detail for the reactions on Pb, the same ECH reaction was performed at low cathodic potential (−0.57 V) to slow the kinetics and monitored the reaction for 300 min. Under these conditions, 57% selectivity towards ttMA was obtained after 60 min of reaction with the Pb electrode. Moreover, ttMA concentration decreased as ctMA conversion reached 80%, thus confirming that ttMA is an intermediate in the hydrogenation of ctMA to t3HDA. This intermediate was not observed at higher potential (−1.12 and −1.72 V) likely due to faster kinetics or a shift in the rate determining step (FIGS. 19A-L).

The formation of intermediates in the production of AA are less clear. For high-pressure hydrogenation, it was determined that the hydrogenation of MA produced 2HDA followed by subsequent hydrogenation to AA. This result suggests a mechanism involving a 1,2-addition followed by further hydrogenation to AA. Surprisingly, 2HDA was not detected during the synthesis of AA by ECH. Instead, 20-30% of t3HDA, the product of the 1,4-addition, were found during the Ni-catalyzed ECH of ctMA. However, it should be noted that the carbon balance, shown as unknown/decomposition products in FIGS. 18A-O, was significantly lower with Ni and Pd than with other catalysts. The reaction may proceed following two parallel pathways, leading to 2HDA by 1,2-addition and to 3HDA by 1,4-addition. For addition reactions on conjugated dienes, it has been established that the 1,2-adduct forms when the system is under kinetic control while the 1,4-adduct is obtained under thermodynamic control. Therefore, while applying the same potential, it could be possible to either favor the kinetically- or thermodynamically-favored hydrogenation product could be favored depending on the metal catalyst, thus metal-hydrogen bond strength.

Electrochemically Active Surface Area and Turnover Frequency Calculations.

The faradaic efficiency of a reaction is an important measure of hydrogen utilization and a common way to assess the performance of electrocatalysts. While this figure is an important metric, it is highly dependent on reactant concentration, applied potential, and pH of the reacting medium. Another important figure of merit of a catalyst is the turnover frequency (TOF). Despite being a fair value to compare catalysts, TOFs are unusual in electrocatalysis because the electrochemically active surface area (ECSA) is difficult to determine in most cases. Nonetheless, the TOF was estimated for Pb and Pd/C, the most selective catalysts for the production of t3HDA and AA, respectively.

Figures 20A, 20B, 20C:
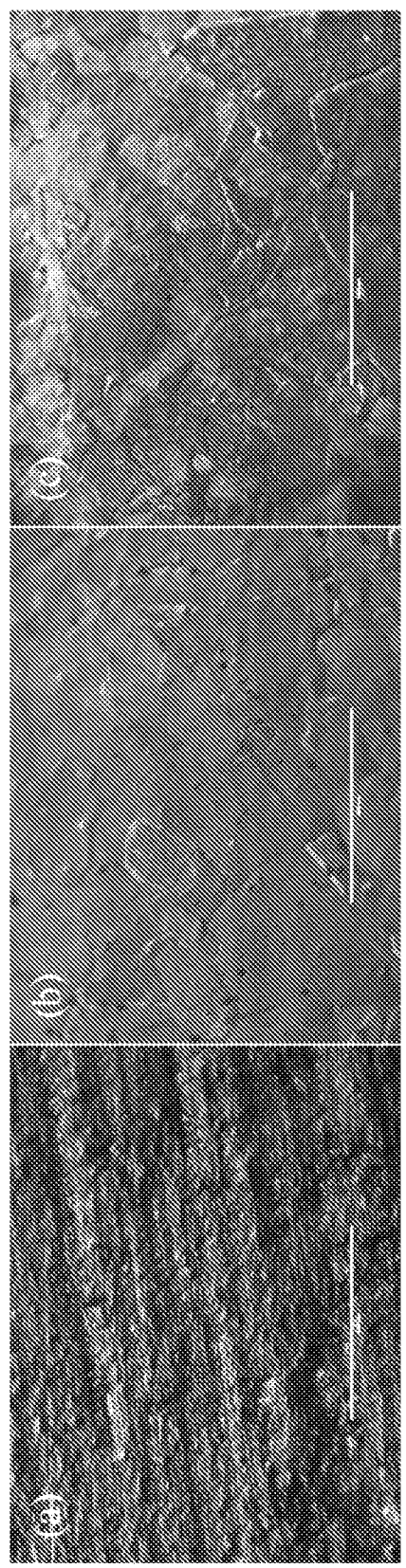
FIGS. 20A-C illustrate light microscope images of the Pb electrode strip (A) after cleaning with a kimwipe, (B) after electropolishing, and (B) after ECH of ctMA, in accordance with various embodiments.
Figure 21A:
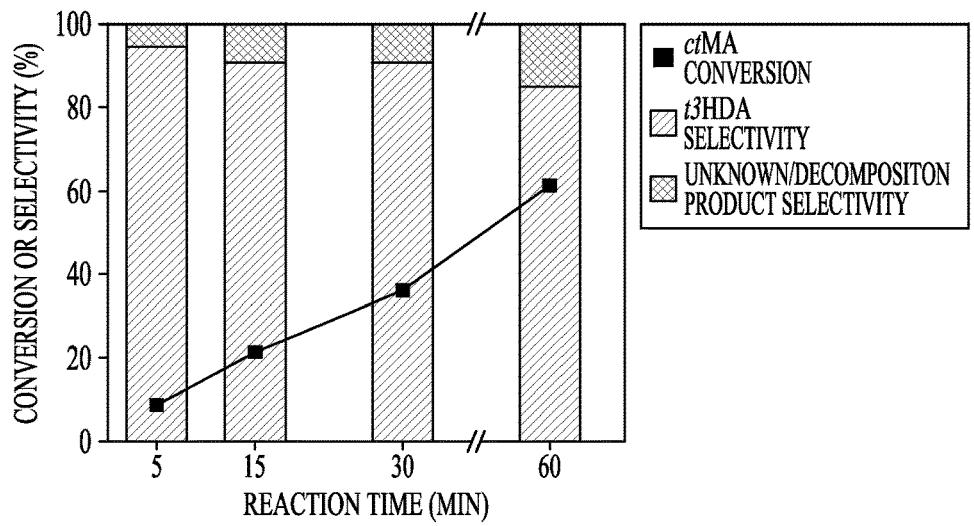
FIGS. 21A-C illustrate conversion (A), selectivity (B), and faradaic efficiency (C) of ECH of ctMA with electropolished Pb at −1.17 V in a 1% formic acid solution, in accordance with various embodiments.
Figure 21B:
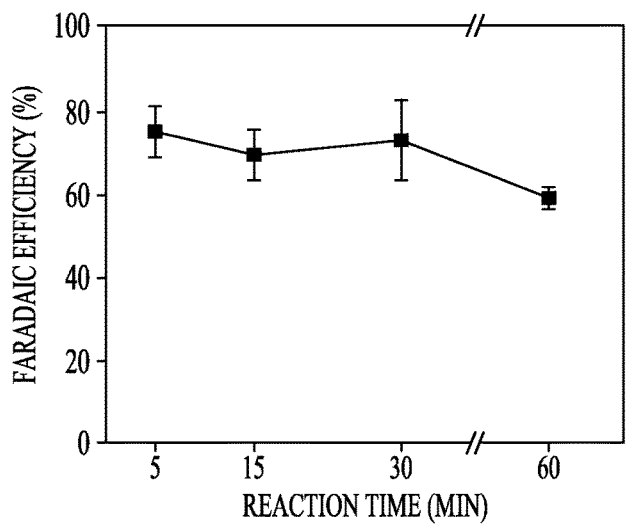
Figure 21C:
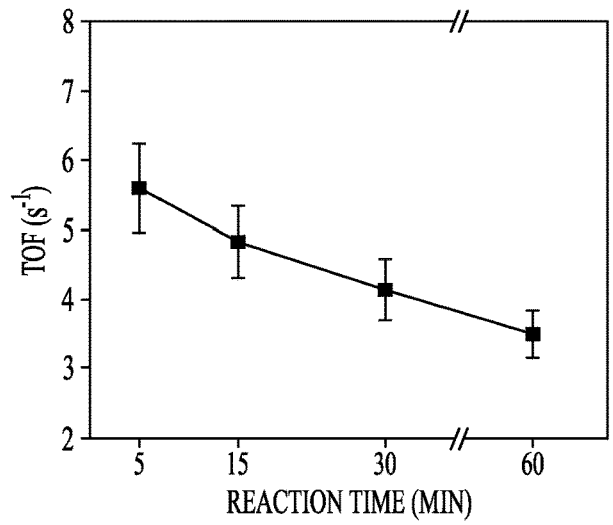

Robust and accurate methods to determine the ECSA of Pb catalysts are not available yet. However, the electrode's surface area can be used directly to estimate the catalyst's TOF if the surface is smooth. Optical microscopy images revealed microscopic features produced through wiping the soft metal with a kimwipe. FIGS. 20A-C illustrate light microscope images of the Pb electrode strip (a) after cleaning with a kimwipe, (b) after electropolishing, and (c) after ECH of ctMA, with the scale bar representing 400 nm. The surface was electropolished by immersing the Pb electrode into an acidic solution and applying a high potential. During this process, burs and sharp edges protruding from the electrode are dissolved into the electrolyte at a faster rate than the oblate material. After electro-polishing, most of these features are leveled and the geometric area of the electrode strip was estimated to be the electrochemically active surface area (FIG. 20B). The number of exposed metal atoms was then calculated using a reference value of 9.39×10$^{14}$ atoms cm$^{-2}$. After electro-polishing, two consecutive ECH of ctMA were carried out and the results were compared. Minor fluctuations in conversion, selectivity, faradaic efficiency, and TOF were calculated although the surface roughness increased (FIG. 20C; error bars in FIGS. 21B-C. FIGS. 21A-C illustrate conversion (A), selectivity (B), and faradaic efficiency (C) of ECH of ctMA with electro-polished Pb at −1.17 V in a 1% formic acid solution. The TOF was of about 6 s$^{-1}$ (rounded from 5.6 s$^{-1}$) in the early stages of the catalytic tests (FIG. 21C). This value seems reasonable considering that it is not based on the ECSA but on the geometric surface area of the electrode.

Figure 22A:
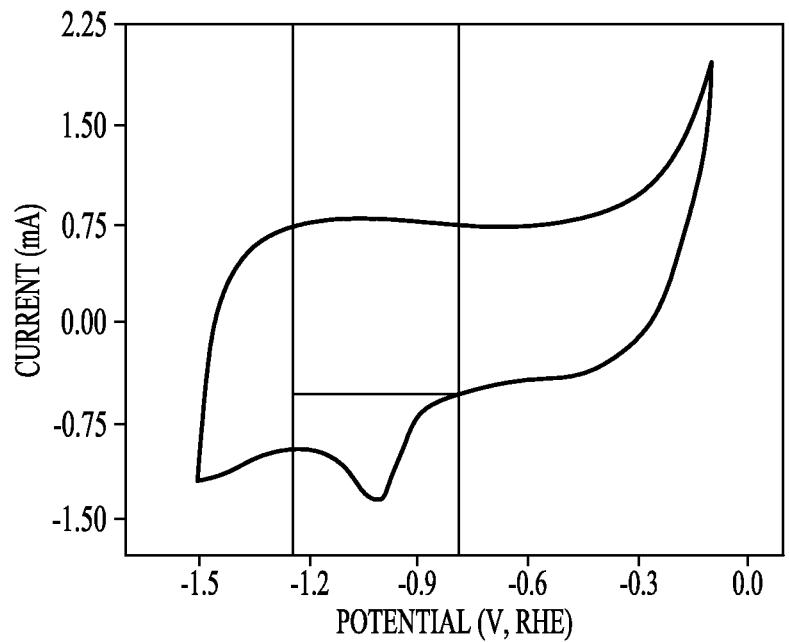
FIG. 22A illustrates cyclic voltammetry of Pd/C in 0.5 M NaOH.
Figure 22B:
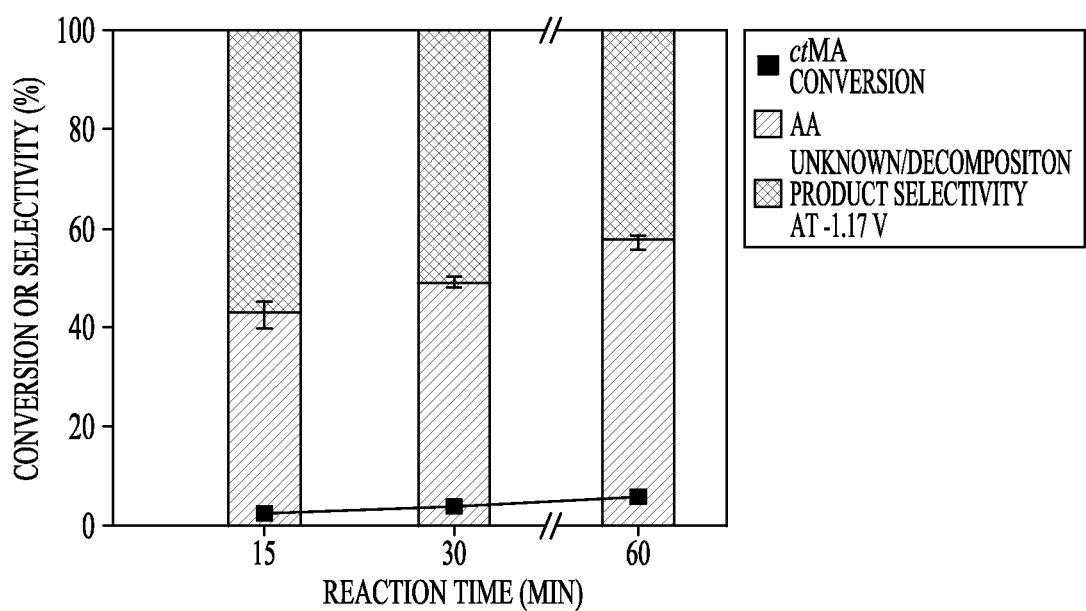
FIG. 22B illustrates conversion and selectivity of ECH of ctMA in 1% formic acid solution at −1.17 V
Figure 22C:
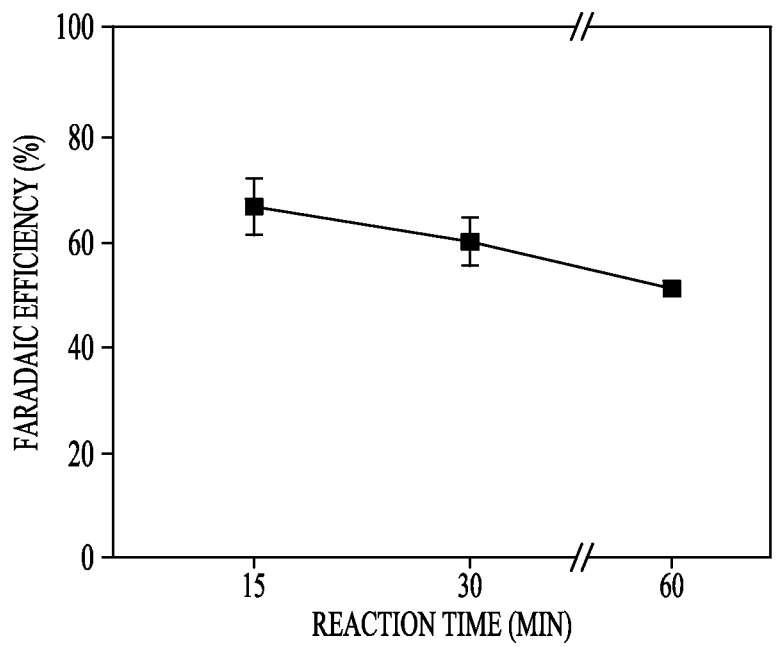
FIG. 22C illustrates the faradaic efficiency during ECH of ctMA in 1% formic acid solution at −1.17 V.
Figure 22D:
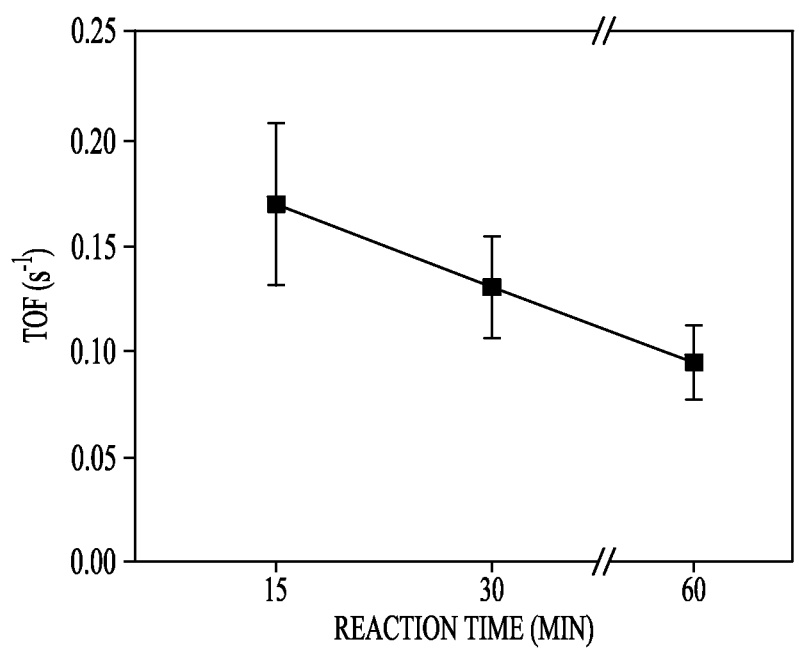
FIG. 22D illustrates the turn over frequency of Pd/C catalyst during ECH of ctMA in 1% formic acid solution at −1.17 V.
Figure 23A:
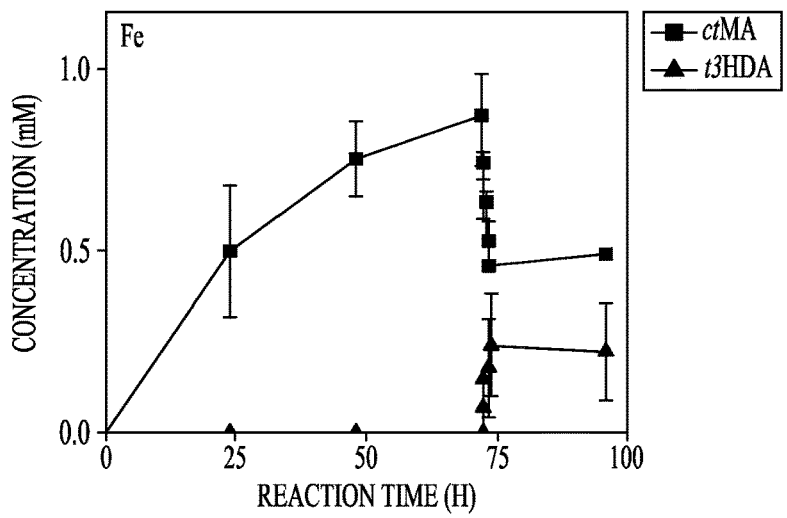
FIGS. 23A-F illustrate ctMA and t3HDA concentration profiles during simultaneous fermentation and ECH, in accordance with various embodiments.
Figure 23B:
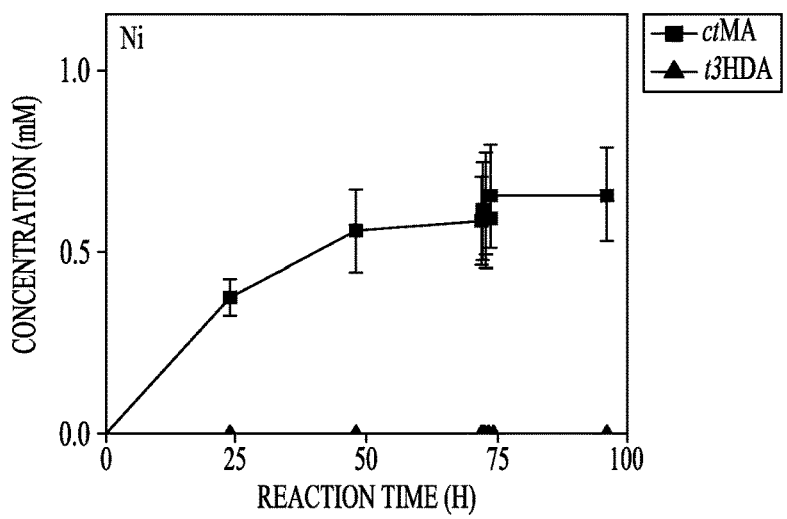
Figure 23C:
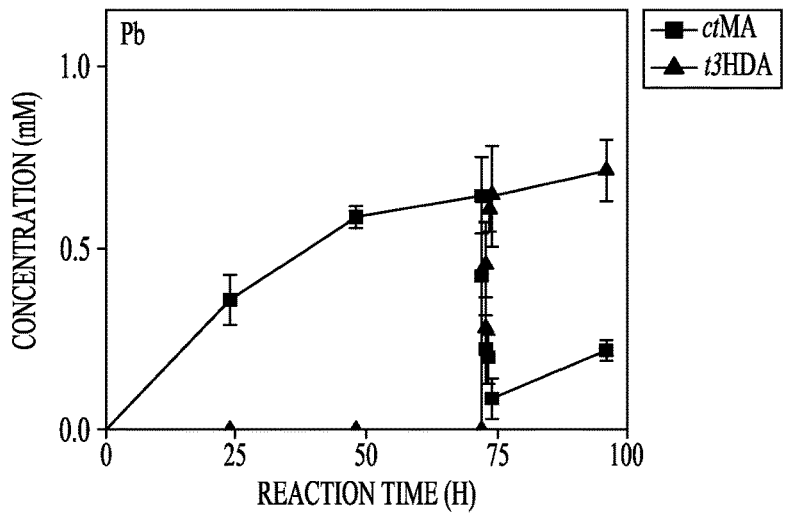
Figure 23D:
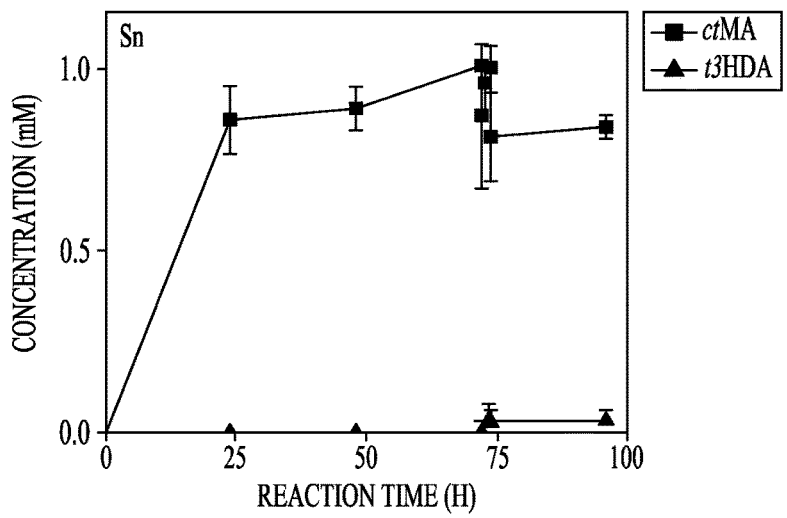
Figure 23E:
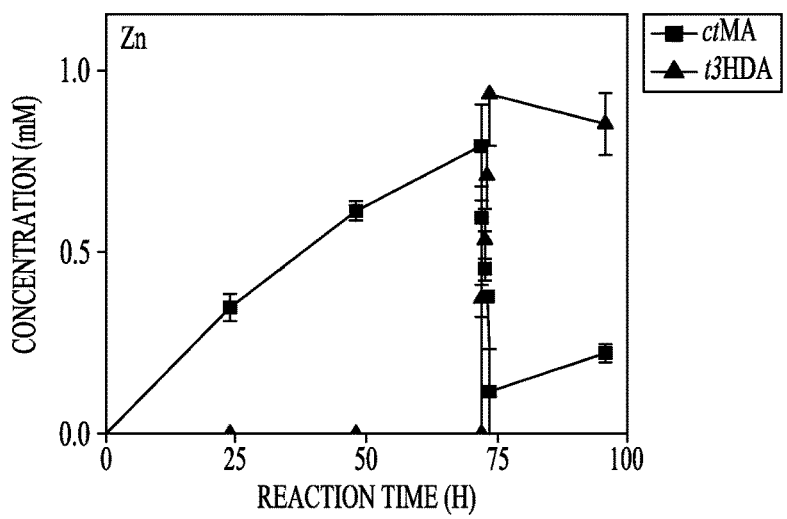
Figure 23F:
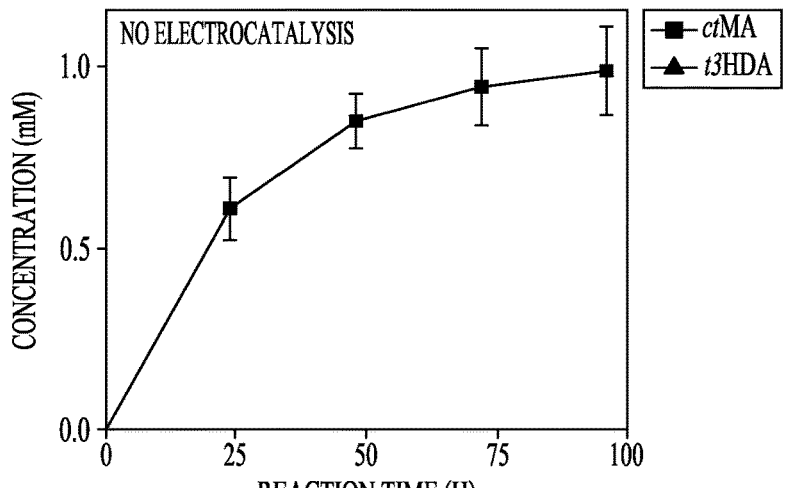

FIGS. 22A-D illustrate (A) Cyclic voltammetry of 5 wt % Pd/C catalyst in 0.5 M NaOH (the peak below the horizontal line is integrated to determine the ECSA); (B) conversion and selectivity of ECH of ctMA in 1% formic acid solution at −1.17 V; (C) the corresponding Faradaic efficiency; and (D) turn over frequency of Pd/C catalyst. The electrochemically active surface area of Pd/C was calculated through the electrochemical oxidation and reduction of Pd in a 0.5 M NaOH solution. In this technique, a monolayer of Pd is oxidized and subsequently reduced. The reduction peak at ca. −1.0 V is then integrated, the electrochemical double layer is subtracted, and the electrochemically active surface area is calculated using a reference value for Pd of 405 μC cm$^{-2}$, and 1.27×10$^{15}$ atoms cm$^{-2}$ (FIG. 22A). The value obtained for the Pd/C electrocatalyst was 1.04×10$^{-7}$ mol$_{Pd}$ mg$_{cat}^{-1}$, which corresponds to a dispersion of 22±2%. Pd/C exhibited a TOF of 0.15 s$^{-1}$ during the ECH of ctMA (FIG. 22D). In comparison, a TOF of 30 s$^{-1}$ was calculated for Pd/C used for the high pressure hydrogenation of MA to AA. The difference is likely due to the high HER activity of Pd and active site blocking by adsorbed hydrogen.

Simultaneous Fermentation and Hydrogenation.

FIGS. 23A-F illustrate ctMA and t3HDA concentration profiles during simultaneous fermentation and ECH. ECH was performed in the fermentation broth between 72-74 h. A potential of −1.5 V vs. Ag/AgCl was applied to the working electrode during the reaction duration. The working electrodes used in this study corresponds to (A) Fe, (B) Ni, (C) Pb, (D) Sn, and (E) Zn. (F) corresponds to fermentation in absence of ECH.

Conclusions.

The electrocatalytic hydrogenation of MA at room temperature and atmospheric pressure using hydrogen generated in situ from water was explored. ctMA was converted to ttMA, AA, and t3HDA by applying a potential between −0.3 V to −1.8 V on a transition metal catalyst. Conversion, selectivity, and faradaic efficiency were tuned to a large extend by varying the experimental conditions, notably the nature of the metal and the applied potential. The observed catalytic activities in relation to the hydrogen evolution reaction and thermodynamics were studied. Poor HER catalysts, in particular Pb, were highly active and selective towards t3HDA. It was shown that the reaction proceeds with ttMA as an intermediate and that this bio-based PET precursor can be obtained with a good selectivity by lowering the applied potential. An unexpectedly high TOF of 5.6 s$^{-1}$ was calculated for Pb, a notoriously poor hydrogenation catalyst under conventional high pressure H$_2$ conditions.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides an electrocatalytic method to prepare 3-hexene-1,6-dioic acid, 2-hexene-1,6-dioic acid, adipic acid, or a combination thereof, from muconic acid, the method comprising:

passing current through a catalytic cathode in a reactor comprising an aqueous acidic solution comprising muconic acid, a supporting electrolyte, and an anode, so as to generate atomic hydrogen on the cathode surface in an amount effective to hydrogenate the muconic acid to yield a product comprising 3-hexene-1,6-dioic acid, 2-hexene-1,6-dioic acid, adipic acid, or a mixture thereof.

Embodiment 2 provides the method of Embodiment 1, wherein passing the current through the cathode yields 3-hexene-1,6-dioic acid.

Embodiment 3 provides the method of any one of Embodiments 1-2, wherein passing the current through the cathode yields adipic acid.

Embodiment 4 provides the method of any one of Embodiments 1-3, wherein the muconic acid is cis,cis-muconic acid, trans,cis-muconic acid, trans,trans-muconic acid, or a combination thereof.

Embodiment 5 provides the method of any one of Embodiments 1-4, wherein the muconic acid is trans,cis-muconic acid.

Embodiment 6 provides the method of any one of Embodiments 1-5, wherein the 2-hexene-1,6-dioic acid is cis-2-hexene-1,6-dioic acid, trans-2-hexene-1,6-dioic acid, or a combination thereof.

Embodiment 7 provides the method of any one of Embodiments 1-6, wherein the 3-hexene-1,6-dioic acid is cis-3-hexene-1,6-dioic acid, trans-3-hexene-1,6-dioic acid, or a combination thereof.

Embodiment 8 provides the method of any one of Embodiments 1-7, wherein the 3-hexene-1,6-dioic acid is trans-3-hexene-dioic acid.

Embodiment 9 provides the method of any one of Embodiments 1-8, wherein the cathode comprises at least one of Cu, Fe, Ni, Pd, Pt, Pd/C, Pb, Sn, Ti, Zn, or a combination thereof.

Embodiment 10 provides the method of any one of Embodiments 1-9, wherein the cathode comprises one or more platinum group metals.

Embodiment 11 provides the method of any one of Embodiments 1-10, wherein the cathode consists of one or more platinum group metals.

Embodiment 12 provides the method of any one of Embodiments 1-11, wherein the cathode comprises Ni, Pd, Pt, or a combination thereof.

Embodiment 13 provides the method of Embodiment 12, wherein the hydrogenation yields adipic acid.

Embodiment 14 provides the method of any one of Embodiments 12-13, wherein the hydrogenation yields adipic acid with a selectivity of about 80% to about 100%.

Embodiment 15 provides the method of any one of Embodiments 1-14, wherein the cathode comprises Pd/C, wherein the hydrogenation yields adipic acid with a selectivity of about 80% to about 100%.

Embodiment 16 provides the method of any one of Embodiments 1-15, wherein the cathode comprises Cu, Fe, Pb, Sn, Ti, Zn, or a combination thereof.

Embodiment 17 provides the method of Embodiment 16, wherein the method yields trans-3-hexene-1,6-dioic acid.

Embodiment 18 provides the method of any one of Embodiments 16-17, wherein the method yields trans-3-hexene-1,6-dioic acid with a selectivity of about 80% to about 100%, and with a conversion of about 40% to about 100%.

Embodiment 19 provides the method of any one of Embodiments 1-18, wherein the cathode comprises Pb, wherein the method yields trans-3-hexene-1,6-dioic acid with a selectivity of about 80% to about 100% and with a conversion of about 80% to about 100%.

Embodiment 20 provides the method of any one of Embodiments 1-19, wherein the cathode consists of lead.

Embodiment 21 provides the method of any one of Embodiments 1-20, wherein the cathode comprises platinum.

Embodiment 22 provides the method of any one of Embodiments 1-21, wherein the cathode consists of platinum.

Embodiment 23 provides the method of any one of Embodiments 1-22, wherein the cathode comprises one or more transition metals.

Embodiment 24 provides the method of any one of Embodiments 1-23, wherein the cathode consists of one or more transition metals.

Embodiment 25 provides the method of any one of Embodiments 1-24, wherein the aqueous acidic solution comprises an organic acid, a mineral acid, a salt thereof, or a combination thereof.

Embodiment 26 provides the method of any one of Embodiments 1-25, wherein the aqueous acidic solution comprises formic acid, sulfuric acid, a salt thereof, or a combination thereof.

Embodiment 27 provides the method of any one of Embodiments 1-26, wherein the current is generated by applying a voltage of about −0.5 to about −3.0 volts with respect to an Ag/AgCl reference electrode or with respect to a reversible hydrogen electrode.

Embodiment 28 provides the method of any one of Embodiments 1-27, wherein the method is carried out at ambient temperature and pressure.

Embodiment 29 provides the method of any one of Embodiments 1-28, wherein the method converts the muconic acid to the trans-3-hexene-1,6-dioic acid at a selectivity of about 80% to about 100%.

Embodiment 30 provides the method of any one of Embodiments 1-29, wherein the method converts the muconic acid to the trans-3-hexene-1,6-dioic acid at a selectivity of about 95% to about 100%.

Embodiment 31 provides the method of any one of Embodiments 1-30, wherein the method hydrogenates about 0.01% to about 100% of the muconic acid.

Embodiment 32 provides the method of any one of Embodiments 1-31, wherein the method hydrogenates about 80% to about 100% of the muconic acid.

Embodiment 33 provides the method of any one of Embodiments 1-32, wherein the hydrogenation of the muconic acid occurs with a faradaic efficiency of about 2% to about 100%.

Embodiment 34 provides the method of any one of Embodiments 1-33, wherein the hydrogenation of the muconic acid occurs with a faradaic efficiency of about 30% to about 100%.

Embodiment 35 provides the method of any one of Embodiments 1-34, wherein during the hydrogenation the cathode has a catalytic turnover frequency of about 0.01 $s^{-1}$ to about 120 $s^{-1}$.

Embodiment 36 provides the method of any one of Embodiments 1-35, wherein during the hydrogenation the cathode has a catalytic turnover frequency of about 0.10 $s^{-1}$ to about 35 $s^{-1}$.

Embodiment 37 provides the method of any one of Embodiments 1-36, wherein the aqueous solution comprises an acidic fermentation broth comprising the muconic acid.

Embodiment 38 provides the method of any one of Embodiments 12-37, wherein the fermentation broth comprises glucose and supports the conversion of glucose into muconic acid by yeast.

Embodiment 39 provides the method of any one of Embodiments 13-38, wherein the fermentation broth comprises yeast nitrogen base.

Embodiment 40 provides the method of Embodiment 39, wherein the yeast nitrogen base is substantially free of amino acids, ammonium sulfate, or a combination thereof.

Embodiment 41 provides the method of any one of Embodiments 37-40, wherein the fermentation broth comprises ammonium sulfate.

Embodiment 42 provides the method of any one of Embodiments 37-41, wherein the fermentation broth comprises complete supplement mixture (CSM) uracil-dropout amino acid mix.

Embodiment 43 provides the method of any one of Embodiments 37-42, wherein the method comprises at least partially simultaneously fermenting the broth to form muconic acid and hydrogenating muconic acid in the broth.

Embodiment 44 provides the method of any one of Embodiments 1-43, further comprising polymerizing the adipic acid with another compound, to form a polymer.

Embodiment 45 provides the method of any one of Embodiments 1-44, further comprising polymerizing the adipic acid with a compound having the structure $H_2N$—$(C_1$-$C_{20})$alkylene-$NH_2$, HO—$(C_1$-$C_{20})$alkylene-$NH_2$, HO—$(C_1$-$C_{20})$alkylene-OH, a salt thereof, or a combination thereof, wherein the $(C_1$-$C_{20})$alkylene group is substituted or unsubstituted, to form a polymer.

Embodiment 46 provides the method of any one of Embodiments 1-45, further comprising polymerizing the adipic acid with hexamethylenediamine, wherein the polymer is nylon 6,6.

Embodiment 47 provides the method of any one of Embodiments 1-46, further comprising:

polymerizing the 2-hexene-1,6-dioic acid, the 3-hexene-1,6-dioic acid, or a combination thereof, with another compound, to form a polymer.

Embodiment 48 provides the method of any one of Embodiments 1-47, further comprising:

polymerizing the 2-hexene-1,6-dioic acid, the 3-hexene-1,6-dioic acid, the adipic acid, or a combination thereof, with a compound having the structure $H_2N$—$(C_1$-$C_{20})$alkylene-$NH_2$, HO—$(C_1$-$C_{20})$alkylene-$NH_2$, HO—$(C_1$-$C_{20})$alkylene-OH, a salt thereof, or a combination thereof, wherein the $(C_1$-$C_{20})$alkylene group is substituted or unsubstituted, to form a polymer.

Embodiment 49 provides the method of Embodiment 48, wherein the polymerizing forms a polymer comprising a repeating group having the structure:

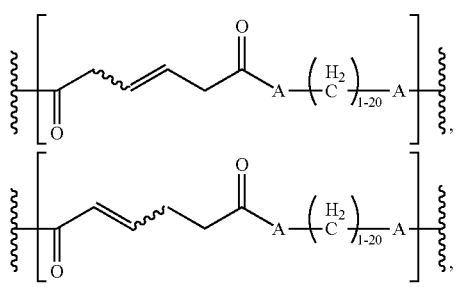

a salt thereof, or a combination thereof, wherein at each occurrence -A- is independently chosen from —NH— and —O—.

Embodiment 50 provides the method of any one of Embodiments 48-49, wherein the polymerizing forms a polymer comprising a repeating group having the structure:

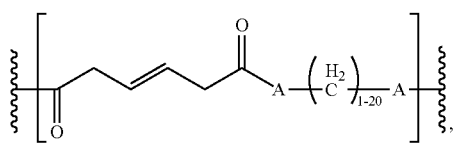

or a salt thereof, wherein at each occurrence -A- is independently chosen from —NH— and —O—.

Embodiment 51 provides the method of any one of Embodiments 1-50, further comprising:

polymerizing the 2-hexene-1,6-dioic acid, the 3-hexene-1,6-dioic acid, or a combination thereof, with hexamethylenediamine, wherein the polymerizing forms a polymer comprising a repeating group having the structure:

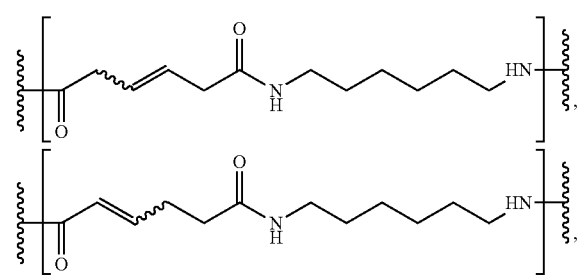

a salt thereof, or a combination thereof.

Embodiment 52 provides the method of any one of Embodiments 1-51, further comprising:

polymerizing the adipic acid with hexamethylenediamine, wherein the polymerizing forms a polymer comprising a repeating group having the structure:

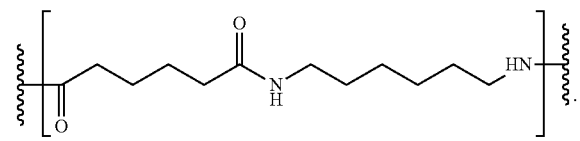

Embodiment 53 provides an electrocatalytic method to prepare adipic acid from muconic acid, the method comprising:

passing current through a catalytic cathode comprising Pd on carbon, wherein the catalytic cathode is in a reactor comprising an aqueous acidic solution comprising muconic acid, a supporting electrolyte, and an anode, so as to generate atomic hydrogen on the cathode surface in an amount effective to hydrogenate the muconic acid so as to yield a product comprising adipic acid with a selectivity of about 40% to about 100%.

Embodiment 54 provides an electrocatalytic method to prepare trans-3-hexene-1,6-dioic acid from muconic acid, the method comprising:

passing current through a catalytic cathode comprising Cu, Fe, Pb, Sn, Ti, Zn, or a combination thereof, wherein the catalytic cathode is in a reactor comprising an aqueous acidic solution comprising muconic acid, a supporting electrolyte, and an anode, so as to generate atomic hydrogen on the cathode surface in an amount effective to hydrogenate the muconic acid so as to yield a product comprising trans-3-hexene-1,6-dioic acid with a selectivity of about 50% to about 100%.

Embodiment 55 provides a method of forming a polymer, comprising:

polymerizing 2-hexene-1,6-dioic acid, the 3-hexene-1,6-dioic acid, or a combination thereof, with another compound, to form a polymer.

Embodiment 56 provides a method of forming a polymer, comprising:

polymerizing the 2-hexene-1,6-dioic acid, the 3-hexene-1,6-dioic acid, or a combination thereof, with a compound having the structure $H_2N$—$(C_1-C_{20})$alkylene-$NH_2$ or a salt thereof, wherein the $(C_1-C_{20})$alkyl group is substituted or unsubstituted, to form a polymer.

Embodiment 57 provides a polymer comprising a repeating group having the structure:

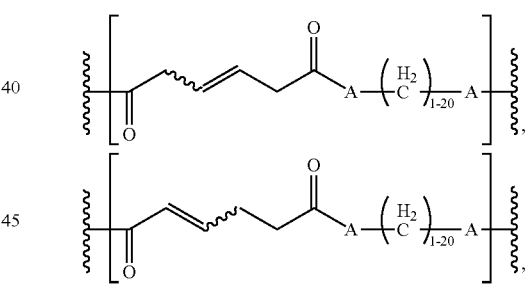

a salt thereof, or a combination thereof, wherein the —$(CH_2)_{1-20}$-group is substituted or unsubstituted, wherein at each occurrence -A- is independently chosen from —NH— and —O—.

Embodiment 58 provides the polymer of Embodiment 57, wherein the repeating group has the structure:

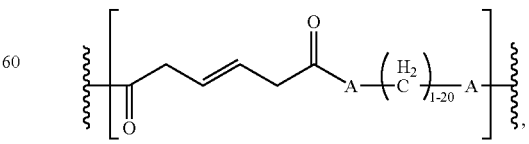

or a salt thereof, wherein at each occurrence -A- is independently chosen from —NH— and —O—.

Embodiment 59 provides the polymer of any one of Embodiments 57-58, wherein the repeating group has the structure:

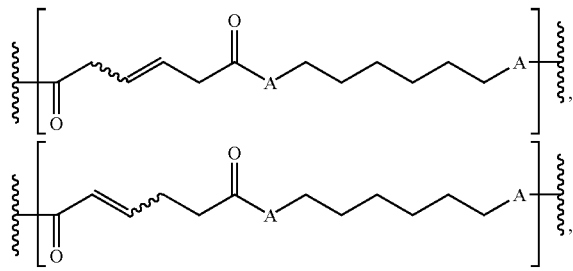

a salt thereof, or a combination thereof, wherein at each occurrence -A- is independently chosen from —NH— and —O—.

Embodiment 60 provides a polymer comprising a repeating group having the structure:

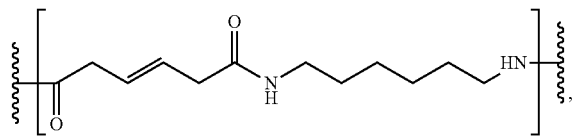

or a salt thereof.

Embodiment 61 provides the method or polymer of any one or any combination of Embodiments 1-60 optionally configured such that all elements or options recited are available to use or select from.

What is claimed is:

1. An electrocatalytic method to prepare 3-hexene-1,6-dioic acid, 2-hexene-1,6-dioic acid, adipic acid, or a combination thereof, from muconic acid, the method comprising:
passing current through a catalytic cathode in a reactor comprising an aqueous solution comprising muconic acid, a supporting electrolyte, and an anode, so as to generate atomic hydrogen on the cathode surface in an amount effective to hydrogenate the muconic acid to yield a product comprising 3-hexene-1,6-dioic acid, 2-hexene-1,6-dioic acid, adipic acid, or a mixture thereof;
wherein the aqueous solution is a fermentation broth comprising the muconic acid.

2. The method of claim 1, wherein the hydrogenation yields 3-hexene-1,6-dioic acid.

3. The method of claim 1, wherein the hydrogenation yields adipic acid.

4. The method of claim 1, wherein the cathode comprises at least one of Cu, Fe, Ni Pd, Pt, Pd/C, Pb, Sn, Ti, Zn, or a combination thereof.

5. The method of claim 1, wherein the cathode comprises one or more platinum group metals.

6. The method of claim 1, wherein the cathode comprises Ni, Pd, Pt, or a combination thereof.

7. The method of claim 6, wherein the hydrogenation yields adipic acid.

8. The method of claim 1, wherein the cathode comprises Cu, Fe, Ph, Sn, Ti, Zn, or a combination thereof.

9. The method of claim 8, wherein the hydrogenation yields 3-hexene-1,6-dioic acid that comprises trans-3-hexene-1,6-dioic acid.

10. The method of claim 1, wherein the cathode comprises platinum.

11. The method of claim 1, wherein the cathode comprises one or more transition metals.

12. The method of claim 1, wherein the aqueous solution further comprises an organic acid, a mineral acid, a salt thereof, or a combination thereof.

13. The method of claim 1, wherein the current is generated by applying a voltage of about −0.5 to about −3.0 volts with respect to an Ag/AgCl reference electrode or with respect to a reversible hydrogen electrode.

14. The method of claim 1, wherein the method is carried out at ambient temperature and pressure.

15. The method of claim 1, wherein the hydrogenation yields 3-hexene-1,6-dioic acid that comprises trans-3-hexene-1,6-dioic acid, wherein the trans-3-hexene-1,6-dioic acid is formed at a selectivity of about 80% to about 100%.

16. The method of claim 1, wherein the hydrogenation of the muconic acid occurs with a faradaic efficiency of about 2% to about 100%.

17. The method of claim 1, wherein the hydrogenation of the muconic acid occurs with a faradaic efficiency of about 90% to about 100%.

18. The method of claim 1, further comprising polymerizing the adipic acid with another compound, to form a polymer.

19. The method of claim 1, further comprising polymerizing the 2-hexene-1,6-dioic acid, the 3-hexene-1,6-dioic acid, or a combination thereof, with another compound, to form a polymer.

20. The method of claim 1, further comprising polymerizing the 2-hexene-1,6-dioic acid, the 3-hexene- 1,6-dioic acid, the adipic acid, or a combination thereof, with another compound, to form a polymer comprising a repeating group having the structure:

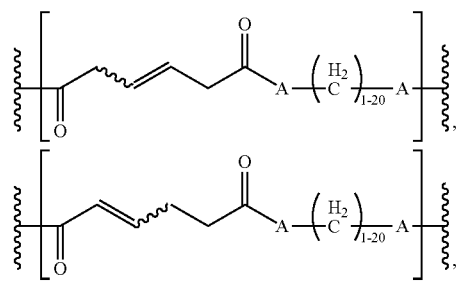

a salt thereof, or a combination thereof, wherein the —$(CH_2)_{1-20}$— group is substituted or unsubstituted, and wherein at each occurrence -A- is independently chosen from —NH— and —O—.

21. The method of claim 1, wherein the cathode comprises bismuth.

22. The method of claim 1, wherein the aqueous solution is an acidic aqueous solution.

* * * * *

UNITED STATES PATENT AND TRADEMARK OFFICE
CERTIFICATE OF CORRECTION

Page 1 of 3

PATENT NO. : 10,633,750 B2
APPLICATION NO. : 15/524888
DATED : April 28, 2020
INVENTOR(S) : Tessonnier et al.

It is certified that error appears in the above-identified patent and that said Letters Patent is hereby corrected as shown below:

On the Title Page

In item (73), in "Assignee", in Column 1, Line 1, delete "States" and insert --State-- therefor In the Drawings Sheet 15 of 29, Fig. 18A, delete "UNKNOWN/DECOMPOSITON" and insert --UNKNOWN/DECOMPOSITION-- therefor Sheet 15 of 29, Fig. 18B, delete "UNKNOWN/DECOMPOSITON" and insert --UNKNOWN/DECOMPOSITION-- therefor Sheet 16 of 29, Fig. 18D, delete "UNKNOWN/DECOMPOSITON" and insert --UNKNOWN/DECOMPOSITION-- therefor Sheet 16 of 29, Fig. 18E, delete "UNKNOWN/DECOMPOSITON" and insert --UNKNOWN/DECOMPOSITION-- therefor Sheet 17 of 29, Fig. 18G, delete "UNKNOWN/DECOMPOSITON" and insert --UNKNOWN/DECOMPOSITION-- therefor Sheet 17 of 29, Fig. 18H, delete "UNKNOWN/DECOMPOSITON" and insert --UNKNOWN/DECOMPOSITION-- therefor Sheet 18 of 29, Fig. 18J, delete "UNKNOWN/DECOMPOSITON" and insert --UNKNOWN/DECOMPOSITION-- therefor Sheet 18 of 29, Fig. 18K, delete "UNKNOWN/DECOMPOSITON" and insert --UNKNOWN/DECOMPOSITION-- therefor Signed and Sealed this
Twelfth Day of January, 2021

Andrei Iancu
*Director of the United States Patent and Trademark Office*

CERTIFICATE OF CORRECTION (continued)
U.S. Pat. No. 10,633,750 B2

Figure 19B:
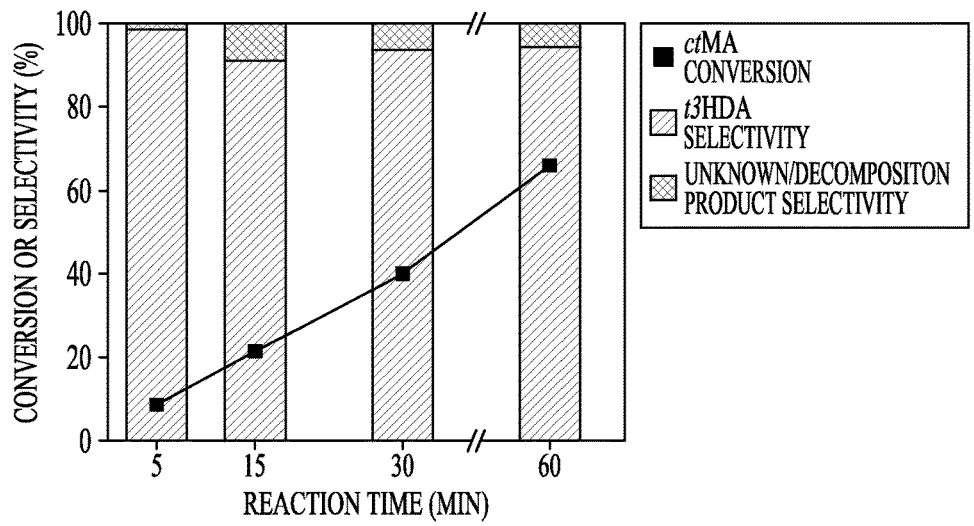
Figure 19C:
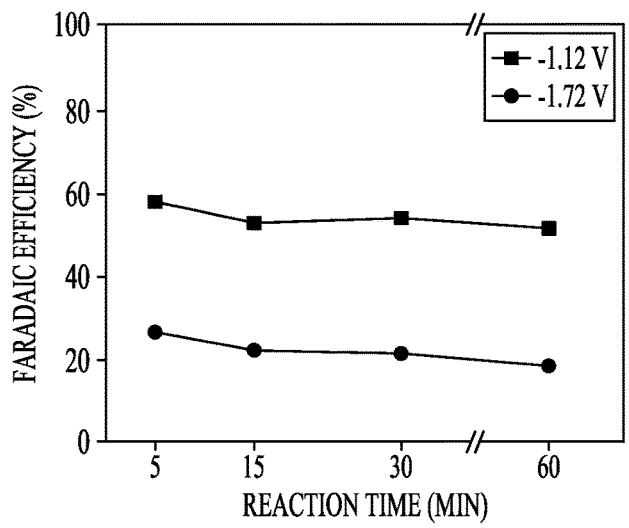
Figure 19D:
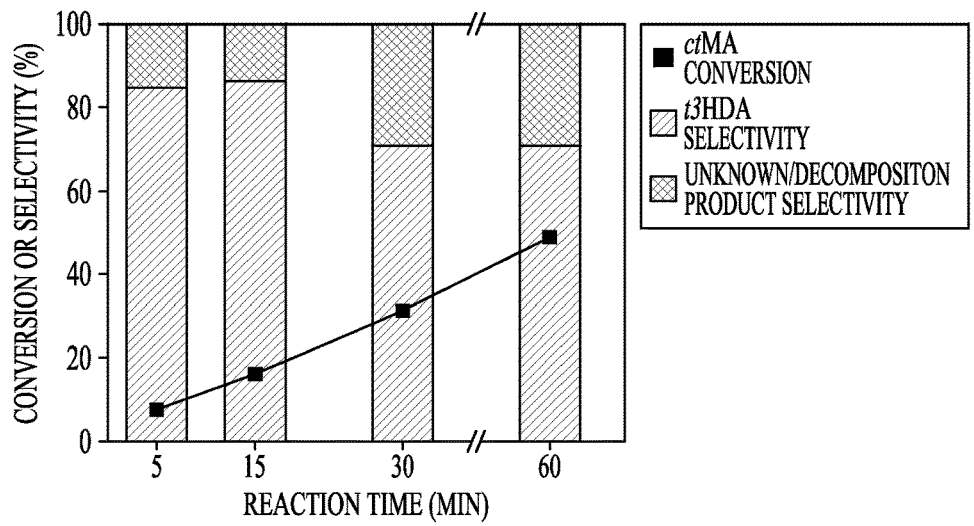
Figure 19E:
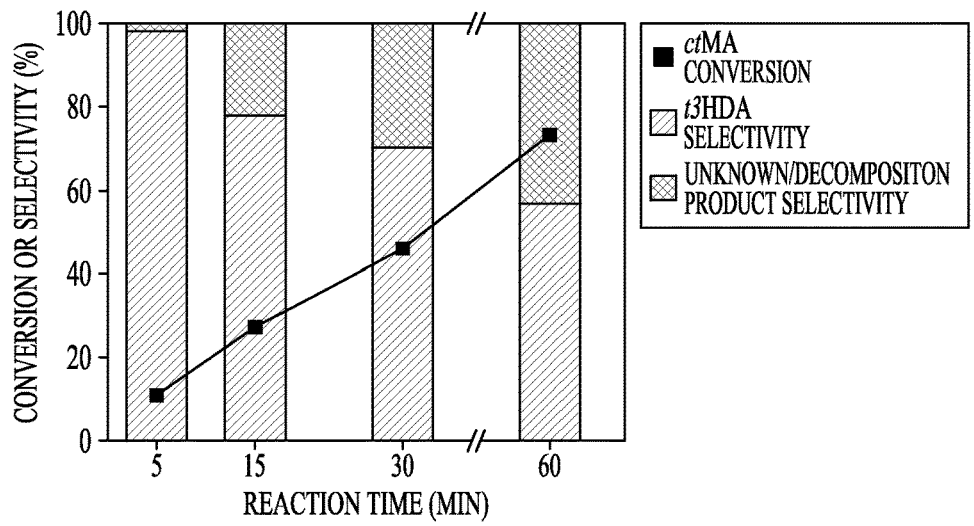
Figure 19F:
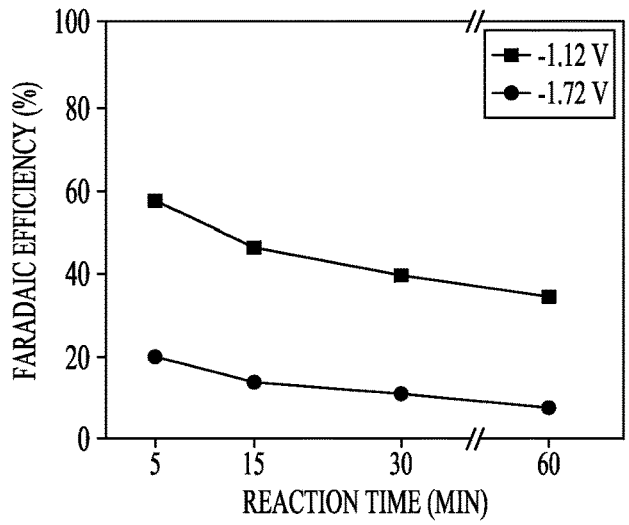
Figure 19G:
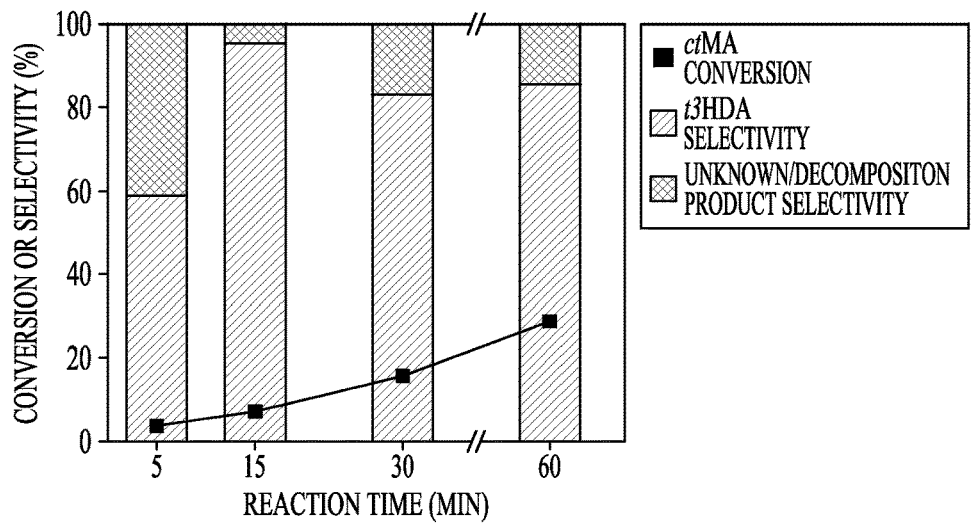
Figure 19H:
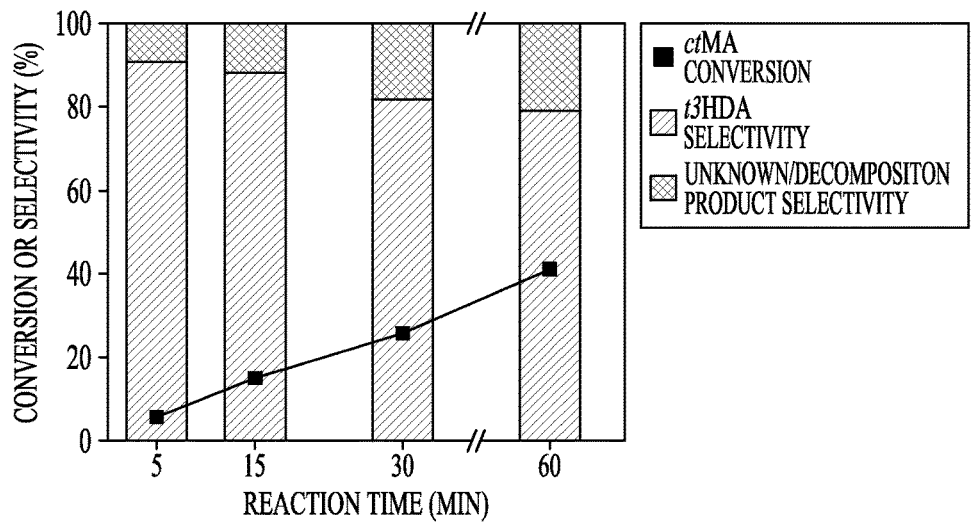
Figure 19I:
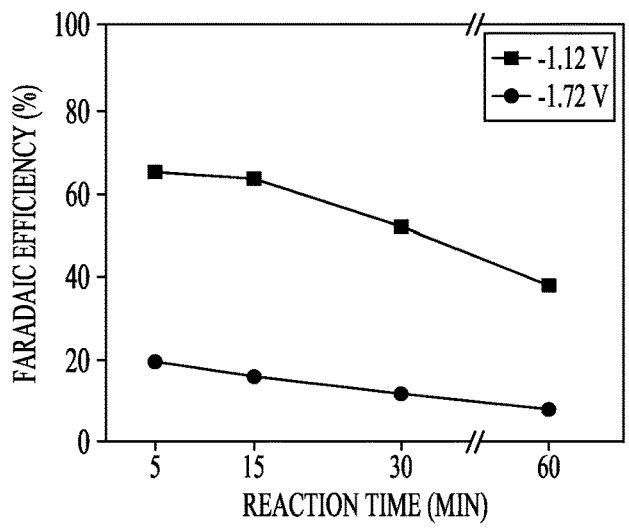
Figure 19J:
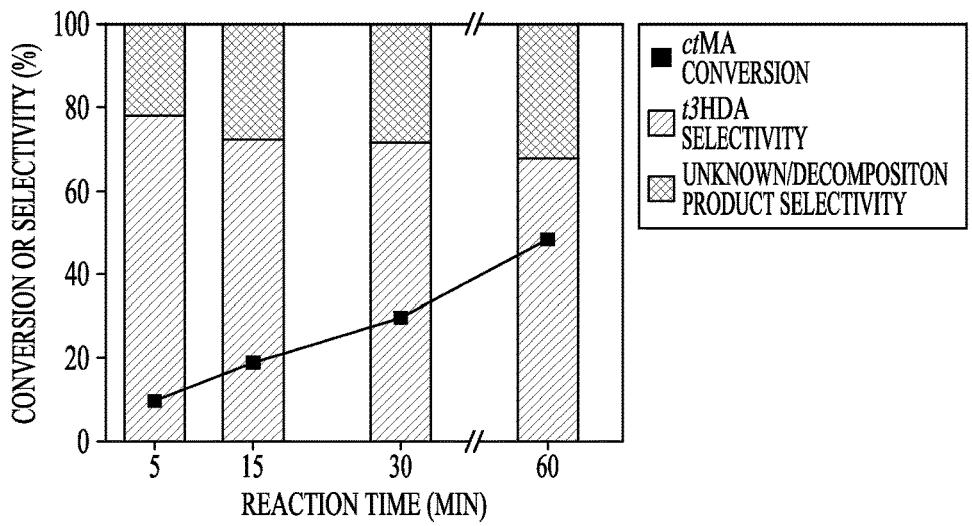
Figure 19K:
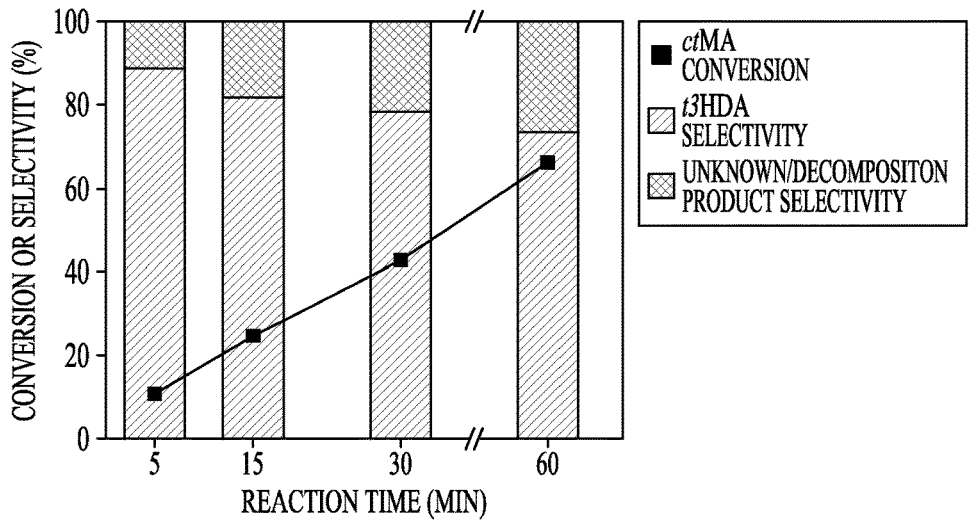
Figure 19L:
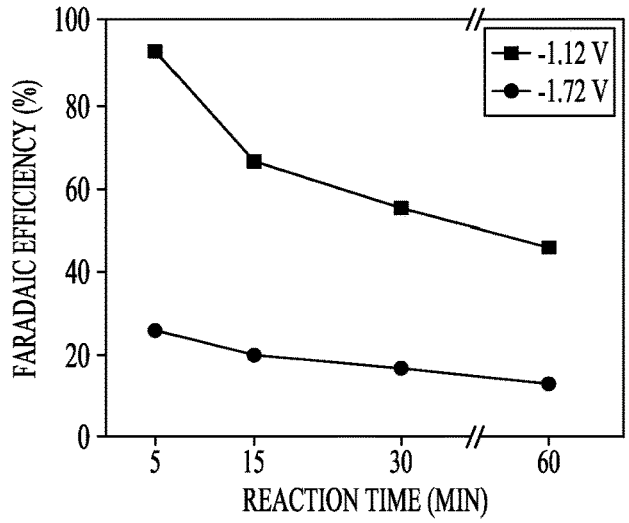

Sheet 19 of 29, Fig. 18M, delete "UNKNOWN/DECOMPOSITON" and insert --UNKNOWN/DECOMPOSITION-- therefor Sheet 19 of 29, Fig. 18N, delete "UNKNOWN/DECOMPOSITON" and insert --UNKNOWN/DECOMPOSITION-- therefor Sheet 20 of 29, Fig. 19A, delete "UNKNOWN/DECOMPOSITON" and insert --UNKNOWN/DECOMPOSITION-- therefor Sheet 20 of 29, Fig. 19B, delete "UNKNOWN/DECOMPOSITON" and insert --UNKNOWN/DECOMPOSITION-- therefor Sheet 21 of 29, Fig. 19D, delete "UNKNOWN/DECOMPOSITON" and insert --UNKNOWN/DECOMPOSITION-- therefor Sheet 21 of 29, Fig. 19E, delete "UNKNOWN/DECOMPOSITON" and insert --UNKNOWN/DECOMPOSITION-- therefor Sheet 22 of 29, Fig. 19G, delete "UNKNOWN/DECOMPOSITON" and insert --UNKNOWN/DECOMPOSITION-- therefor Sheet 22 of 29, Fig. 19H, delete "UNKNOWN/DECOMPOSITON" and insert --UNKNOWN/DECOMPOSITION-- therefor Sheet 23 of 29, Fig. 19J, delete "UNKNOWN/DECOMPOSITON" and insert --UNKNOWN/DECOMPOSITION-- therefor Sheet 23 of 29, Fig. 19K, delete "UNKNOWN/DECOMPOSITON" and insert --UNKNOWN/DECOMPOSITION-- therefor Sheet 25 of 29, Fig. 21A, delete "UNKNOWN/DECOMPOSITON" and insert --UNKNOWN/DECOMPOSITION-- therefor Sheet 26 of 29, Fig. 22B, delete "UNKNOWN/DECOMPOSITON" and insert --UNKNOWN/DECOMPOSITION-- therefor In the Specification In Column 1, Line 8, delete "&" and insert --§-- therefor In Column 3, Line 52, after "-O-", insert --.--

In Column 4, Line 47, delete "FIG." and insert --FIGS.-- therefor

In Column 5, Line 59, delete "-1.17 V" and insert -- -1.17 V.-- therefor

CERTIFICATE OF CORRECTION (continued)
U.S. Pat. No. 10,633,750 B2

In Column 6, Line 40, delete ""0.000.1"" and insert --"0.000,1"-- therefor

In Column 19, Line 15, delete "(18.0 MQ)." and insert --(18.0 MΩ).-- therefor

In Column 20, Line 37, delete "(18.0 MQ)." and insert --(18.0 MΩ).-- therefor

In Column 22, Line 52, delete "cis, cis-MA" and insert --*cis,cis*-MA-- therefor In Column 22, Line 53, delete "cis, trans-MA" and insert --*cis,trans*-MA-- therefor In Column 22, Line 54, delete "cis, trans-MA" and insert --*cis,trans*-MA-- therefor In Column 22, Line 56, delete "cis, trans-MA" and insert --*cis,trans*-MA-- therefor In Column 23, Lines 37-38, delete "$H^{(+)}+e^-+* \rightarrow H^+$" and insert --$H^{(+)} + e^- + * \rightarrow H^8$-- therefor In Column 24, Line 51, after "crystallization", insert --.--

In Column 24, Lines 57-58, delete "Polycondensation Reaction Between Trans-HDA" and insert --polycondensation reaction between *trans*-HDA-- therefor In Column 25, Line 65, delete "q=4π/sin θ." and insert --$q=4\pi/\lambda \sin \theta$.-- therefor In Column 26, Line 45, delete "OC." and insert --°C.-- therefor In Column 28, in table 4, Line 53, delete "Mn" and insert --$M_n$-- therefor In Column 27, Lines 21-22, delete "cis, trans-MA (ctMA)" and insert --*cis,trans*-MA (*ct*MA)-- therefor In Column 27, Line 59, delete "0.5 mil" and insert --0.5 ml-- therefor In Column 33, Line 40, delete "FIG." and insert --FIGS.-- therefor In Column 40, Line 50, delete "-$(CH_2)_{1-20}$-group" and insert -- -$(CH_2)_{1-20}$- group-- therefor In the Claims In Column 41, Line 56, in Claim 4, delete "Ni" and insert --Ni,-- therefor In Column 42, Line 2, in Claim 8, delete "Ph," and insert --Pb,-- therefor In Column 42, Line 36, in Claim 20, delete "3-hexene- 1,6-dioic" and insert --3-hexene-1,6-dioic-- therefor